(12) United States Patent
Yabuki et al.

(10) Patent No.: US 12,728,360 B2
(45) Date of Patent: Sep. 8, 2026

(54) NON-TRANSITORY COMPUTER-READABLE MEDIUM, INFORMATION PROCESSING SYSTEM, INFORMATION PROCESSING METHOD, AND INFORMATION PROCESSING APPARATUS

(71) Applicant: NINTENDO CO., LTD., Kyoto (JP)

(72) Inventors: Kosuke Yabuki, Kyoto (JP); Shoichi Obayashi, Kyoto (JP); Masahiro Nakamura, Kyoto (JP); Masashi Onishi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 219 days.

(21) Appl. No.: 18/822,922

(22) Filed: Sep. 3, 2024

(65) Prior Publication Data

US 2025/0161823 A1 May 22, 2025

(30) Foreign Application Priority Data

Nov. 17, 2023 (JP) ................................ 2023-195646
Jul. 31, 2024 (JP) ................................ 2024-124712

(51) Int. Cl.

| | |
|---|---|
| ***A63F 13/803*** | (2014.01) |
| ***A63F 13/49*** | (2014.01) |
| ***A63F 13/5372*** | (2014.01) |
| ***A63F 13/5378*** | (2014.01) |
| ***A63F 13/56*** | (2014.01) |
| ***A63F 13/577*** | (2014.01) |
| ***A63F 13/69*** | (2014.01) |

(52) U.S. Cl.
CPC ............ *A63F 13/803* (2014.09); *A63F 13/49* (2014.09); *A63F 13/5372* (2014.09); *A63F 13/5378* (2014.09); *A63F 13/56* (2014.09); *A63F 13/577* (2014.09); *A63F 13/69* (2014.09)

(58) Field of Classification Search
CPC ........ A63F 13/00; A63F 13/49; A63F 13/537; A63F 13/5372; A63F 13/5378; A63F 13/577; A63F 13/69; A63F 13/803; A63F 9/14
See application file for complete search history.

(56) References Cited

U.S. PATENT DOCUMENTS

| | | | | |
|---|---|---|---|---|
| 7,892,078 | B2 * | 2/2011 | Tipping | A63F 13/573 463/6 |
| 10,406,438 | B2 * | 9/2019 | Catlin | A63F 13/35 |
| 10,792,568 | B1 * | 10/2020 | Merrill | A63F 13/56 |
| 2002/0024521 | A1 * | 2/2002 | Goden | A63F 13/52 345/474 |
| 2002/0175918 | A1 * | 11/2002 | Barber | G06T 19/003 345/474 |
| 2004/0263693 | A1 * | 12/2004 | Herbrich | A63F 13/10 348/415.1 |

(Continued)

FOREIGN PATENT DOCUMENTS

JP H0994350 A 4/1997

*Primary Examiner* — Milap Shah
(74) *Attorney, Agent, or Firm* — Nixon & Vanderhye PC

(57) ABSTRACT

In an example of a game system, a plurality of base areas and an inter-base route connecting the base areas are set on a field. If a game is started, a racing game where a course including the inter-base route and an intra-base route set in any of the base areas is set, and a movable object is moved along the course is performed.

61 Claims, 26 Drawing Sheets

(56) References Cited

U.S. PATENT DOCUMENTS

| | | | | |
|---|---|---|---|---|
| 2005/0096110 | A1* | 5/2005 | Ohyagi | A63F 13/10 463/6 |
| 2006/0135236 | A1* | 6/2006 | Sato | A63F 13/47 463/6 |
| 2006/0281508 | A1* | 12/2006 | Carney | A63F 13/45 463/6 |
| 2007/0276709 | A1* | 11/2007 | Trimby | A63F 13/00 705/6 |
| 2009/0005139 | A1* | 1/2009 | Morimoto | A63F 13/57 463/43 |
| 2011/0256912 | A1* | 10/2011 | Baynes | A63F 13/803 463/43 |
| 2014/0094317 | A1* | 4/2014 | Takagi | A63F 13/35 463/42 |
| 2018/0250595 | A1* | 9/2018 | Kurabayashi | A63F 13/55 |
| 2019/0083887 | A1* | 3/2019 | Tan | A63F 13/56 |
| 2020/0360814 | A1* | 11/2020 | Kimura | A63F 13/497 |
| 2021/0031120 | A1* | 2/2021 | Field | G06F 30/00 |
| 2023/0241498 | A1* | 8/2023 | Wu | A63F 13/422 463/6 |
| 2023/0293991 | A1* | 9/2023 | Kimura | A63F 13/47 463/6 |
| 2023/0338854 | A1* | 10/2023 | Wang | G06T 13/40 |

* cited by examiner

FIG. 7

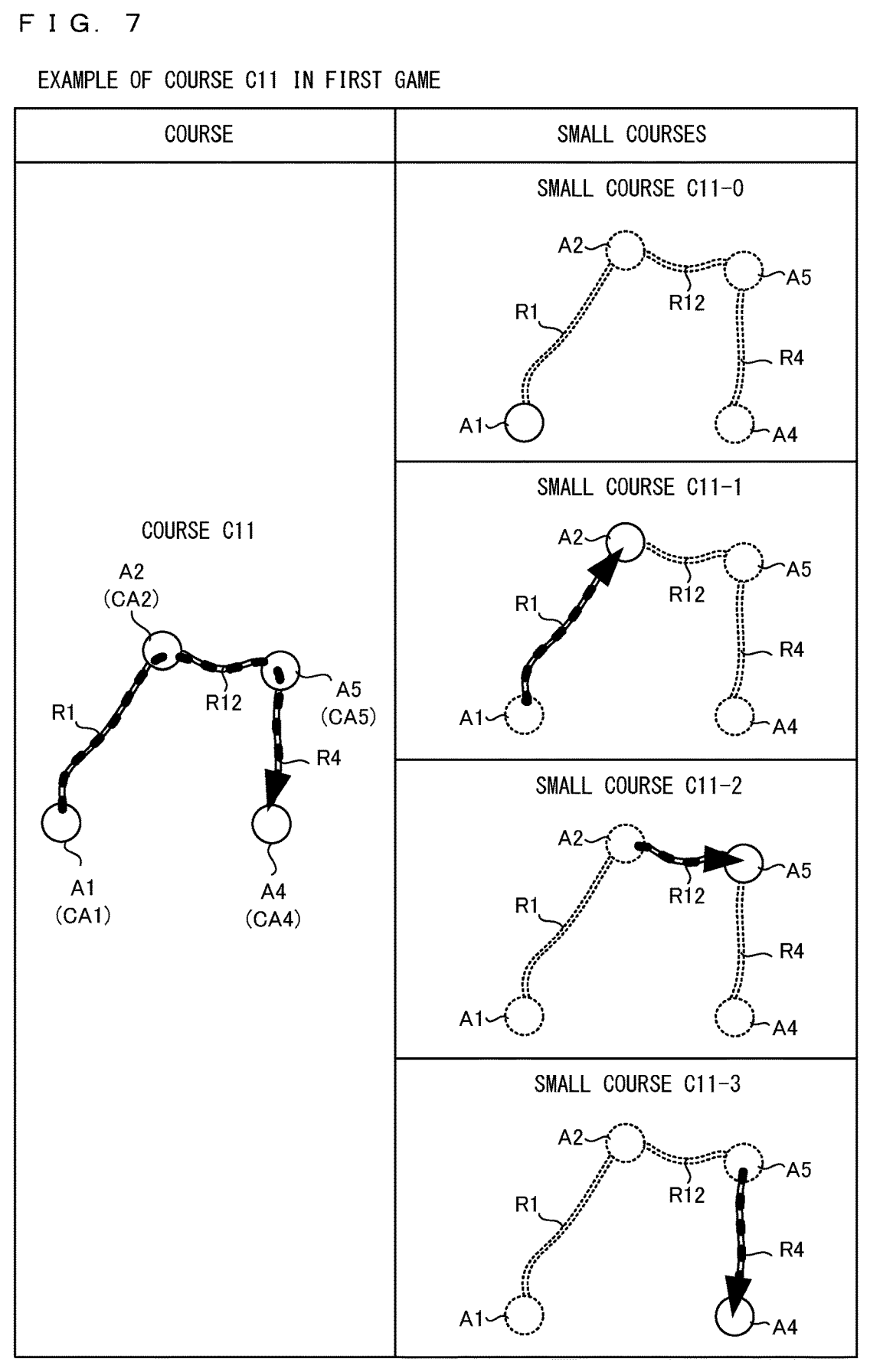

EXAMPLE OF COURSE C11 IN FIRST GAME

<table>
<tr><th>COURSE</th><th>SMALL COURSES</th></tr>
<tr><td rowspan="4">COURSE C11<br>A2 (CA2)<br>R1<br>R12<br>A5 (CA5)<br>R4<br>A1 (CA1)<br>A4 (CA4)</td><td>SMALL COURSE C11-0<br>A2 A5 R12 R1 R4 A1 A4</td></tr>
<tr><td>SMALL COURSE C11-1<br>A2 A5 R12 R1 R4 A1 A4</td></tr>
<tr><td>SMALL COURSE C11-2<br>A2 A5 R12 R1 R4 A1 A4</td></tr>
<tr><td>SMALL COURSE C11-3<br>A2 A5 R12 R1 R4 A1 A4</td></tr>
</table>

SMALL COURSE C1-1 (WHILE RUNNING R1)

SMALL COURSE C1-1 (FINAL STAGE OF R1)

SMALL COURSE C1-1 (WHEN REACHING GOAL ON CA2)

SMALL COURSE C1-2 (AFTER START)

EXAMPLES OF RACE CONTINUATION CONDITIONS IN SECOND GAME

| CHECKPOINT | RACE CONTINUATION CONDITION |
|---|---|
| CP1 (IN A1) | PLACING TOP 12 WHEN REACHING CP1 |
| CP2 (IN A2) | PLACING TOP 10 WHEN REACHING CP2 |
| CP3 (IN A3) | PLACING TOP 8 WHEN REACHING CP3 |

FIG. 17
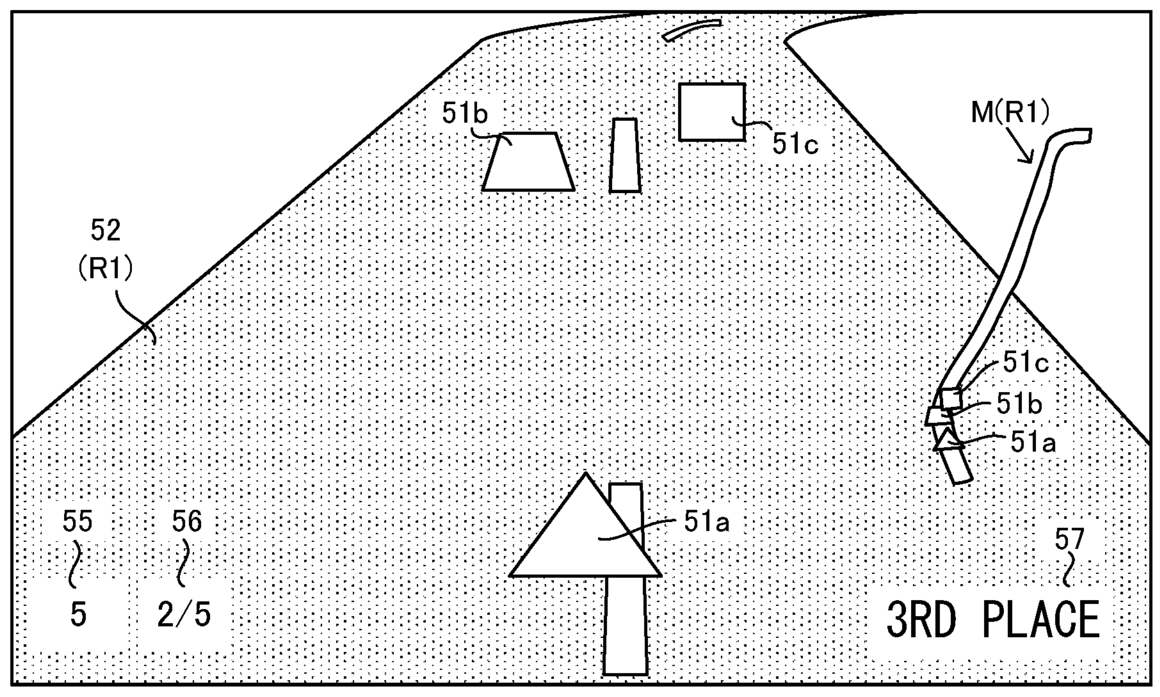
FIG. 18
SECOND GAME (WHILE RUNNING R1)
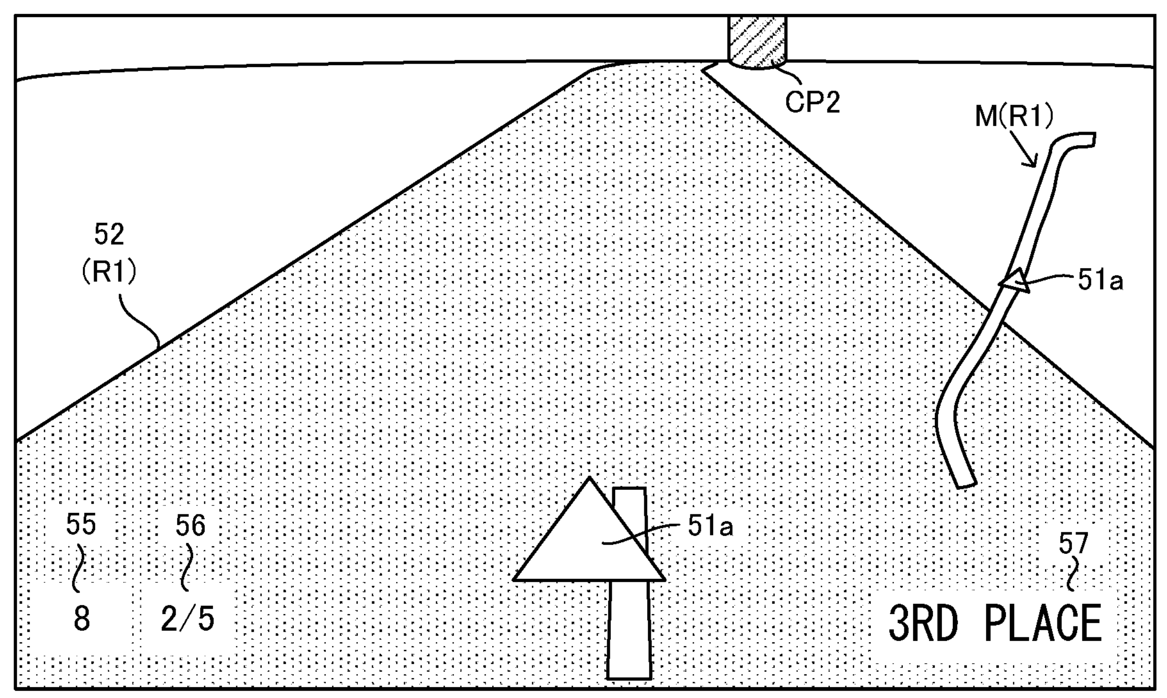

SECOND GAME (REACHING CP2)

EXAMPLES OF WINNING-THROUGH CONDITIONS FOR MOVABLE OBJECT 51A1

| ROUND | RUNNING COURSE | DETERMINATION TIMING | WINNING-THROUGH CONDITION | NEXT COURSE |
|---|---|---|---|---|
| 1ST ROUND | R1～R2 | WHEN REACHING A3 | 2ND PLACE (AMONG 4 PLACES) | 3 LAP AROUND CA |
| 2ND ROUND | 3 LAP AROUND CA | WHEN REACHING GOAL IN CA3 | 2ND PLACE (AMONG 4 PLACES) | R3,R15 |
| 3RD ROUND | R3,R15 | WHEN REACHING A13 | 1ST PLACE (BETWEEN 2 PLACES) | LAP AROUND CA13 (FINAL) |

THIRD GAME (1ST ROUND: WHILE RUNNING R1)

THIRD GAME (FINAL: WHILE RUNNING CA13)

EXAMPLES OF WINNING-THROUGH CONDITIONS FOR MOVABLE OBJECT 51A

| ROUND | RUNNING COURSE | DETERMINATION TIMING | WINNING-THROUGH CONDITION | NEXT COURSE |
|---|---|---|---|---|
| 1ST ROUND | R1～R2 | WHEN REACHING A3 | 2ND PLACE (AMONG 4 PLACES) | R3,R15 |
| 2ND ROUND | R3,R15 | WHEN REACHING A13 | 2ND PLACE (AMONG 4 PLACES) | LAP AROUND CA13 (FINAL) |

| GAME PROGRAM |
|---|
| OPERATING OBJECT DATA |
| OTHER MOVABLE OBJECT DATA |
| FIELD DATA |
| COURSE DATA |
| FIRST ITEM GIVING OBJECT DATA |
| SECOND ITEM GIVING OBJECT DATA |

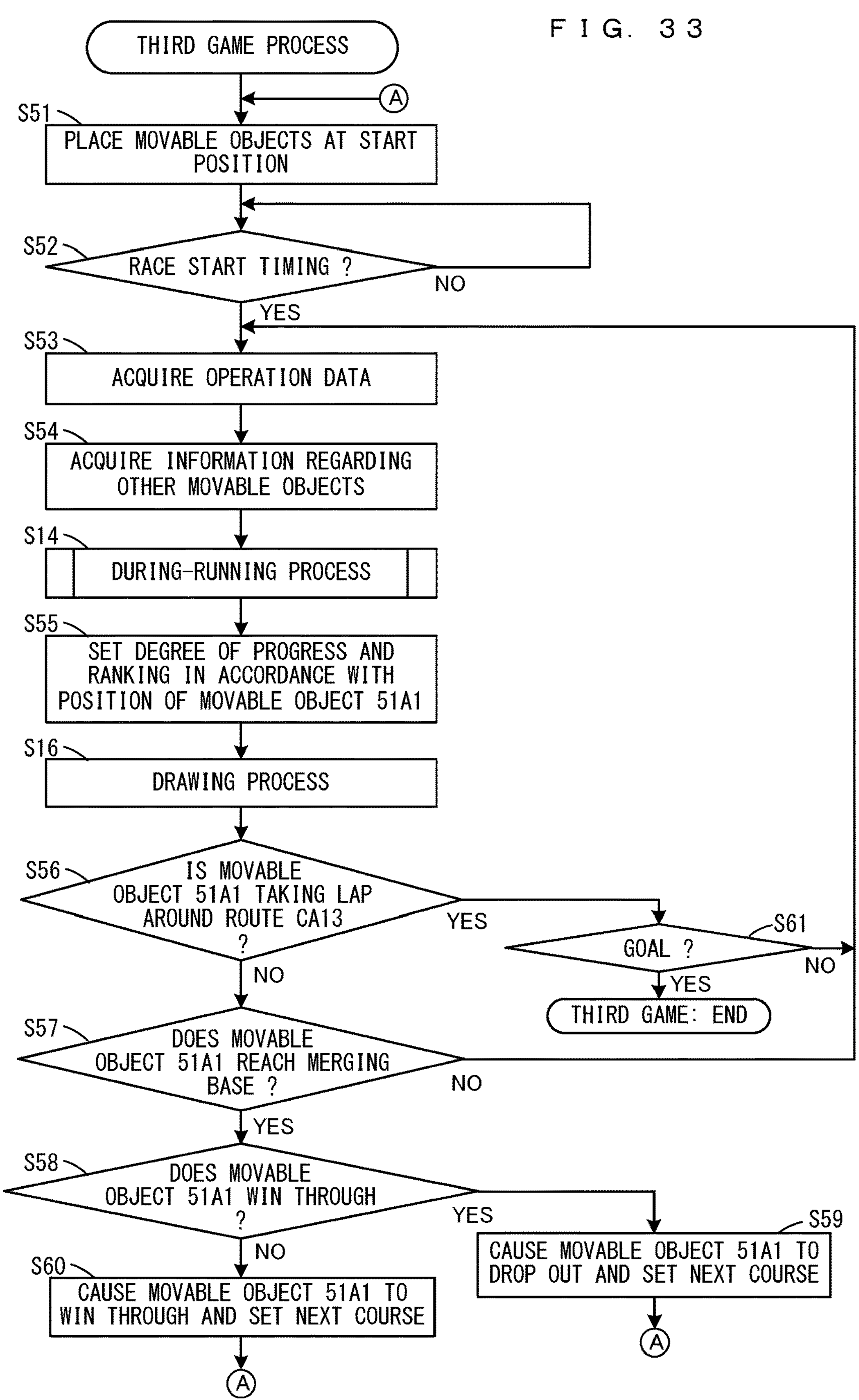
FIG. 33
THIRD GAME PROCESS
A
S51
PLACE MOVABLE OBJECTS AT START POSITION
S52
RACE START TIMING ?
NO
YES
S53
ACQUIRE OPERATION DATA
S54
ACQUIRE INFORMATION REGARDING OTHER MOVABLE OBJECTS
S14
DURING-RUNNING PROCESS
S55
SET DEGREE OF PROGRESS AND RANKING IN ACCORDANCE WITH POSITION OF MOVABLE OBJECT 51A1
S16
DRAWING PROCESS
S56
IS MOVABLE OBJECT 51A1 TAKING LAP AROUND ROUTE CA13 ?
YES
NO
S61
GOAL ?
NO
YES
THIRD GAME: END
S57
DOES MOVABLE OBJECT 51A1 REACH MERGING BASE ?
NO
YES
S58
DOES MOVABLE OBJECT 51A1 WIN THROUGH ?
YES
NO
S59
CAUSE MOVABLE OBJECT 51A1 TO DROP OUT AND SET NEXT COURSE
A
S60
CAUSE MOVABLE OBJECT 51A1 TO WIN THROUGH AND SET NEXT COURSE
A

NON-TRANSITORY COMPUTER-READABLE MEDIUM, INFORMATION PROCESSING SYSTEM, INFORMATION PROCESSING METHOD, AND INFORMATION PROCESSING APPARATUS

CROSS REFERENCE TO RELATED APPLICATION

This application claims priority to Japanese Patent Application No. 2023-195646 filed on Nov. 17, 2023 and Japanese Patent Application No. 2024-124712 filed on Jul. 31, 2024, the entire contents of which are incorporated herein by reference.

FIELD

An exemplary embodiment relates to a non-transitory computer-readable storage medium having stored therein a game program capable of executing a racing game, an information processing system, an information processing method, and an information processing apparatus.

BACKGROUND AND SUMMARY

Conventionally, there is a racing game where a race is performed on a plurality of types of courses.

In the above conventional game, however, a movable object runs on the same path multiple times along a course, and there is room for improvement in setting a variety of courses.

Therefore, an exemplary embodiment discloses a game program, an information processing system, an information processing method, and an information processing apparatus in which various courses are set on a field, a race can be performed on each course, and a variety of courses can be set.

The exemplary embodiment employs the following configurations.

(First Configuration)

Instructions according to a first configuration, when executed, cause one or more processors of an information processing apparatus to execute game processing including: based on an operation input, causing an operating object to run on a field in a virtual space, wherein a plurality of base areas are set on the field; in a case where a type of a race to be performed by the operating object and at least one other movable object is determined and an instruction to start the race is given based on an operation input, if the determined race is a specific type of race, setting a course at least including an intra-base route that is a path set in any of the base areas and an inter-base route set as a path connecting the base areas; starting the race; and causing the operating object and the movable object to run along the set course on the field, thereby performing the race.

Based on the above, on a course including an inter-base route connecting a plurality of base areas set on a field and an intra-base route set in any of the base areas, it is possible to cause an operating object and a movable object to race each other. It is possible to set a course using a wide range on the field. Thus, it is possible to set a variety of courses.

(Second Configuration)

According to a second configuration, in the above first configuration, the game processing may further include, if the determined race is a first type of race as the specific type of race, setting a course at least including the inter-base route between a first base area and a second base area, and a route where the operating object and the movable object take a predetermined number of laps around the intra-base route in the second base area and reach a goal after the inter-base route.

Based on the above, it is possible to set a course including an inter-base route and a route where an operating object takes a predetermined number of laps around an intra-base route of a second base area after the inter-base route. Consequently, it is possible to move the operating object on an inter-base route and then move the operating object on an intra-base route beyond the inter-base route.

(Third Configuration)

According to a third configuration, in the above second configuration, the game processing may further include, after the first type of race ends, setting a course at least including the inter-base route between the second base area and a third base area, and a route where the operating object and the movable object take a predetermined number of laps around the intra-base route in the third base area and reach a goal after the inter-base route, and further starting a race.

Based on the above, after a race ends by the operating object taking a predetermined number of laps around the intra-base route in the second base area, further, it is possible to perform a race where the operating object heads for a third base area by causing the operating object to run an inter-base route between the second base area and a third base area. Consequently, a player can perform a plurality of racing games over a wide range on the field.

(Fourth Configuration)

According to a fourth configuration, in any of the above first to third configurations, the game processing may further include, if the determined race is a second type of race as the specific type of race, setting a course where the operating object and the movable object take a predetermined number of laps around the intra-base route of one of the base areas that a plurality of continuous inter-base routes reach last, and reach a goal.

Based on the above, it is possible to perform a racing game where the operating object moves on a plurality of continuous inter-base routes and takes a predetermined number of laps around an intra-base route that the plurality of continuous inter-base routes reaches last.

(Fifth Configuration)

According to a fifth configuration, in any of the above first to third configurations, the game processing may further include, if the determined race is a second type of race, setting a course at least including a plurality of continuous inter-base routes.

Based on the above, it is possible to perform a racing game where the operating object moves on a plurality of continuous inter-base routes.

(Sixth Configuration)

According to a sixth configuration, in any of the above first to fifth configurations, the game processing may further include: if the determined race is a third type of race as the specific type of race, setting a course where starting points are set in the plurality of base areas, and in one of the base areas that a route reaches on a path via the plurality of continuous inter-base routes, the route merges with a route where a starting point is in another one of the base areas, and the operating object and the movable object take a predetermined number of laps around the intra-base route of one of the base areas that the plurality of continuous inter-base routes reach last, and reach a goal; and starting the operating object from any of the plurality of starting points.

Based on the above, it is possible to perform a racing game where the operating object is started from any of the plurality of base areas, and in one of the base areas that a route reaches via a plurality of continuous inter-base routes, the operating object is caused to merge with a movable object having started from another one of the base areas, and takes a predetermined number of laps around an intra-base route of the base area where the operating object and the movable object merge together.

(Seventh Configuration)

According to a seventh configuration, in any of the above first to fifth configurations, the game processing may further include: if the determined race is a third type of race, setting a course where starting points are set in the plurality of base areas, and in one of the base areas that a route reaches on a path via the plurality of continuous inter-base routes, the route merges with a route where a starting point is in another one of the base area, and a goal point is set in the base areas where the routes merge together; and starting the operating object from any of the plurality of starting points.

Based on the above, it is possible to perform a racing game where the operating object is started from any of the plurality of base areas, and in one of the base areas that a route reaches via a plurality of continuous inter-base routes, the operating object is caused to merge with a movable object having started from another one of the base areas, and reaches a goal of the base area where the operating object and the movable object merge together.

(Eighth Configuration)

According to an eighth configuration, in any of the above first to seventh configurations, the game processing may further include, if the determined race is a fourth type of race, setting a course where the operating object and the movable object take a predetermined number of laps around the intra-base route.

Based on the above, it is possible to perform a racing game where the operating object takes a predetermined number of laps around an intra-base route.

(Ninth Configuration)

According to a ninth configuration, in the second configuration, the game processing may further include, if the determined race is a fifth type of race, setting a course where the operating object and the movable object take a predetermined number of laps around the intra-base route in the first base area, and after the fifth type of race ends, starting the first type of race.

(Tenth Configuration)

According to a tenth configuration, in the above fourth or fifth configuration, the game processing may further include: further setting a checkpoint in any of the base areas located between the plurality of inter-base routes of the course; and in the race, based on a ranking of the operating object in the race at a time when the operating object reaches the checkpoint, causing the operating object to continue the race or causing the operating object to drop out of the race.

Based on the above, based on the ranking of the operating object at a checkpoint, it is possible to cause the operating object to continue the race or drop out of the race. Thus, it is possible to perform a racing game incorporating an element of survival.

(Eleventh Configuration)

According to an eleventh configuration, in the above sixth or seventh configuration, the game processing may further include, in the race, based on a ranking of the operating object in the inter-base routes at the time when the operating object runs the inter-base route and reaches any of the base areas with which the route merges, causing the operating object to continue the race by winning through, or causing the operating object to drop out.

Based on the above, based on the ranking of the operating object at the time when the operating object reaches the base area where the operating object merges with the movable object, it is possible to cause the operating object to continue the race by winning through or drop out. Thus, it is possible to perform a racing game by a winning-through method.

(Twelfth Configuration)

According to a twelfth configuration, in the above eleventh configuration, the game processing may further include, if the operating object is caused to drop out, starting a race with a movable object having dropped out.

Based on the above, even in a case where the operating object drops out, the operating object can continue the race with a movable object having dropped out.

(Thirteenth Configuration)

According to a thirteenth configuration, in any of the above first to twelfth configurations, the game processing may further include: in the race, on the intra-base route, if the operating object goes out of a first range set along the course, returning the operating object into the course; and on the inter-base route, if the operating object goes out of a second range set along the course and set to be wider than the first range, returning the operating object into the course.

Based on the above, a second range is wider than a first range, and therefore, when the operating object moves on the inter-base route, it is possible to move the operating object beyond the first range. Thus, it is possible to move the operating object in a wider range on the inter-base route.

(Fourteenth Configuration)

According to a fourteenth configuration, in any of the above first to thirteenth configurations, the setting of the course may further include placement of an item giving object on the course, and first item giving objects larger than second item giving objects placed on the intra-base route is placed on the inter-base route. The game processing may further include in the race, in accordance with contact between the operating object and the first item giving objects or the second item giving objects, causing the operating object to acquire an item.

Based on the above, first item giving objects placed on the inter-base route are larger than second item giving objects placed on the intra-base route. Consequently, it is possible to make it easy for the operating object to acquire an item while moving on the inter-base route.

(Fifteenth Configuration)

According to a fifteenth configuration, in the above fourteenth configuration, the game processing may further include, in the race, if the operating object or the movable object comes into contact with the second item giving objects, erasing the second item giving objects for at least a predetermined period; and if the operating object or the movable object comes into contact with the first item giving objects, not erasing the first item giving objects.

Based on the above, the first item giving objects are not erased, and therefore, it is possible to make it easy for the operating object to acquire an item while moving on the inter-base route.

(Sixteenth Configuration)

According to a sixteenth configuration, in the above fifteenth configuration, the field may include a road portion and a portion other than the road portion, the course may be set to at least include the road portion, and at least any of the first item giving objects may have a shape having a width wider than a width of the road portion on the path of the inter-base route where the first item giving objects are placed.

Based on the above, it is possible to make it easy for the operating object to acquire an item while moving on the inter-base route.

(Seventeenth Configuration)

According to a seventeenth configuration, in any of the above first to sixteenth configurations, the game processing may further include, in the race, if the operating object is in the intra-base route, displaying first map information indicating at least a part of the intra-base route including a position of the operating object; and if the operating object is in the inter-base route, displaying second map information indicating at least a part of the inter-base route including the position of the operating object and a wider range in the field than the first map information.

Based on the above, while the operating object is moving on the inter-base route, it is possible to display map information regarding a wider range on the field.

(Eighteenth Configuration)

According to an eighteenth configuration, in any of the above first to seventeenth configurations, a plurality of gates may be placed on the field, the intra-base route may be a route where the operating object and the movable object pass through any of the gates placed in the base areas and reaches the gate again, and the inter-base route may be a route where the operating object and the movable object pass through a gate of a first base area and reach a gate of a second base area.

Based on the above, it is possible to set a gate provided in each of the base areas as an inter-base route.

(Nineteenth Configuration)

According to a nineteenth configuration, in the above eighteenth configuration, the game processing may further include, in the race, displaying lap information relating to the number of times the operating object passes through any of the gates.

Based on the above, it is possible to display lap information relating to the number of times the operating object passes through the gate on the course including the inter-base route and the intra-base route. Thus, it is possible to cause a player to recognize the degree of progress of a racing game.

(Twentieth Configuration)

According to a twentieth configuration, in any of the above first to nineteenth configurations, the game processing may further include, after the race ends, transitioning to a free running mode for causing the operating object to run on the field, regardless of the course; and in the free running mode, if the type of the race is determined and an instruction to start the race is given based on an operation input, starting the race.

Based on the above, after a race ends, it is possible to transition to a free running mode and move the operating object on the field.

Another configuration may be an information processing system that executes the above game program, or may be an information processing apparatus, or may be an information processing method.

According to the exemplary embodiment, it is possible to set a variety of courses using a field where a plurality of base areas are set.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 7 is an example non-limiting diagram showing an example of a course C11 in the first game;

FIG. 17 is an example non-limiting diagram showing an example of a game image displayed when the second game is performed on the course C20, and is an example non-limiting diagram showing an example of a game image displayed when a movable object is running the route R1;

FIG. 18 is an example non-limiting diagram showing an example of a game image displayed after FIG. 17, and is an example non-limiting diagram showing an example of a game image displayed when a checkpoint CP2 can be viewed from a distance;

FIG. 33 is an example non-limiting flow chart showing an example of a third game process;

DETAILED DESCRIPTION OF NON-LIMITING EXAMPLE EMBODIMENTS (Game System Configuration)

Figure 1:
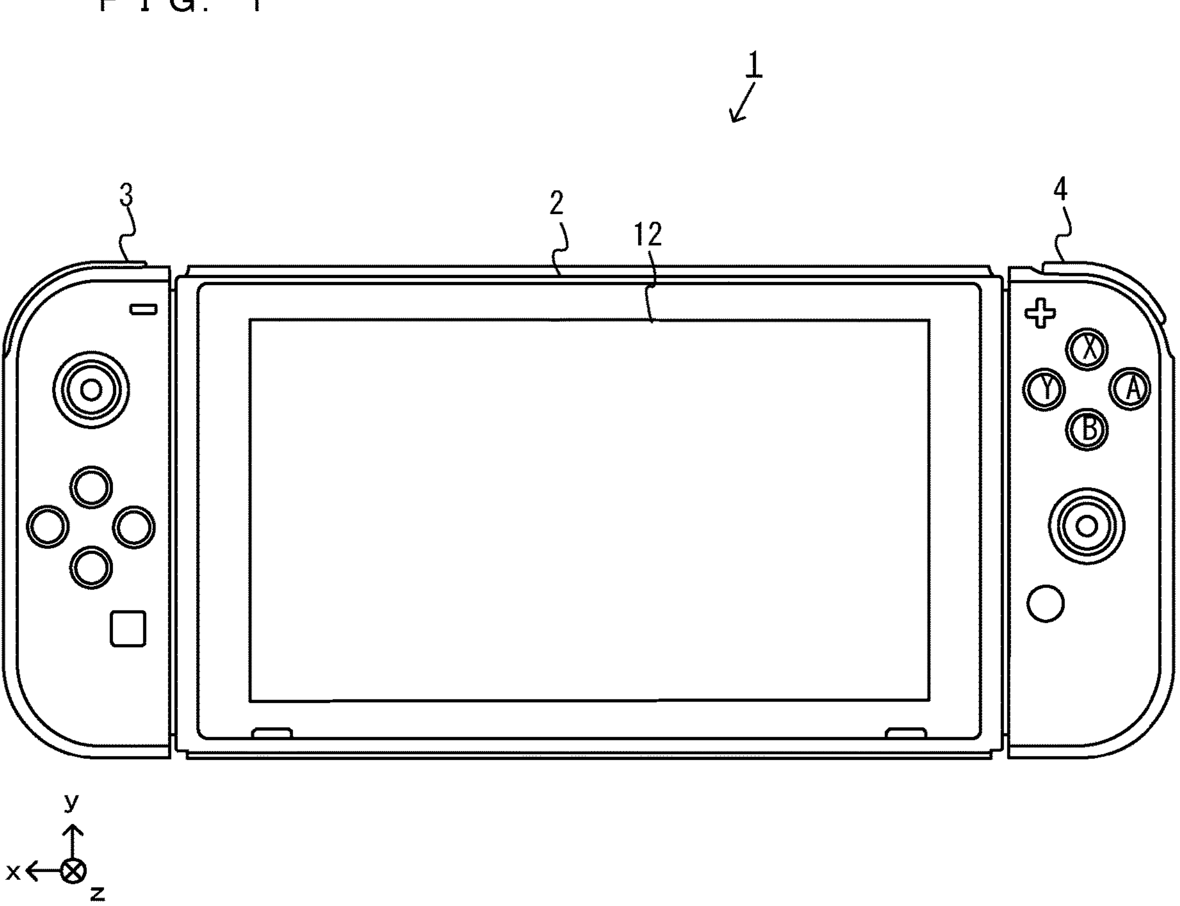
FIG. 1 is an example non-limiting diagram showing an exemplary game system.

A game system according to an example of an exemplary embodiment is described below. FIG. 1 is a diagram showing an exemplary game system. An example of a game system 1 according to the exemplary embodiment includes a main body apparatus (an information processing apparatus; which functions as a game apparatus main body in the exemplary embodiment) 2, a left controller 3, and a right controller 4. The main body apparatus 2 is an apparatus for performing various processes (e.g., game processing) in the game system 1. The left controller 3 and the right controller 4 each include a plurality of buttons (an A-button, a B-button, an X-button, and a Y-button) and an analog stick, as exemplary operation units through which a user performs input.

Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2, or the main body apparatus 2, the left controller 3, and the right controller 4 may be separated from one another, when being used. It should be noted that hereinafter, the left controller 3 and the right controller 4 will occasionally be referred to collectively as a "controller".

Figure 2:
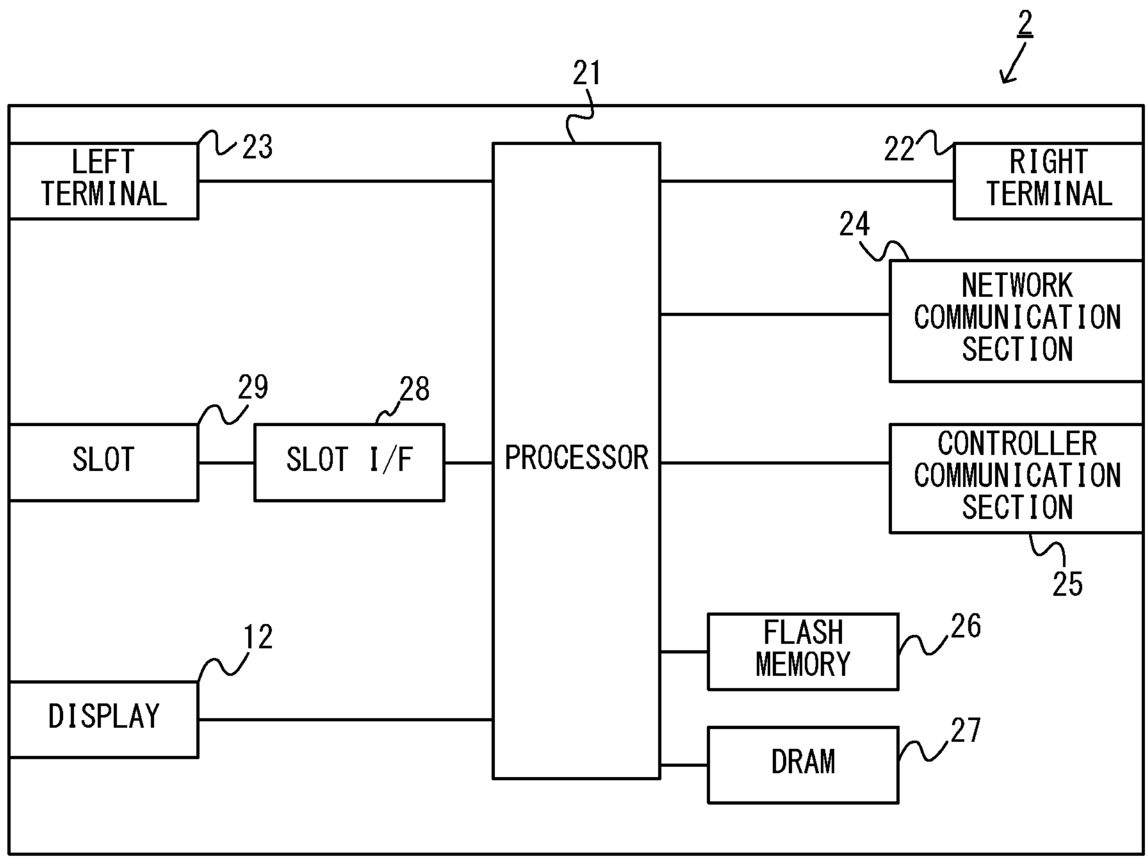
FIG. 2 is an example non-limiting block diagram showing an example of the internal configuration of a main body apparatus.

FIG. 2 is a block diagram showing an example of the internal configuration of the main body apparatus 2. As shown in FIG. 2, the main body apparatus 2 includes a processor 21. The processor 21 is an information processing section for executing various types of information processing (e.g., game processing) to be executed by the main body apparatus 2, and for example, includes a CPU (Central Processing Unit) and a GPU (Graphics Processing Unit). Note that the processor 21 may be configured only by a CPU, or may be configured by a SoC (System-on-a-Chip) that includes a plurality of functions such as a CPU function and a GPU function. The processor 21 executes an information processing program (e.g., a game program) stored in a storage section (specifically, an internal storage medium such as a flash memory 26, an external storage medium attached to the slot 29, or the like), thereby performing the various types of information processing.

Further, the main body apparatus 2 also includes a display 12. The display 12 displays an image generated by the main body apparatus 2. In the exemplary embodiment, the display 12 is a liquid crystal display device (LCD). The display 12, however, may be a display device of any type. The display 12 is connected to the processor 21. The processor 21 displays a generated image (e.g., an image generated by executing the above information processing) and/or an externally acquired image on the display 12.

Further, the main body apparatus 2 includes a left terminal 22, which is a terminal for the main body apparatus 2 to perform wired communication with the left controller 3, and a right terminal 23, which is a terminal for the main body apparatus 2 to perform wired communication with the right controller 4.

Further, the main body apparatus 2 includes a flash memory 26 and a DRAM (Dynamic Random Access Memory) 27 as examples of internal storage media built into the main body apparatus 2. The flash memory 26 and the DRAM 27 are connected to the processor 21. The flash memory 26 is a memory mainly used to store various data (or programs) to be saved in the main body apparatus 2. The DRAM 27 is a memory used to temporarily store various data used for information processing.

The main body apparatus 2 includes a slot 29. The slot 29 is so shaped as to allow a predetermined type of storage medium to be attached to the slot 29. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of a game application or the like) used by the main body apparatus 2 and/or a program (e.g., a game program or the like) executed by the main body apparatus 2.

The main body apparatus 2 includes a slot interface (hereinafter abbreviated as "I/F") 28. The slot I/F 28 is connected to the processor 21. The slot I/F 28 is connected to the slot 29, and in accordance with an instruction from the processor 21, reads and writes data from and to the predetermined type of storage medium (e.g., a dedicated memory card) attached to the slot 29.

The processor 21 appropriately reads and writes data from and to the flash memory 26, the DRAM 27, and each of the above storage media, thereby performing the above information processing.

The main body apparatus 2 includes a network communication section 24. The network communication section 24 is connected to the processor 21. The network communication section 24 performs wired or wireless communication with an external apparatus via a network. In the exemplary embodiment, as a first communication form, the network communication section 24 connects to a wireless LAN and communicates with an external apparatus, using a method compliant with the Wi-Fi standard. Further, as a second communication form, the network communication section 24 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 communicate with each other directly or indirectly via an access point to transmit and receive data.

The main body apparatus 2 includes a controller communication section 25. The controller communication section 25 is connected to the processor 21. The controller communication section 25 wirelessly communicates with the left controller 3 and/or the right controller 4. The communication method between the main body apparatus 2 and the left controller 3 and the right controller 4 is optional. In the exemplary embodiment, the controller communication section 25 performs communication compliant with the Bluetooth (registered trademark) standard with the left controller 3 and with the right controller 4.

The processor 21 is connected to the left terminal 23 and the right terminal 22. When performing wired communication with the left controller 3, the processor 21 transmits data to the left controller 3 via the left terminal 23 and also receives operation data from the left controller 3 via the left terminal 23. Further, when performing wired communication with the right controller 4, the processor 21 transmits data to the right controller 4 via the right terminal 22 and also receives operation data from the right controller 4 via the right terminal 22. As described above, in the exemplary embodiment, the main body apparatus 2 can perform both wired communication and wireless communication with each of the left controller 3 and the right controller 4.

It should be noted that, in addition to the elements shown in FIG. 2, the main body apparatus 2 includes a battery that supplies power and an output terminal for outputting images and audio to a display device (e.g., a television) separate from the display 12.

(Overview of Game)

Next, an overview of a game executed in the game system 1 is described. A game according to the exemplary embodiment is a racing game where a plurality of movable objects are caused to run on a field in a virtual space (a game space).

A movable object is an object that moves on the ground, such as a vehicle, a motorcycle, a bicycle, a horse, or a runner. The movable object comes in a plurality of types different in shape, size, power, and the like. A player selects the type of movable object and performs the racing game. The movable object is not limited to an object that moves on the ground, and may be an object that moves on water or under water, such as a ship, a boat, or a submarine. The movable object may be an object that moves in the air, such as an airplane, a helicopter, or a glider. The movable object may be a character itself, and a racing game where the character itself runs along a course or swims may be performed.

In a case where the movable object is an object that moves on the ground, such as a vehicle, the movable object moves along a course provided in the game space (the virtual space). The movable object, however, does not necessarily need to be always in contact with the course, and may be able to temporarily separate from the course and fly in the sky.

The following description is given on the assumption that the game is performed using a plurality of movable objects that move on the ground, such as vehicles.

Figure 3:
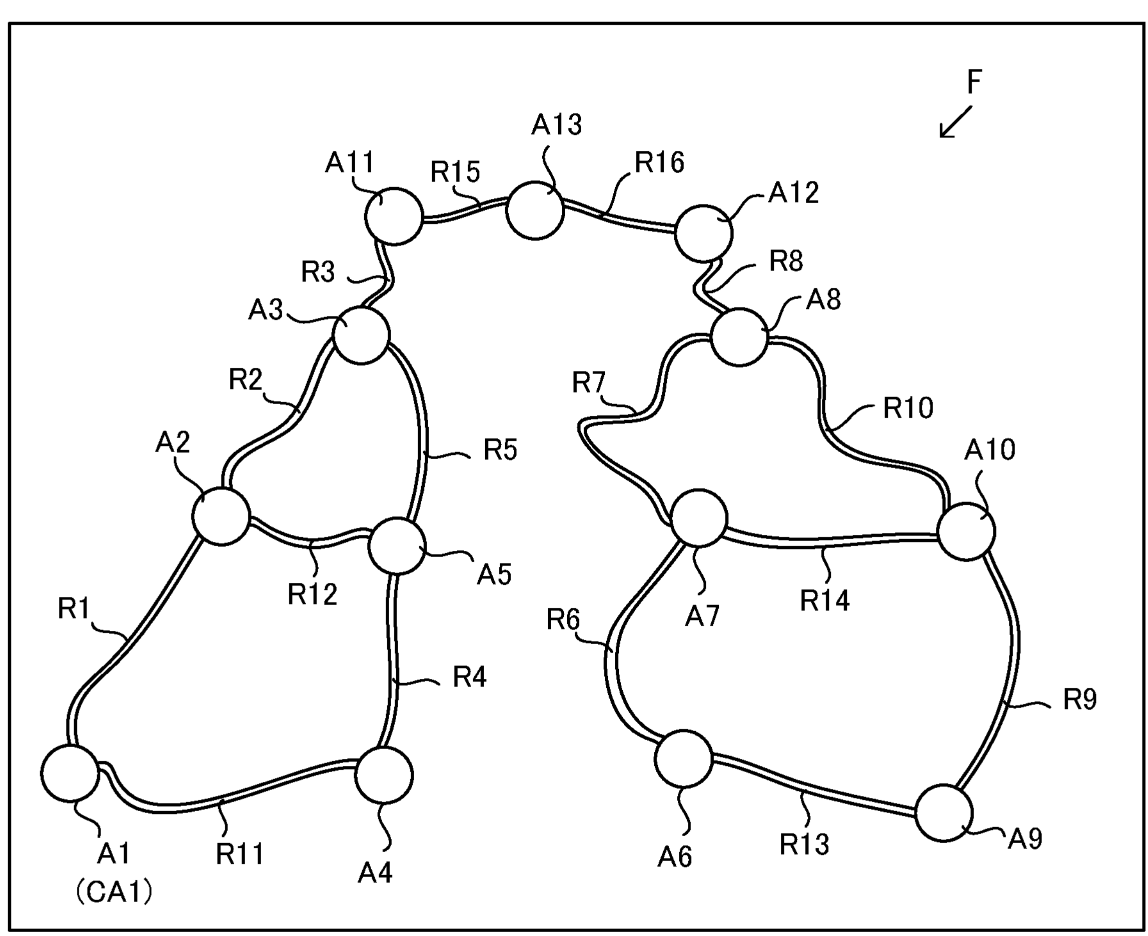
FIG. 3 is an example non-limiting diagram showing an example of a field in a virtual space.

FIG. 3 is a diagram showing an example of the field in the virtual space. As shown in FIG. 3, a plurality of base areas A (A1 to A13 in FIG. 3) are set on a field F in the virtual space. Although each base area A is represented as a circle in FIG. 3, each base area A is an area where the plurality of movable objects placed at predetermined positions in the virtual space can race. In each base area A, an intra-base route CA where each movable object can move is set. For example, in the base area A1, an intra-base route CA1 for the race around which the plurality of movable objects can take a lap is set. For example, the base area A2 is a city, and an intra-base route CA2 which is provided in the city and around which the plurality of movable objects can take a lap is set in the base area A2. A player can perform a racing game (a plurality of types of games described below) where each movable object takes a predetermined number of laps around the intra-base route CA set in each base area.

A plurality of base areas are linked together by inter-base routes R (e.g., R1 to R16) where each movable object can move. For example, the base areas A1 and A2 are linked together by the inter-base route R1. The base areas A1 and A4 are linked together by the inter-base route R11.

Hereinafter, an inter-base route R connecting base areas is occasionally referred to simply as a "route R". An intra-base route CA provided in a base area is occasionally referred to simply as a "route CA".

Figure 4:
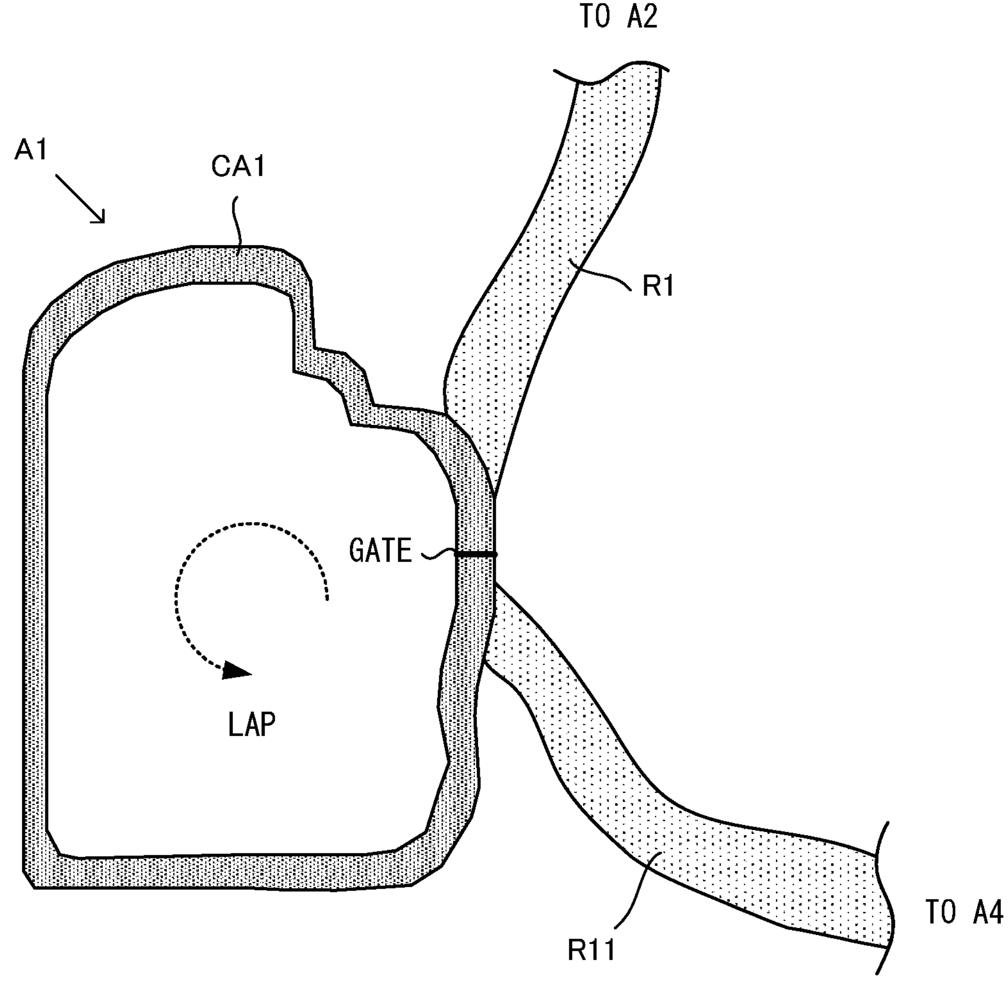
FIG. 4 is an example non-limiting diagram showing an example of a base area A1 and is an example non-limiting diagram showing parts of inter-base routes connecting the base area A1 and other base areas.

FIG. 4 is a diagram showing an example of the base area A1 and is a diagram showing parts of inter-base routes connecting the base area A1 and other base areas.

As shown in FIG. 4, in the base area A1, an intra-base route CA1 is provided. The route CA1 is a region where each movable object can move, and a road is formed along the route CA1. The movable object moves along the route CA1. For example, a racing game where a plurality of movable objects relating to a plurality of players compete on the rankings (or the times) until the plurality of movable objects take a predetermined number of laps around the route CA1 is performed. The plurality of movable objects start from a gate, move along a forward direction on the route CA1, pass through the gate a predetermined number of times, and reach the goal (the gate).

Here, a "course" refers to a path in which each movable object advances in the racing game, and is a path from a starting point to a goal point. A "forward direction" refers to a direction along the course, and is a direction from the starting point to the goal point set on the course. The movable object can move in a direction opposite to the forward direction, but if the movable object advances by a predetermined distance in the opposite direction, the moving direction of the movable object may be corrected so that the movable object moves along the forward direction.

The intra-base route CA1 is connected to the inter-base route R1. The inter-base route R1 is a region where each movable object can move, and a road is formed along the route R1. The boundary between the route CA1 and the route R1 is a continuous way. Similarly, the route CA1 is connected to the route R11. The boundary between the route CA1 and the route R11 is a continuous way. As shown in FIG. 4, the width of the way of each of the routes R1 and R11 is wider than the width of the way of the route CA1 of the base area A1. Depending on the type and the course of the racing game, for example, a predetermined obstacle is placed on the route CA1, and the movement path of the movable object is controlled. For example, in a case where a racing game where each movable object takes a predetermined number of laps around the route CA1 is performed, a predetermined obstacle is placed at the boundary between the route CA1 and the route R1, and the course is defined so that the movable object does not enter the route R1. Similarly, a predetermined obstacle is placed at the boundary between the route CA1 and the route R11, and the course is defined so that the movable object does not enter the route R11. In a case where the movable object can cross the boundary between the route CA1 and the route R1 and enter the route R1, the predetermined obstacle is not placed at the boundary between the route CA1 and the route R1. In a case where the movable object can cross the boundary between the route CA1 and the route R11 and enter the route R11, the predetermined obstacle is not placed at the boundary between the route CA1 and the route R11.

The forward direction may differ depending on the set course. For example, on a certain course, the direction in which each movable object goes counterclockwise around the route CA1 is set as the forward direction, and on another course, the direction in which each movable object goes clockwise around the route CA1 is set as the forward direction. On a certain course, on the route R1, a direction from the base area A1 to the base area A2 is set as the forward direction, and on another course, a direction from the base area A2 to the base area A1 is set as the forward direction.

Here, the modes of the game are described. In the exemplary embodiment, there are a single-play mode where the game is performed by a single player, and a multiplay mode where the game is performed by a plurality of players.

In the single-play mode, a single player controls a single movable object (operating object) using the controllers 3 and/or 4, and the processor 21 of the main body apparatus 2 controls other one or more movable objects, whereby a racing game using a plurality of movable objects is performed.

The multiplay mode includes an offline multiplay mode and an online multiplay mode. The offline multiplay mode is a mode where a plurality of controllers are connected to a single main body apparatus 2, or a plurality of main body apparatuses 2 are connected together via a wireless or wired LAN or the like, and a plurality of players perform the game. The plurality of players control movable objects relating to the plurality of players themselves using controllers.

In the online multiplay mode, a plurality of main body apparatuses 2 are connected to the Internet. Players control movable objects relating to the players themselves using controllers. For example, each main body apparatus 2 receives information regarding the movable objects relating to the other players (information indicating the positions, the orientations, the velocities, the moving directions, and the like of the movable objects) via the Internet or directly or via a server. The main body apparatus 2 transmits information regarding the movable object relating to the player of the main body apparatus 2 itself to the server or the other main body apparatuses 2. On the same course, each main body apparatus 2 controls the movable object relating to the player of the main body apparatus 2 itself and also controls the movable objects relating to the other players based on the information received from the other main body apparatuses via the server or directly.

Next, a description is given of a plurality of types of games that can be executed by a game program according to the exemplary embodiment. In the exemplary embodiment, various types of games are performed on a course set on the field including the plurality of base areas A and the plurality of routes R shown in FIG. 3. In the exemplary embodiment, first, a game determination process for determining which of the plurality of types of games are to be performed. In the game determination process, a player is allowed to select the type of game. In the game determination process, the player is allowed to select on which of a plurality of courses the selected type of game is to be performed. In the game determination process, the player is allowed to select whether to perform the game in the single-play mode or perform the game in the multiplay mode. The types of games are described below.

(First Game)

A first game is a racing game performed on a course including at least one inter-base route R set on the field and an intra-base route CA set in at least one base area A. In the first game, a plurality of courses are prepared in advance. In the game determination process, a player selects the first game and also selects any of the plurality of courses prepared for the first game, using a course selection screen.

Figure 5:
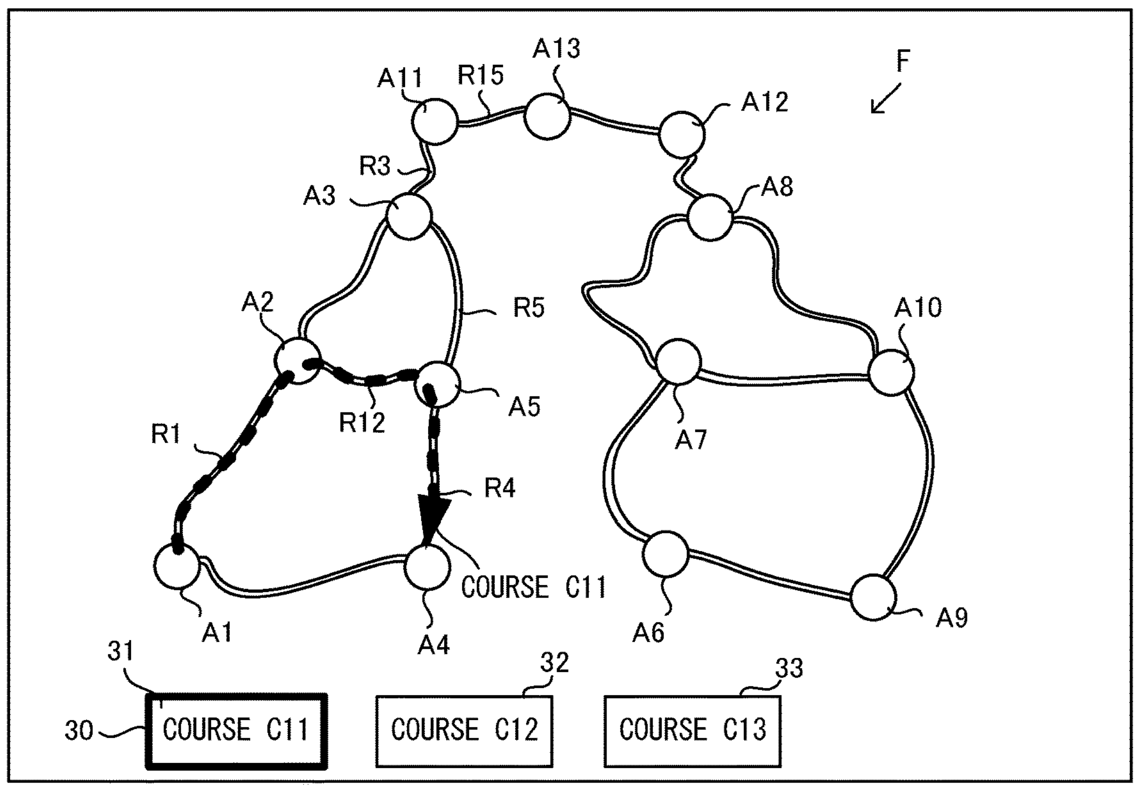
FIG. 5 is an example non-limiting diagram showing an example of a course selection screen for a first game.
Figure 6:
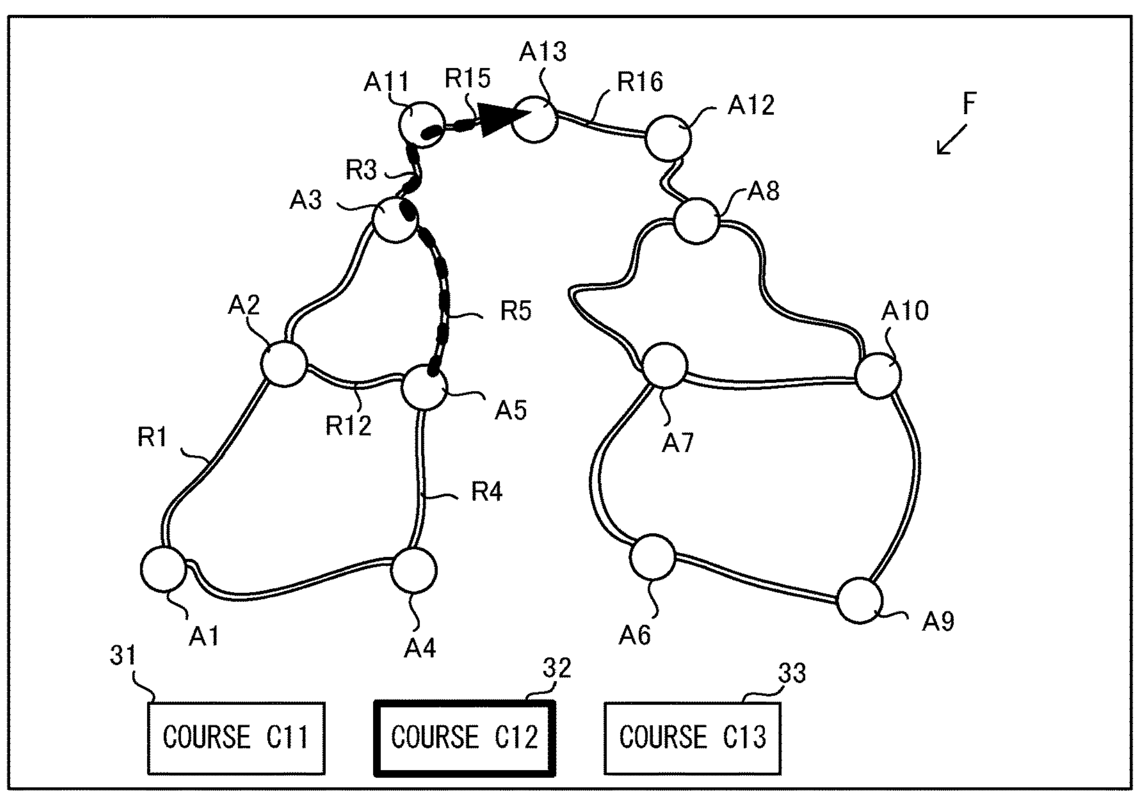
FIG. 6 is an example non-limiting diagram showing an example of the course selection screen for the first game when a course C12 is selected.

FIG. 5 is a diagram showing an example of the course selection screen for the first game. FIG. 6 is a diagram showing an example of the course selection screen for the first game when a course C12 is selected.

As shown in FIG. 5, for example, course icons 31 to 33 relating to a plurality of courses C11 to C13, respectively, are displayed on the course selection screen for the first game. In FIG. 5, a cursor 30 is placed at the position of the course icon 31, and the course C11 is selected. If the course C11 is selected, the details of the course C11 are displayed on the course selection screen. Specifically, a dashed arrow indicating the currently selected course C11 is displayed on the field F. The course C11 is a course including the base area A1, the route R1, the base area A2, the route R12, the base area A5, the route R4, and the base area A4. If the player gives an instruction to start the game in the state where the course C11 is selected, the course is set on the field, and the first game is started.

In FIG. 6, the cursor 30 is placed at the position of the course icon 32, and the course C12 is selected. As shown in FIG. 6, the course C12 is a course including the base area A5, the route R5, the base area A3, the route R3, the base area A11, the route R15, and the base area A13.

Here, the course C11 is specifically described among the plurality of courses that can be selected in the first game. FIG. 7 is a diagram showing an example of the course C11 in the first game.

As shown in FIG. 7, the course of the first game is divided into a plurality of small courses. For example, the course C11 is divided into a small course C11-0, a small course C11-1, a small course C11-2, and a small course C11-3.

The small course C11-0 is a course where each movable object takes a predetermined number of laps (e.g., three laps) around the intra-base route CA1 set in the base area A1. The small course C11-0 is a course where each movable object starts from a predetermined position (a gate) on the intra-base route CA1, takes a predetermined number of laps around the intra-base route CA1, and reaches a goal (the gate) provided on the intra-base route CA1. On the small course C11-0, each movable object takes a lap around the intra-base route CA1 without passing through an inter-base route R.

The small course C11-1 includes the inter-base route R1 and an intra-base route CA2 set in the base area A2. Specifically, the small course C11-1 is a course where each movable object starts from the base area A1, passes through the route R1, reaches the base area A2, takes a predetermined number of laps (e.g., one or more laps) around the route CA2, and reaches a goal (a gate) provided on the route CA2.

The small course C11-2 includes the inter-base route R12 and an intra-base route CA5 set in the base area A5. Specifically, the small course C11-2 is a course where each movable object starts from the base area A2, passes through the route R12, reaches the base area A5, takes a predetermined number of laps around the route CA5, and reaches a goal provided on the route CA5.

The small course C11-3 includes the inter-base route R4 and an intra-base route CA4 set in the base area A4. Specifically, the small course C11-3 is a course where each movable object starts from the base area A5, passes through the route R4, reaches the base area A4, takes a predetermined number of laps around the route CA4, and reaches a goal provided on the route CA4. In FIG. 7, a base area around which the movable object takes a lap is indicated by a solid circle, and a base area around which the movable object does not take a lap is indicated by a dashed circle.

Figure 8:
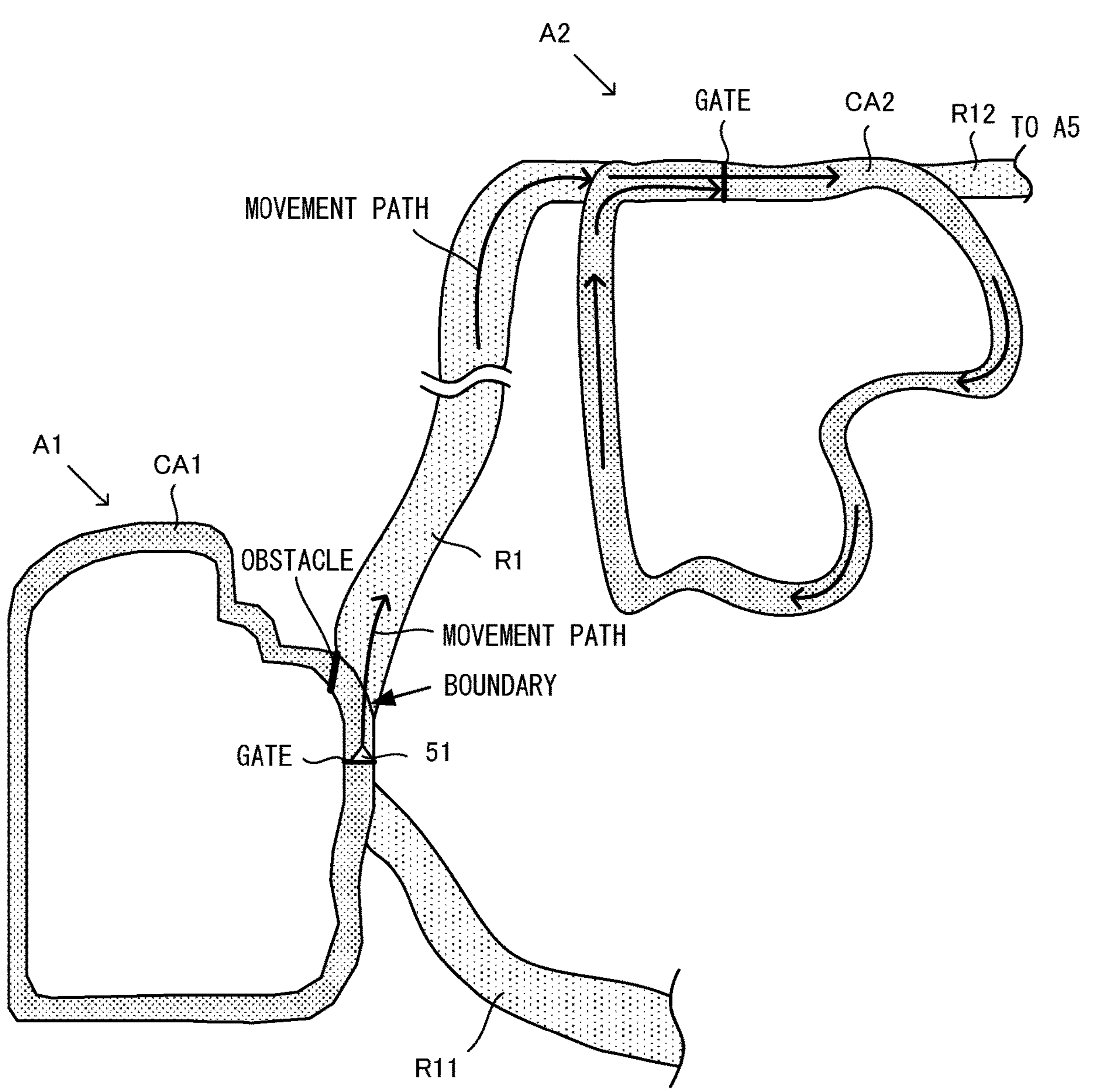
FIG. 8 is an example non-limiting diagram showing an example of a small course C11-1 in the first game.

When the first game is selected as the type of game and the course C11 in the first game is selected, and if an instruction to start the game is given, first, a small racing game GC11-0 by a plurality of movable objects is performed on the small course C11-0. If the plurality of movable objects take a predetermined number of laps around an intra-base route CA1, the small racing game GC11-0 ends, and the result of the small racing game GC11-0 is displayed. After the small racing game GC11-0 ends, next, a small racing game GC11-1 by a plurality of movable objects is performed on the small course C11-1. FIG. 8 is a diagram showing an example of the small course C11-1 in the first game.

As shown in FIG. 8, in the small racing game GC11-1 on the small course C11-1, a plurality of movable objects start moving from the gate on the intra-base route CA1 set in the base area A1. Specifically, the start position of each movable object 51 in the small racing game GC11-1 is set based on the ranking of the movable object 51 at the time when the small racing game GC11-0 ends. The number of coins owned by each movable object 51 at the time when the small racing game GC11-0 ends is carried over to the small racing game GC11-1. After starting moving from the gate of the route CA1, a movable object 51 enters the route R1 without taking a lap around the route CA1. For example, an obstacle for guiding the movable object 51 to the route R1 is placed on the route CA1. When the small course C11-1 is set, the obstacle is set. The movable object 51 is guided to the route R1 by the obstacle. The movable object 51 having entered the route R1 moves along the route R1 as indicated by arrows in FIG. 8. Then, the movable object 51 reaches the base area A2 and enters the intra-base route CA2 set in the base area A2. The movable object 51 moves along the route CA2, takes a predetermined number of laps around the route CA2, and heads for a goal (a gate). For example, if the movable object 51 takes a lap around the route CA2 (if the movable object 51 passes through the gate of the route CA2 twice), the small racing game GC11-1 ends. When the small racing game GC11-1 ends, the result of the small racing game GC11-1 is displayed.

After the result of the small racing game GC11-1 is displayed, next, a small racing game GC11-2 is started on the small course C11-2. In the small racing game GC11-2, the movable object 51 starts from the gate of the intra-base route CA2, enters the route R12 without taking a lap around the route CA2, and heads for the next base area A5. If the movable object 51 enters the intra-base route CA5 set in the base area A5, takes a predetermined number of laps around the route CA5, and reaches a goal (a gate), the small racing game GC11-2 ends. When the small racing game GC11-2 ends, the result of the small racing game GC11-2 is displayed.

Further, as shown in FIG. 7, after the result of the small racing game GC11-2 is displayed, subsequently, a small racing game GC11-3 is started on the small course C11-3. In the small racing game GC11-3, the movable object 51 starts from the gate of the intra-base route CA5, enters the route R4 without taking a lap around the route CA5, and further enters the intra-base route CA4 set in the base area A4. Then, if the movable object 51 takes a predetermined number of laps around the route CA4 and reaches a goal (a gate), the small racing game GC11-3 ends. In accordance with the ranking of each movable object at the time when the small racing game GC11-3 ends, the result of the first game on the course C11 is displayed, and the first game ends.

With reference to FIGS. 9 to 14, a description is given of game images displayed on the display 12 of the main body apparatus 2 during the execution of the first game on the course C11. The game images may be displayed on a display device different from the display 12. In FIGS. 9 to 14, the description is given on the premise that the first game is performed in the single-play mode by a player A of the main body apparatus 2. The first game, however, may be performed in the multiplay mode.

Figure 9:
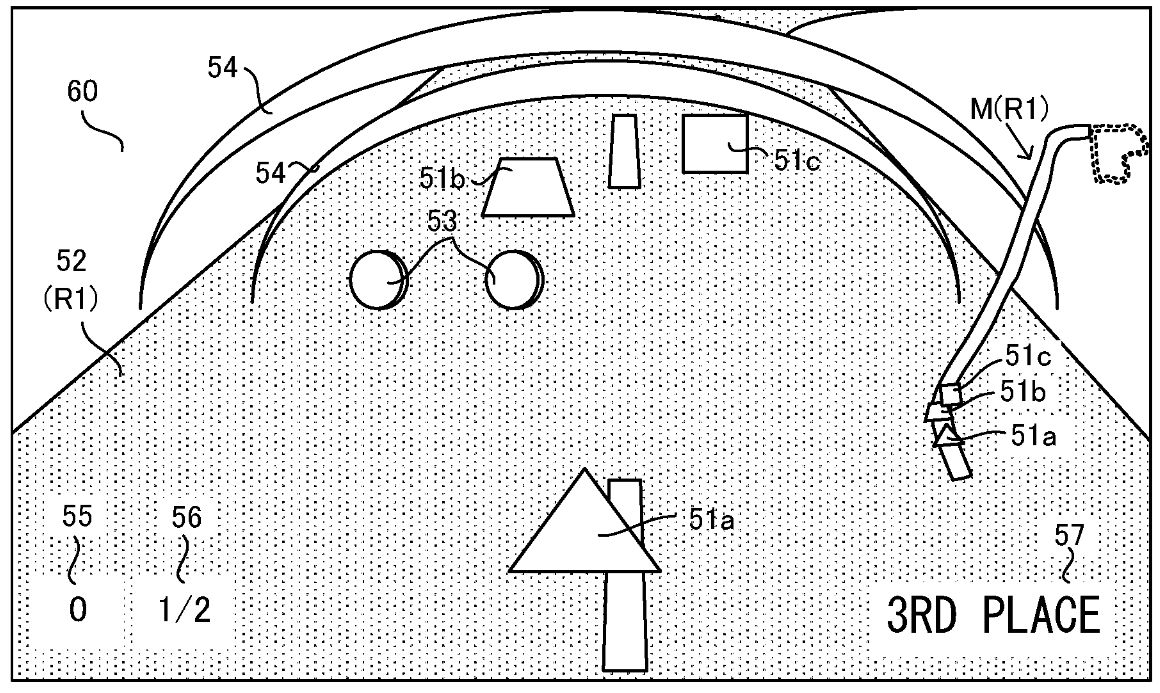
FIG. 9 is an example non-limiting diagram showing an example of a game image displayed after a small racing game GC11-1 starts on the small course C11-1.
Figure 10:
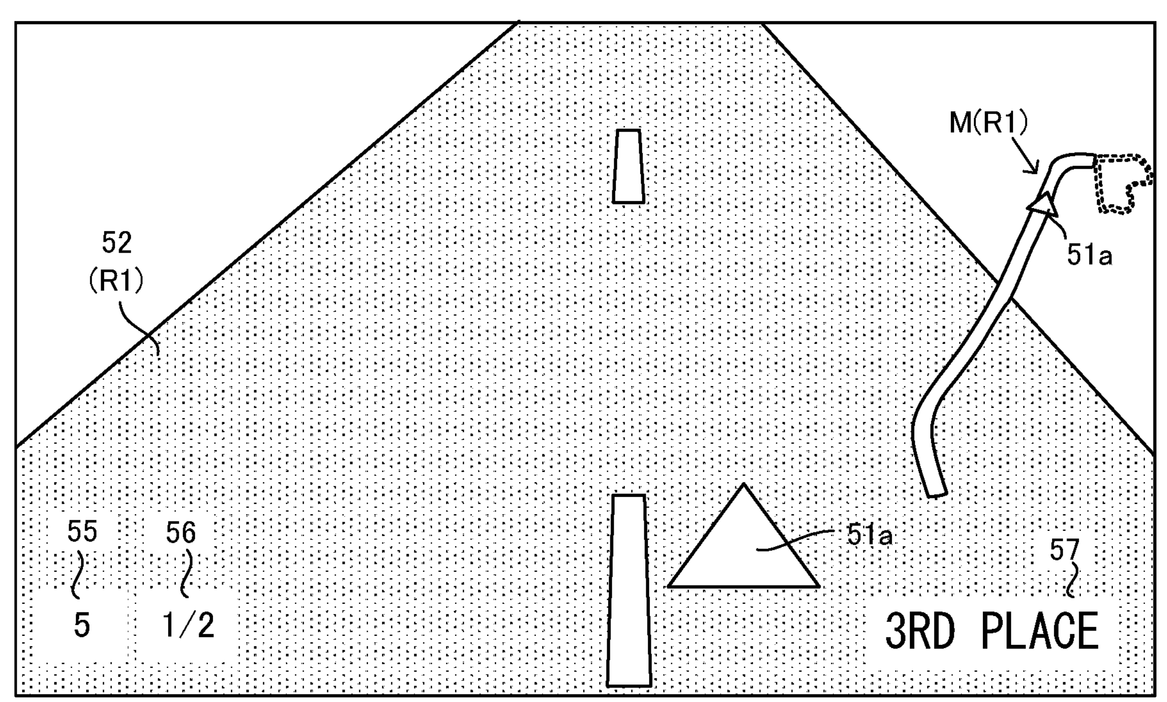
FIG. 10 is an example non-limiting diagram showing an example of a game image displayed after FIG. 9 and at the final stage of a route R1.
Figure 11:
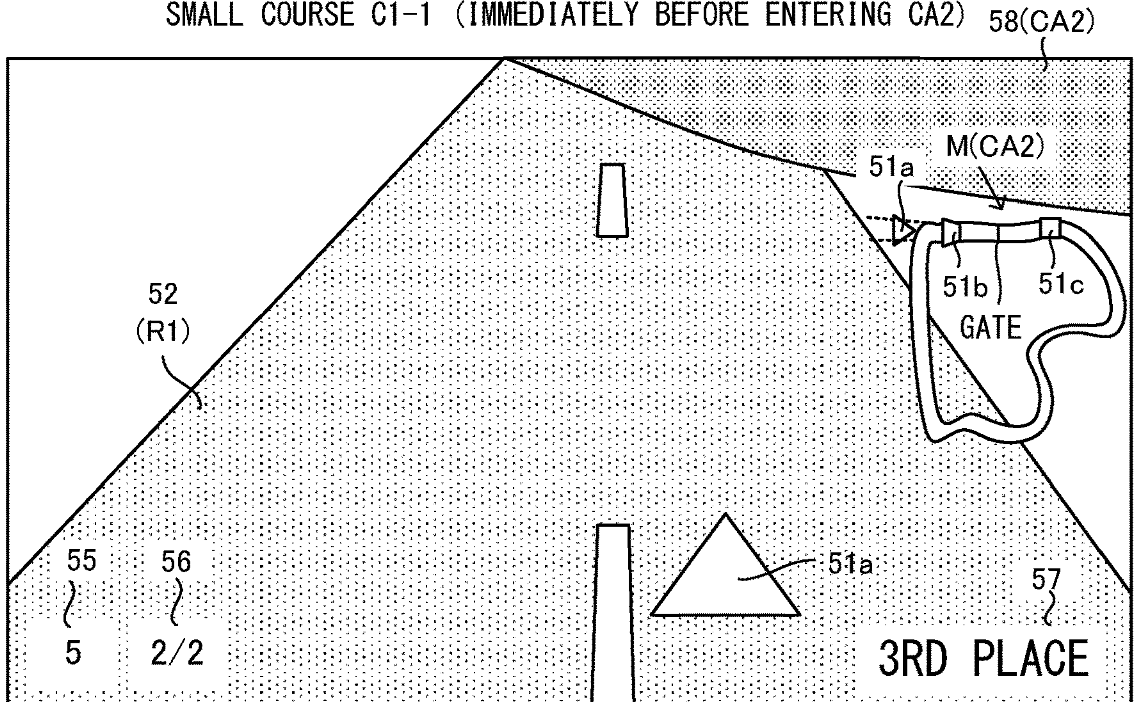
FIG. 11 is an example non-limiting diagram showing an example of a game image displayed after FIG. 10 and immediately before a movable object enters a route CA2 set in a base area A2.
Figure 12:
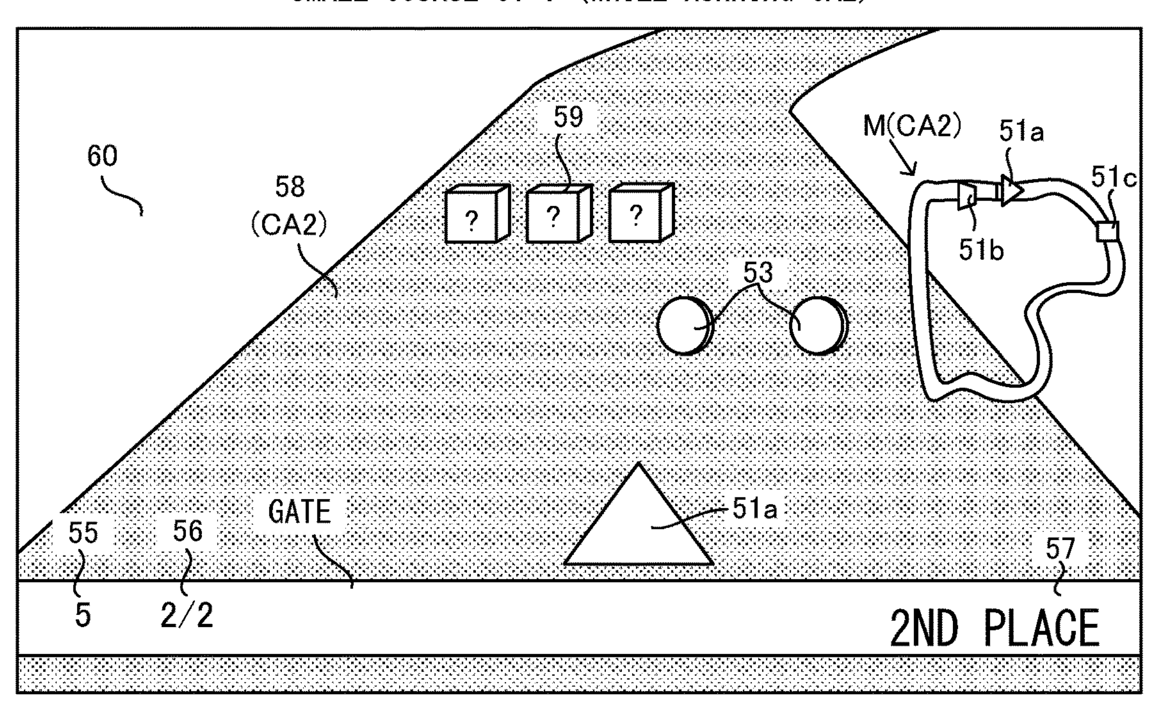
FIG. 12 is an example non-limiting diagram showing an example of a game image displayed after FIG. 11 and while the movable object is running in the route CA2.
Figure 13:
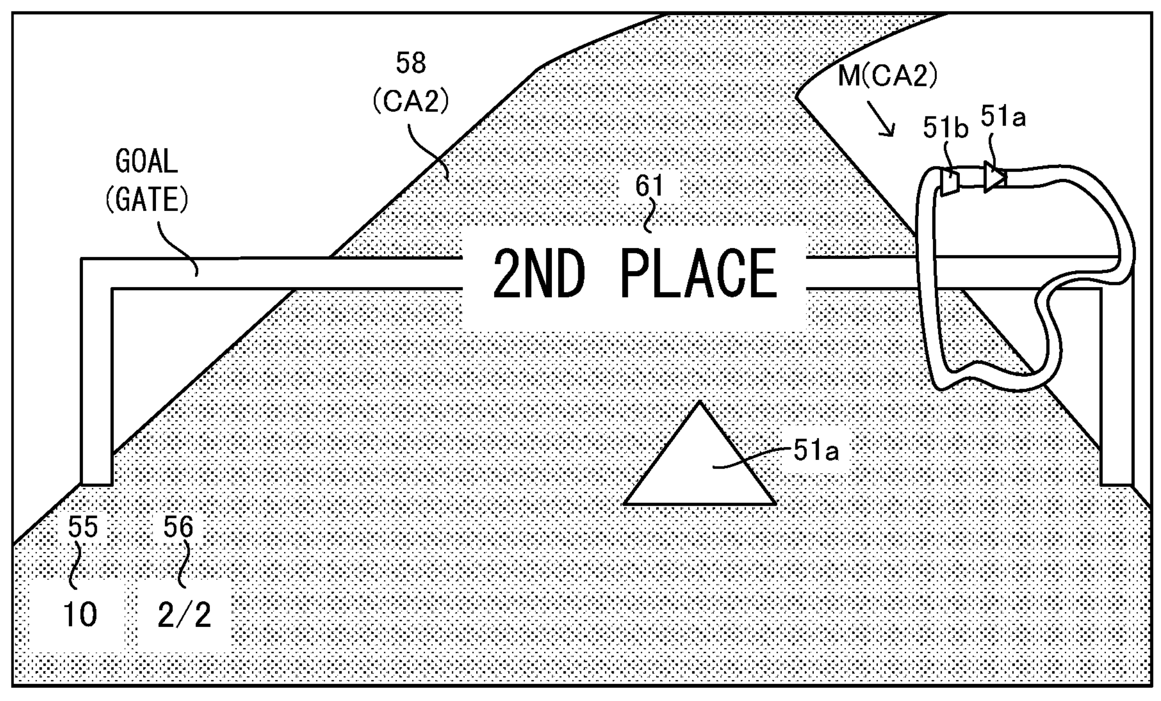
FIG. 13 is an example non-limiting diagram showing an example of a game image displayed after FIG. 12 and when the small racing game GC11-1 ends.
Figure 14:
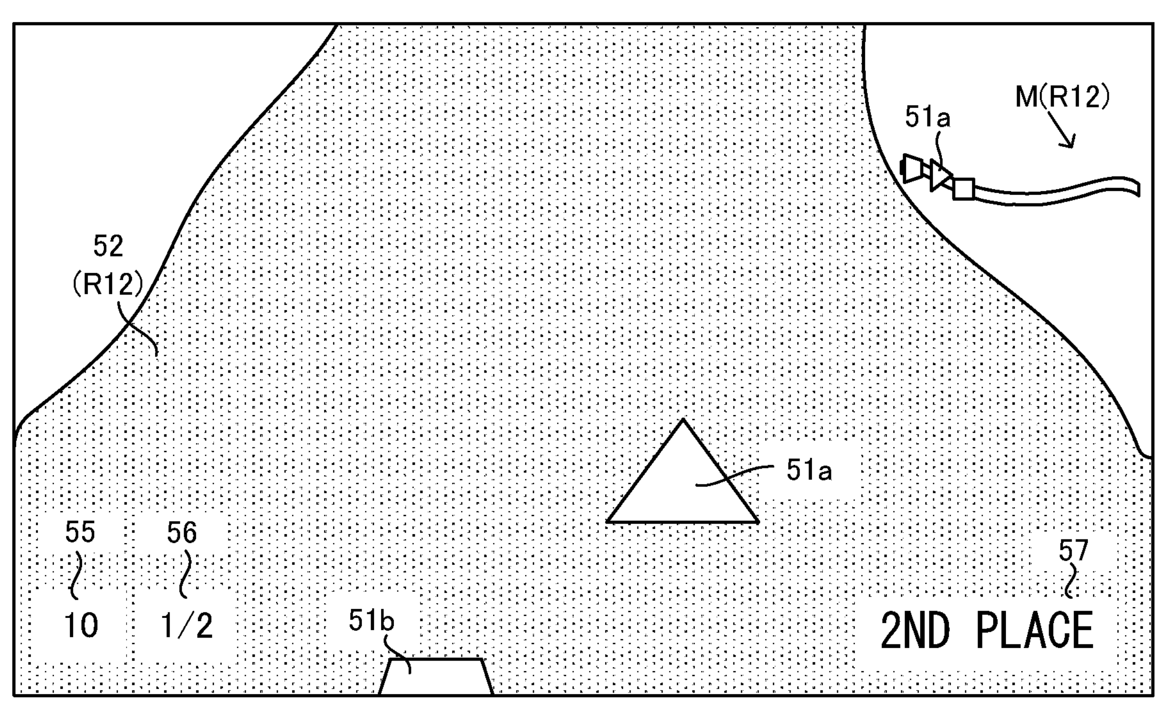
FIG. 14 is an example non-limiting diagram showing an example of a game image displayed after FIG. 13 and after a small racing game GC11-2 on a small course C11-2 starts.

FIG. 9 is a diagram showing an example of a game image displayed after the small racing game GC11-1 starts on the small course C11-1. FIG. 10 is a diagram showing an example of a game image displayed after FIG. 9 and at the final stage of the route R1. FIG. 11 is a diagram showing an example of a game image displayed after FIG. 10 and immediately before a movable object enters the route CA2 set in the base area A2. FIG. 12 is a diagram showing an example of a game image displayed after FIG. 11 and while the movable object is running in the route CA2. FIG. 13 is a diagram showing an example of a game image displayed after FIG. 12 and when the small racing game GC11-1 ends. FIG. 14 is a diagram showing an example of a game image displayed after FIG. 13 and after the small racing game GC11-2 on the small course C11-2 starts.

As shown in FIG. 9, the display 12 of the main body apparatus 2 displays a movable object 51*a*, a movable object 51*b*, a movable object 51*c*, a road 52, and a map image M. The movable object 51*a* is an operating object operated by the player A of the main body apparatus 2. For example, the movable object 51*a* moves forward in accordance with the pressing of the A-button of the right controller 4. The moving direction of the movable object 51*a* is controlled in accordance with a direction operation input provided using the analog stick of the left controller 3. A virtual camera is placed behind the movable object 51*a*, and the virtual camera moves in the virtual space in accordance with the movement of the movable object 51*a*. A game image obtained by viewing the virtual space from the virtual camera is generated at predetermined frame time intervals (e.g., 1/60-second intervals), and the game image is displayed on the display 12.

The movable objects 51*b* and 51*c* are other movable objects different from the operating object controlled by the player A. If the game is performed in the single-play mode, the movable objects 51*b* and 51*c* are controlled by the processor 21 of the main body apparatus 2. If the game is performed in the multiplay mode, the movable objects 51*b* and 51*c* may be controlled by other players. A race is performed using the movable objects 51*a* to 51*c*. In addition to the movable objects 51*b* and 51*c*, a plurality of movable objects 51 controlled by the processor 21 (or other players) may participate in the race. Hereinafter, a plurality of movable objects will be collectively referred to as "movable objects 51".

In addition to the movable objects 51 participating in the race, an object of which the movement is controlled by the processor 21 and which does not participate in the race may be placed on the course. Such an object that does not participate in the race is an object that functions as an obstacle to the movable objects 51 participating in the race, and is an object different from the "movable objects 51". For example, the object that functions as the obstacle moves along the course or moves in a direction opposite to the forward direction of the course. Each movable object 51 moves while avoiding a collision with such an object that functions as an obstacle.

The road 52 is a way formed along the inter-base route R1. The plurality of movable objects 51 run on the road 52. The road 52 has a first width. Each movable object 51 can go beyond the width of the road 52, enter a ground 60, and move on the ground 60. However, friction is greater on the ground 60 than on the road 52. Thus, if the movable object 51 runs on the ground 60, the velocity of the movable object 51 decreases.

If a movable object 51 goes out of a second range including the road 52 set along the route R1, the movable object 51 is returned into the route R1. Here, the second range is wider than a first range including a road 58 set along an intra-base route CA described below. For example, if the movable object 51 moves from the boundary set between the road 52 and the ground 60 beyond a second distance, it may be determined that the movable object 51 deviates from the route R1. Here, the second distance is set to be fairly great relative to the width of the way, whereby it is possible to perform the race by freely taking a course while looking for a significant shortcut or the like on an inter-base route. The deviation may be determined based on the distance from the center of the route, instead of the distance from the boundary. The second range is the width of the way of the road 52. If the movable object 51 goes beyond the width of the way of the road 52, it may be determined that the movable object 51 deviates from the route R1. If the movable object 51 deviates from the route R1, the movable object 51 is forcibly returned onto the road 52. Specifically, a route R is internally divided into a plurality of sections, and if the movable object 51*a* deviates from the route R1 while running in a certain section of the route R, the movable object 51*a* is returned to an initial position in the certain section. The initial position may be the position closest to a start position in the certain section, or may be the center of the certain section.

On the right side of the game image, a map image M (R1) is displayed. The map image M is a map indicating at least a part of a route that the movable object 51*a* is running. As shown in FIG. 9, while the movable object 51*a* is running the route R1, the map image M (R1) indicating the entirety of the route R1 is displayed. The map image M (R1) includes icon images indicating the current positions of the movable objects 51*a* to 51*c* on the route R1. The map image M (R1) also includes an image indicating at least a part of the intra-base route CA2 set in the base area A2 beyond the route R1 (an image indicated by a dashed line).

The map image M (R1) may include the image indicating the entirety of the route R1 that the movable object 51*a* is running (an image indicated by a solid line), and may not include the image indicating the intra-base route CA2 (the image indicated by the dashed line).

Here, if the movable object 51*a* is running an inter-base route, the map image M displays information indicating a wider range in the field than while the movable object 51*a* is running an intra-base route. That is, the map image M displayed while the movable object 51*a* is running an inter-base route includes a wider range in the field than the map image M displayed while the movable object 51*a* is running an intra-base route.

On the route R1, a plurality of coins 53 are also placed. Each movable object 51 acquires a coin 53 during the first game. The number of coins 53 acquired by the movable object 51*a* during the first game is displayed as number-of-coins display 55. The number of coins acquired by each movable object 51 during the game is reflected on the result of the game.

On the route R1, semicircular first item giving objects 54 are also placed. Specifically, the first item giving objects 54 are a gate formed of a single semicircle or a plurality of concentric semicircles different in radius from each other. The shape of the first item giving objects 54 is not limited to a semicircle, and may be any shape such as a circle or a rectangle. At a plurality of positions on the route R1, such first item giving objects 54 are placed.

If a movable object 51 comes into contact with the first item giving objects 54, the movable object 51 passes through the item giving objects 54 and also acquires an item. For example, if a movable object 51 passes through the inside of the semicircle indicated by the first item giving objects 54, an item is given to the movable object 51. Specifically, in the first item giving objects 54, a contact determination region (e.g., a region inside the semicircle) is set. If the movable object 51 passes through the contact determination region, it is determined that the movable object 51 comes into contact with the first item giving objects 54.

As shown in FIG. 9, the semicircle indicated by the first item giving objects 54 is wider than the width of the road 52. That is, the entirety of the road 52 is included inside the semicircle. Thus, even if the movable object 51 runs outside the road 52, but if the movable object 51 passes through the inside of the first item giving objects 54, the movable object 51 acquires the item. That is, even if the movable object 51 comes out of the road 52 to some extent, the movable object 51 can acquire the item. The first item giving objects 54 have a semicircle or a circle having a diameter at least equivalent to the width of the way, whereby it is possible to visually recognize the first item giving objects 54 from a distance, and it is easy to grasp a route even in an undulating place on an inter-base route. The width of the first item giving objects 54 may be narrower than the above second range set along the route R1, or may be the same as the second range, or may be wider than the second range.

The movable object 51 can use the item acquired by coming into contact with the first item giving objects 54 during the first game and advantageously advance the first game. The item comes in a plurality of types. For example, the plurality of types of items include an item that temporarily increases the velocity of the object itself (the movable object itself using the item), an item that disables an attack of another movable object 51, an item that attacks another movable object 51, an item that obstructs the running of another movable object 51, and the like. If a movable object 51 comes into contact with the first item giving objects 54, any of the plurality of types of items may be randomly given to the movable object 51. In accordance with the position of the first item giving objects 54, the game situation (e.g., the current ranking), or the like, an item determined in advance may be given to the movable object 51. There may be an item likely to be given and an item less likely to be given in accordance with the position where the first item giving objects 54 are placed, the game situation, or the like.

At the lower left of the game image, lap display 56 indicating the degree of progress of the small racing game GC11-1 is displayed. The lap display 56 displays lap information relating to the number of times a movable object 51 passes through a gate of an intra-base route CA. Specifically, the lap display 56 is represented by a fraction. The denominator is a value relating to the number of times the movable object 51*a* is to pass through the gate until the movable object 51*a* reaches the goal in the entirety of the small course C11-1 (the route R1 and the route CA2). The numerator is a value relating to the number of times the movable object 51*a* passes through the gate (one at the start in FIG. 9).

At the lower right of the game image, ranking display 57 indicating the current ranking of the movable object 51*a* is displayed. The movable objects 51*b* and 51*c* going ahead of the movable object 51*a* are present in front of the movable object 51*a*, and therefore, the current ranking of the movable object 51*a* is "third place".

At the start of the small racing game GC11-1, a movable object 51 is placed at the gate of the route CA1 set in the base area A1. The movable object 51 starts from the gate. If a predetermined time elapses from the start, the movable object 51 enters the route R1, and the game image as shown in FIG. 9 is displayed. If the small racing game GC11-1 is started, the movable object 51 may start from a boundary portion between the route CA1 and the route R1, instead of the gate in the route CA1. The movable object 51 may also start from a predetermined position on the route R1. The movable object 51*a* may be automatically moved by the processor 21 from the gate of the route CA1 to the boundary portion between the route CA1 and the route R1 and controlled by the player A from the point where the movable object 51*a* crosses the boundary portion. The movable object 51*a* may also be controlled by the player A from the gate of the route CA1.

If the movable object 51*a* moves along the route R1, a game image shown in FIG. 10 is displayed. As is clear from the map image M (R1) in FIG. 10, the movable object 51*a* has moved to the final stage of the route R1. After FIG. 10, a game image shown in FIG. 11 is displayed.

In FIG. 11, a game image immediately before the movable object 51*a* enters the intra-base route CA2 is displayed. Beyond the road 52 where the movable object 51*a* is located, a road 58 formed along the intra-base route CA2 is displayed. As shown in FIG. 11, immediately before the movable object 51*a* enters the intra-base route CA2, the map image M switches from the map image M (R1) indicating the inter-base route R1 to a map image M (CA2) indicating the intra-base route CA2. While the movable object 51*a* is running the intra-base route CA2, the map image M (CA2) is displayed. The map image M displayed while the movable object 51*a* is running an intra-base route CA includes a narrower range in the field than the map image M displayed while the movable object 51*a* is running an inter-base route R. At the time when the map image M switches to the map image M (CA2), the lap display 56 is updated from "1/2" to "2/2".

At the time when the movable object 51*a* reaches the gate of the route CA2, the lap display 56 may be updated from "1/2" to "2/2". At this time, the map image M may switch from the map image M (R1) to the map image M (CA2). At the time when the movable object 51*a* reaches the boundary between the route R1 and the route CA2, the lap display 56 may be updated from "1/2" to "2/2", and the map image M may also switch.

If the movable object 51*a* further moves, the movable object 51*a* crosses the boundary between the route R1 and the route CA2 and enters the route CA2, and a game image shown in FIG. 12 is displayed. As shown in FIG. 12, this is immediately after the movable object 51*a* passes through the gate provided on the route CA2. The movable object 51*b* is located behind the movable object 51*a*, and the movable object 51*c* is located in front of the movable object 51*a*. Thus, the ranking display 57 indicates "second place".

The road 58 of the intra-base route CA2 has a second width narrower than the first width (the width of the road 52 of the inter-base route R1). Each movable object 51 may be able to go beyond the width of the road 58, enter the ground 60, and move on the ground 60. Even if the movable object 51 can move on the ground 60, friction is greater on the ground 60 than on the road 58. Thus, if the movable object 51 runs on the ground 60, the velocity of the movable object 51 decreases.

If a movable object 51 goes out of a first range including the road 58 set along the route CA2, the movable object 51 is returned into the route CA2. The first range is narrower than the above second range. For example, if the movable object 51 moves from the boundary set between the road 58 and the ground 60 beyond a first distance shorter than the second distance, it may be determined that the movable object 51 deviates from the route CA2. The deviation may be determined based on the distance from the center of the route, instead of the distance from the boundary. The first range is the width of the way of the road 58. If the movable object 51 goes beyond the width of the way of the road 58, it may be determined that the movable object 51 deviates from the route CA2. If the movable object 51 deviates from the route CA2, the movable object 51 is forcibly returned onto the road 58. Specifically, the route CA2 is divided into a plurality of sections, and if the movable object 51*a* deviates from the route CA2 while running in a certain section, the movable object 51*a* is returned to an initial position in the certain section. The movable object 51 may be configured not to move beyond the width of the road 58. In this case, at the time when the movable object 51 goes beyond the width of the road 58, the movable object 51 is forcibly returned onto the road 58.

As shown in FIG. 12, on the route CA2 (on the road 58 or at a position a predetermined distance above the road 58), a plurality of second item giving objects 59 are placed. If a movable object 51 comes into contact with the second item giving objects 59, the movable object 51 passes through the second item giving objects 59 and also acquires an item. For example, if a movable object 51 passes through the display area of the second item giving objects 59, an item is given to the movable object 51. In the second item giving objects 59, a contact determination region is set. If the movable object 51 passes through the contact determination region, it is determined that the movable object 51 comes into contact with the second item giving objects 59.

The item acquired when the movable object 51 comes into contact with the second item giving objects 59 are an item similar to the item acquired when the movable object 51 comes into contact with the first item giving objects 54. For example, if a movable object 51 comes into contact with the second item giving objects 59, any of the plurality of types of items may be randomly given to the movable object 51. In accordance with the position of the second item giving objects 59, the game situation (e.g., the current ranking), or the like, an item determined in advance may be given to the movable object 51. There may be an item likely to be given and an item less likely to be given in accordance with the position of the second item giving objects 59, the game situation, or the like. If a movable object 51 comes into contact with the second item giving objects 59, the second item giving objects 59 are erased. If a predetermined time elapses after the second item giving objects 59 are erased, the second item giving objects 59 appear again at this position.

While the second item giving objects 59 are erased, and if another movable object 51 passes through the region where the second item giving objects 59 have been displayed, the other movable object 51 may or may not be able to acquire the item. The second item giving objects 59 may also be placed on an inter-base route R. If the second item giving objects 59 are erased, the second item giving objects 59 may not appear again.

As described above, the first item giving objects 54 placed on an inter-base route R and the second item giving objects 59 placed on an intra-base route CA are item giving objects that give items to a movable object 51. As is clear from the comparison between FIGS. 9 and 12, the first item giving objects 54 placed on the inter-base route R is larger than the second item giving objects 59 placed on the intra-base route CA. Specifically, the first item giving objects 54 have a width wider than those of the second item giving objects 59. The height of the first item giving objects 54 is higher than the heights of the second item giving objects 59. Thus, the first item giving objects 54 are easily visually recognized by the player from a relative distance. The inter-base route R connecting base areas is larger than the intra-base route CA, and the width of the way of the route R is wider than the width of the way of the route CA. Since the first item giving objects 54 have a width and a height greater than those of the second item giving objects 59, even if the route R is larger than the route CA, the player easily visually recognizes the first item giving objects 54 when moving the movable object 51*a* on the route R1, and can easily acquire the item.

On the route CA2, coins 53 are placed similarly to a route R. A movable object 51 can acquire the coins 53 also while running an intra-base route CA.

From the state shown in FIG. 12, the movable object 51*a* further moves along the route CA2 and takes a predetermined number of laps around the route CA2. Here, the movable object 51*a* takes a lap around the route CA2.

If the movable object 51*a* takes a lap around the route CA2 from the state shown in FIG. 12, a game image shown in FIG. 13 is displayed. As shown in FIG. 13, if the movable object 51*a* reaches the gate of the route CA2, a result image 61 indicating the result of the small racing game GC11-1 is displayed, and the small racing game GC11-1 ends. The race may end after all the movable objects reach the goal after the ranking is displayed. In a case where an opponent is not another player or the like, the race may end when the movable object 51*a* reaches the goal. In FIG. 13, an image indicating "second place" is displayed as the result image 61 of the small racing game GC11-1. In accordance with the number of coins owned by the movable object 51*a* at the time when the small racing game GC11-1 ends, the result of the small racing game GC11-1 may be displayed.

If the small racing game GC11-1 ends, the small racing game GC11-2 is started on the small course C11-2 based on an instruction given by the player. The small racing game GC11-2 is started in accordance with the result of the immediately preceding small racing game GC11-1. Specifically, the start position of each movable object 51 in the small racing game GC11-2 is set based on the ranking of the movable object 51 at the time when the small racing game GC11-1 ends. The number of coins owned by each movable object 51 at the time when the small racing game GC11-1 ends is carried over to the small racing game GC11-2.

As shown in FIG. 14, if the small racing game GC11-2 is started, a map image M (R12) indicating the route R12 on the small course C11-2 is displayed. If the movable object 51*a* moves along the route R12, enters the route CA5 provided in the base area A5, and takes a predetermined number of laps around the route CA5, the small racing game GC11-2 ends. Further, then, the small racing game GC11-3 is started on the small course C11-3. Then, if the small racing game GC11-3 ends, the first game on the course C1I ends.

After the first game ends, a transition may be made to a free running mode for freely moving the movable object 51*a* on the field. In the free running mode, the player can freely move the movable object 51*a* regardless of the course on the field. If the player provides a predetermined operation input in the free running mode, the type of race may be determined and an instruction to start the race may be given based on the predetermined operation input, and a next race may be started. After the first game ends, a transition may be made once to a title screen, a menu screen, or the like when the game starts. Then, in accordance with an operation of the player or regardless of the presence or absence of an operation of the player, a transition may be made to the free running mode.

As described above, in the first game according to the exemplary embodiment, a course including an inter-base route R connecting a first base area and a second base area and a route where a movable object takes a predetermined number of laps around an intra-base route CA set in the second base area and reaches a goal after the inter-base route R is set. Consequently, it is possible to set a variety of courses that are not included in a conventional racing game including an inter-base route and an intra-base route.

The above first game is merely an example, and may be modified as follows.

For example, in a variation of the first game, on each small course, the plurality of movable objects start from a gate of an intra-base route, take a predetermined number of laps around the intra-base route, and then enter an inter-base route R leading to a next base area, and if the plurality of movable objects reach the next base area, the plurality of movable objects may take a predetermined number of laps around an intra-base route provided in the next base area. For example, on the small course C11-1, the plurality of movable objects 51 may start from the gate of the intra-base route CA1, take a predetermined number of laps around the intra-base route CA1, then enter the inter-base route R1, reach the next base area A2, and take a predetermined number of laps around the intra-base route CA2 set in the base area A2.

On each small course, as at least some of the gates used for the starts, the goals, and the like, instead of a gate originally set on an intra-base route, another gate temporarily installed near the intra-base route may be used.

In a variation of the first game, on each small course, the plurality of movable objects may start from a gate of an intra-base route, take a predetermined number of laps around the intra-base route, then enter an inter-base route R leading to a next base area, reach the next base area, and reach a goal provided on an intra-base route provided in the next base area without taking a lap around the intra-base route.

In the above description, on a small course, the plurality of movable objects pass through a single inter-base route R, reach a base area, and take a predetermined number of laps around an intra-base route provided in the base area. In a variation of the first game, the plurality of movable objects may pass through a plurality of inter-base routes R, reach a base area, and take a predetermined number of laps around an intra-base route provided in the base area. That is, on a small course, the plurality of movable objects may start from a gate of an intra-base route, pass through a plurality of inter-base routes R without taking a lap (or after taking a predetermined number of laps) around the intra-base route, and take a predetermined number of laps around an intra-base route set in a base area that the plurality of movable objects reach last.

In a variation of the first game, a course may not be divided into small courses. For example, the course C11 shown in FIG. 7 may not be divided into the small courses C11-0 to C11-3, and may be set as a single course. In this case, a movable object 51 starts from the gate of the intra-base route CA1 (by taking a lap or without taking a lap around the intra-base route CA1), passes through the route R1, the base area A2, the route R12, the base area A5, and the route R4, enters the intra-base route CA4, takes a predetermined number of laps around the intra-base route CA4, and reaches the goal. In the base area A2 along the way, the movable object 51 may take a predetermined number of laps around the intra-base route CA2, or may pass through the intra-base route CA2 without taking a lap around the intra-base route CA2. Similarly, in the base area A5 along the way, the movable object 51 may take a predetermined number of laps around the intra-base route CA5, or may pass through the intra-base route CA5 without taking a lap around the intra-base route CA5.

(Second Game)

Next, a second game is described. In the second game, a course including a plurality of continuous inter-base routes R and an intra-base route CA set in a base area A that the plurality of inter-base routes R reach last is set. The second game may be performed in the single-play mode, or may be performed in the multiplay mode.

Figures 15, 16:
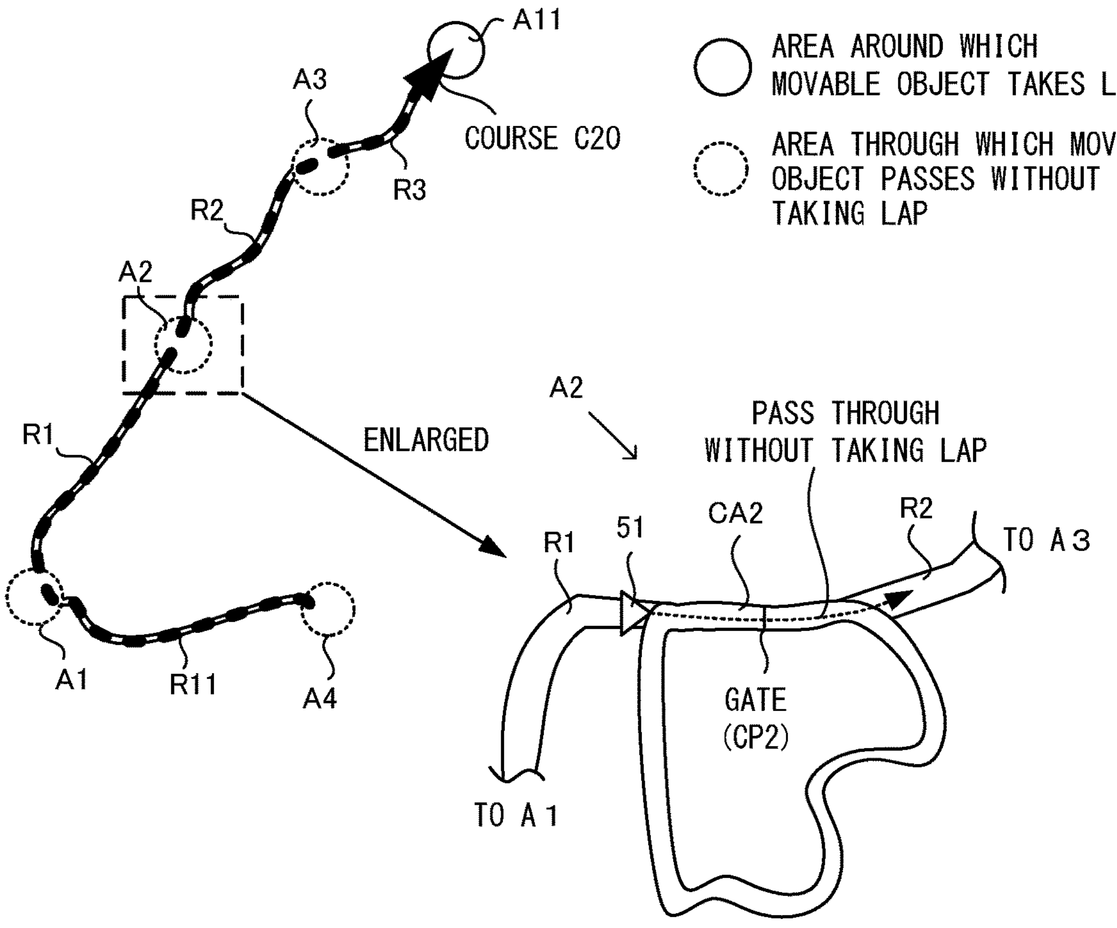
FIG. 15 is an example non-limiting diagram showing an example of a course C20 in a second game.
FIG. 16 is an example non-limiting diagram showing examples of race continuation conditions in the second game.

FIG. 15 is a diagram showing an example of a course C20 in the second game. FIG. 15 shows an example of the course C20 obtained by extracting a part of the field.

As shown in FIG. 15, the course C20 includes the inter-base routes R11, R1, R2, and R3 and an intra-base route CA11. A movable object 51 passes through a plurality of continuous inter-base routes R without taking a lap around an intra-base route CA provided in a base area A indicated by a dashed line, takes a predetermined number of laps around the route CA11 provided in the last base area A11, and reaches a goal.

Specifically, if the second game is started on the course C20, the plurality of movable objects 51 start from a gate provided on the intra-base route CA4 of the base area A4 and enter the inter-base route R11 without taking a lap around the intra-base route CA4. Each movable object 51 enters the intra-base route CA1 of the base area A1 from the route R11, passes through the gate of the intra-base route CA1 without taking a lap around the intra-base route CA1, and enters the inter-base route R1. Next, the movable object 51 enters the intra-base route CA2 of the base area A2 from the route R1, passes through the gate of the intra-base route CA2 without taking a lap around the intra-base route CA2, and enters the inter-base route R2. Further, the movable object 51 enters an intra-base route CA3 of the base area A3 from the route R2, passes through a gate of the intra-base route CA3 without taking a lap around the intra-base route CA3, and enters the route R3. Then, the movable object 51 enters the intra-base route CA11 of the last base area A11 from the route R3, takes a predetermined number of laps around the intra-base route CA11, and reaches a goal (a gate) provided on the route CA11. If the movable object 51 reaches the goal, the second game on the course C20 ends.

Here, in each base area A (each intra-base route CA), a checkpoint CP is set. For example, the checkpoint CP is set at the same position as the gate of the intra-base route CA or in a predetermined range including the gate. If a movable object 51 reaches the checkpoint CP, it is determined whether or not the movable object 51 satisfies a race continuation condition. If the movable object 51 satisfies the race continuation condition, the movable object 51 continues the race. Specifically, in accordance with the ranking of the movable object 51 when passing through the checkpoint CP, it is determined whether or not to cause the movable object 51 to continue the race. Here, in a case where the checkpoint CP has a wide range, a setting may be made so that if the movable object 51 passes through the checkpoint CP, the movable object 51 does not necessarily need to pass through the gate itself. As at least some of the gates in the second game, instead of a gate originally set on an intra-base route, another gate temporarily installed near the intra-base route may be used.

FIG. 16 is a diagram showing examples of race continuation conditions in the second game. As shown in FIG. 16, a checkpoint CP1 is set in the base area A1. The plurality of movable objects 51 start moving from the base area A4, pass through the route R11, and head for the base area A1. In accordance with the ranking of a movable object 51 when reaching the checkpoint CP1 provided in the base area A1, it is determined whether or not to cause the movable object 51 to continue the race. Specifically, if the ranking of a movable object 51 when reaching the checkpoint CP1 places top twelve, for example, it is determined that the movable object 51 is to be caused to continue the race. A movable object 51 of which the ranking when reaching the checkpoint CP1 places thirteenth or lower cannot continue the race, and drops out of the race at this time. That is, beyond the checkpoint CP1, the race is performed by the movable objects 51 placing top twelve.

The remaining twelve movable objects 51 pass through the route R1 and head for the next base area A2. A checkpoint CP2 is also set in the base area A2. Also at the checkpoint CP2, it is determined whether or not to cause a movable object 51 to continue the race. For example, a race continuation condition at the checkpoint CP2 is that the ranking of a movable object 51 when reaching the checkpoint CP2 places top ten.

The ten movable objects 51 passing through the checkpoint CP2 pass through the route R2 and head for the next base area A3. A checkpoint CP3 is also set in the base area A3. For example, a race continuation condition at the checkpoint CP3 is that the ranking of a movable object 51 when reaching the checkpoint CP3 places top eight.

The eight movable objects 51 passing through the checkpoint CP3 pass through the route R3 and head for the last base area A11. A checkpoint CP is not provided in the last base area A11. The eight movable objects 51 reach the base area A11, subsequently take a predetermined number of laps (one or more laps) around the intra-base route CA11, and head for the goal (the gate) provided on the intra-base route CA11.

A checkpoint CP4 may also be provided in the last base area A11. In this case, only a movable object 51 of which the ranking when reaching the checkpoint CP4 places top five, for example, may continue the race. Then, the remaining five movable objects 51 may take a predetermined number of laps around the intra-base route CA11 and reach the goal.

Figure 19:
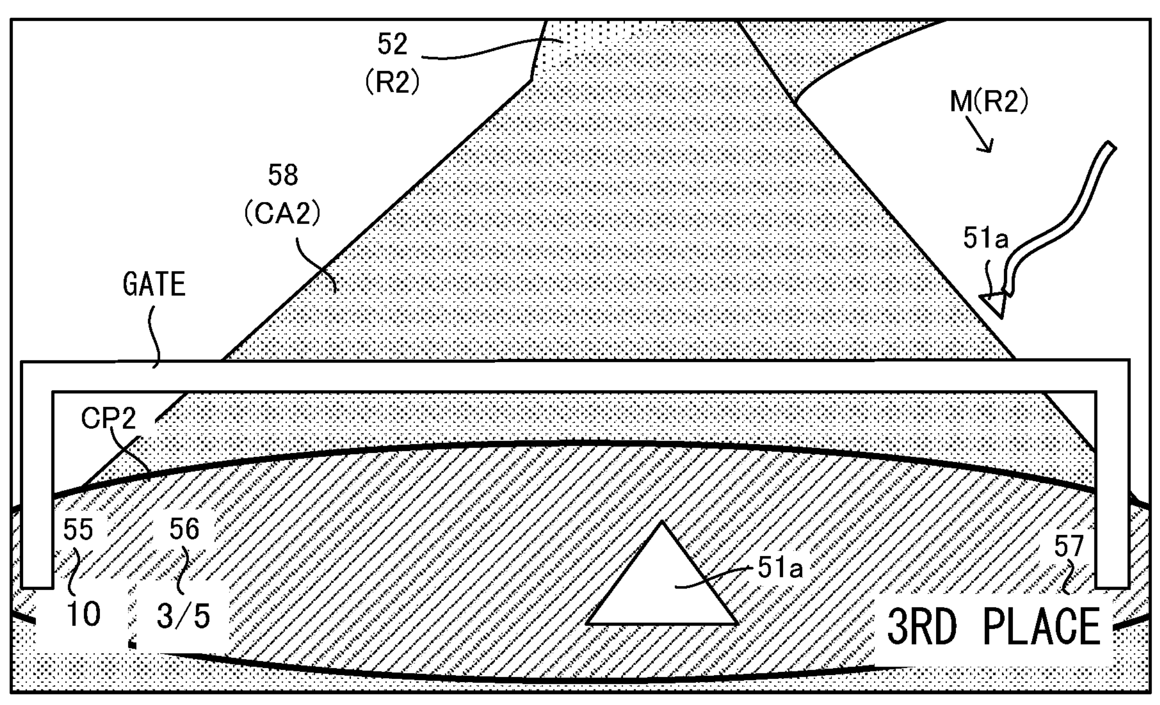
FIG. 19 is an example non-limiting diagram showing an example of a game image displayed after FIG. 18, and is an example non-limiting diagram showing an example of a game image displayed when the movable object reaches the checkpoint CP2.

FIG. 17 is a diagram showing an example of a game image displayed when the second game is performed on the course C20, and is a diagram showing an example of a game image displayed when a movable object is running the route R1. FIG. 18 is a diagram showing an example of a game image displayed after FIG. 17, and is a diagram showing an example of a game image displayed when the checkpoint CP2 can be viewed from a distance. FIG. 19 is a diagram showing an example of a game image displayed after FIG. 18, and is a diagram showing an example of a game image displayed when the movable object reaches the checkpoint CP2.

As shown in FIG. 17, during the second game, the movable object 51*a* (the operating object) relating to the player A of the main body apparatus 2 is displayed at the center of the screen. The movable objects 51*b* and 51*c* controlled by other players or the processor 21 are also displayed. The road 52 along the route R1, the map image M (R1), the lap display 56, and the ranking display 57 are also displayed. Although not shown in the figures, the first item giving objects 54 are additionally placed at a predetermined position on the route R1.

In FIG. 17, the lap display 56 in the second game indicates "2/5". On the course C20, from when the movable object 51*a* starts to when the movable object 51*a* reaches the goal, the movable object 51*a* passes through gates five times (the gates of the intra-base routes CA4, CA1, CA2, CA3, and CA11). The lap display 56 indicates that the movable object 51*a* passes through two gates (the gates of the intra-base routes CA4 and CA1).

The movable object 51*a* moves along the route R1 toward the next base area A2. While the movable object 51*a* is running the route R1, as shown in FIG. 18, an object indicating the checkpoint CP2 may be seen at a great distance. The checkpoint CP2 is provided at a predetermined position (e.g., the position of the gate) on the intra-base route CA2 of the base area A2. The object indicating the checkpoint CP2 is placed at the predetermined position and displayed so that the object is easily visually recognized by the player from a relatively distant position. For example, the object indicating the checkpoint CP2 may be a relatively large object extending upward in the virtual space, and may have a columnar shape. To the object indicating the checkpoint CP2, an image indicating a position for which the player heads next may be added. The same applies to a checkpoint CP set in another base area.

If the movable object 51*a* further moves along the route R1 from the position in FIG. 18, a game image shown in FIG. 19 is displayed. As shown in FIG. 19, the movable object 51*a* enters the intra-base route CA2 of the base area A2 and reaches the checkpoint CP2 provided at the position of the gate of the route CA2. If the ranking of the movable object 51*a* when reaching the checkpoint CP2 (or passing through the checkpoint CP2) places top ten, the movable object 51*a* continues the race. In FIG. 19, the ranking of the movable object 51*a* when reaching the checkpoint CP2 is the third place, and therefore, the movable object 51*a* continues the race.

In this case, as shown in FIG. 19, the lap display 56 is updated from "2/5" to "3/5". The movable object 51*a* passes through the checkpoint CP2, enters the route R2, and moves toward the next base area A3 without suspending the race. When the movable object 51*a* reaches the checkpoint CP2, and if the race is continued, display indicating the continuation of the race may be performed.

If the ranking of the movable object 51*a* when reaching the checkpoint CP2 places lower than tenth, the movable object 51*a* drops out of the race. In this case, display indicating dropping out of the race is performed, and the second game ends.

The course C20 shown in FIG. 15 is merely an example, and a plurality of courses are prepared for the second game. The player selects any of the plurality of courses for the second game and gives an instruction to start the game. If the instruction to start the game is given, the course selected by the player is set. For example, as a course C21 for the second game, a course where each movable object starts from the base area A4, passes through the inter-base routes R4, R5, and R3, and takes a predetermined number of laps around the intra-base route CA11 set in the base area A11 may be set. Also on the course C21, a checkpoint is provided between the routes R4 and R5 (in the base area A5), and a checkpoint is provided between the routes R5 and R3 (in the base area A3). A plurality of other courses for the second game are also set in advance.

Also in the second game, the first item giving objects 54 are placed on an inter-base route, and the second item giving objects 59 are placed on an intra-base route.

As described above, in the second game, a course including a plurality of continuous inter-base routes R is set. In the course for the second game, a plurality of checkpoints CP are provided. Specifically, a checkpoint CP is set in a base area A between two inter-base routes R. At each checkpoint CP, it is determined whether to cause a movable object 51 to continue the race or drop out of the race. This can encourage competition in the player and allow the player to perform a racing game incorporating an element of survival. The movable object 51 is caused to run the plurality of continuous inter-base routes R, whereby it is possible to perform a racing game using a wide range in the field.

After the second game ends, a transition may be made to the free running mode for freely moving the movable object 51*a* on the field. If the player provides a predetermined operation input in the free running mode, the type of race may be determined or an instruction to start the race may be given based on the predetermined operation input, and a next race may be started. After the second game ends, a transition may be made once to a title screen, a menu screen, or the like when the game starts. Then, in accordance with an operation of the player or regardless of the presence or absence of an operation of the player, a transition may be made to the free running mode.

In the above description, in the last base area (A11 in FIG. 15) of a plurality of continuous inter-base routes R, a movable object takes a predetermined number of laps around an intra-base route (CA11) set in the last base area. In a variation of the second game, a movable object may not take a predetermined number of laps around an intra-base route (CA1) set in the last base area. For example, at the time when the movable object reaches a predetermined position (e.g., a gate) provided in the last base area, the second game may end. At the time when the movable object enters the intra-base route of the last base area (e.g., at the time when the movable object crosses the boundary between the inter-base route R and the intra-base route CA), the second game may end.

In the above description, a movable object 51 takes a lap around only the last base area and passes through base areas (A4, A1, A2, and A3 in FIG. 15) along the way without taking a lap around the base areas. In a variation of the second game, the movable object 51 may take a lap around an intra-base route set in a base area along the way. The movable object may take a lap around all the base areas (A4, A1, A2, and A3 in FIG. 15) along the way, or the movable object may take a lap around some of the base areas (e.g., A1 and A3) along the way. For example, in FIG. 15, the movable object 51 may take a predetermined number of laps around the intra-base route CA4 provided in the base area A4, then enter the inter-base route R11, further enter the intra-base route CA1 from the route R11, take a predetermined number of laps around the route CA1, and then enter the route R1. On this course, one or more checkpoints CP may be provided, and it may be determined whether to cause the plurality of movable objects 51 to continue the race or drop out of the race at each checkpoint CP.

In the above description, if a race continuation condition is satisfied at the time when the movable object 51*a* reaches a checkpoint CP, the race is continued without suspending the race. In a variation of the second game, at each checkpoint CP, the race may be temporarily suspended. For example, in FIG. 19, if the movable object 51*a* reaches the checkpoint CP2, after display indicating the continuation of the race is performed, the race may be temporarily suspended, and the race may be continued from the checkpoint CP2 after the lapse of a predetermined time (or in accordance with an instruction given by the player). When the race is continued, the remaining ten movable objects start moving from the checkpoint CP2. Specifically, in accordance with the ranking of each movable object when reaching the checkpoint CP2, the start position of the movable object may be determined. For example, a movable object of which the ranking when reaching the checkpoint CP2 is high may be placed at a position ahead of a movable object of which the ranking is low (a position closer to the next base area). In accordance with the difference between the times when movable objects reach the checkpoint CP2, the start times of the movable objects may be set. For example, if the movable object 51*a* reaches the checkpoint CP2 a second later than the movable object 51*b*, and when the race is continued from the checkpoint CP2, the movable object 51*a* may start a second later than the movable object 51*b*.

(Third Game)

Next, a third game is described. The third game is performed in the multiplay mode. Specifically, the third game is performed in the online multiplay mode. The third game may also be performed in the offline multiplay mode. The third game may also be able to be executed in the single-play mode.

Figure 20:
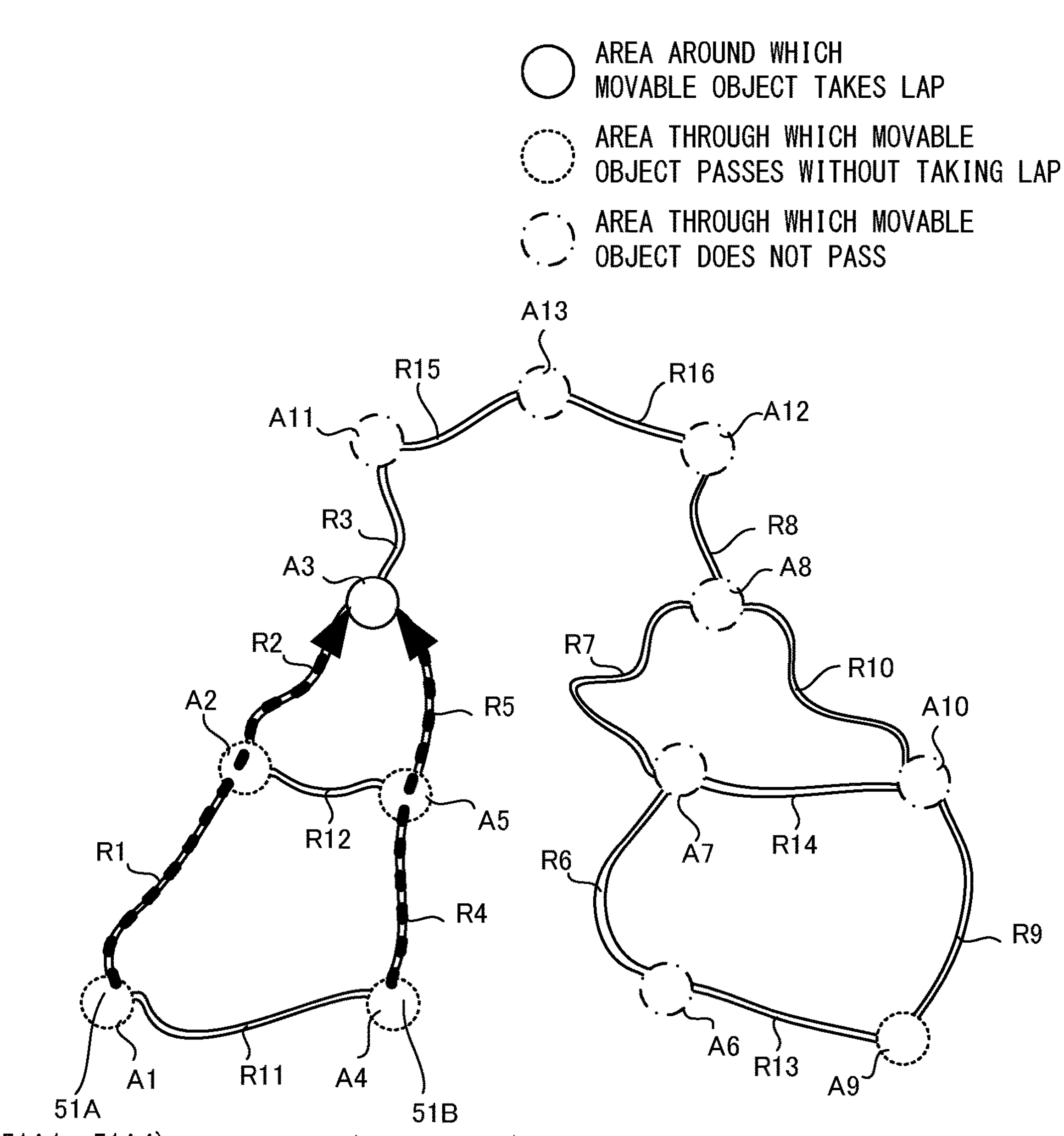
FIG. 20 is an example non-limiting diagram showing an example of a course in a third game.

FIG. 20 is a diagram showing an example of a course in the third game. In FIG. 20, a base area where each movable object takes a lap around an intra-base route is indicated by a solid circle, and a base area where the movable object passes through an intra-base route without taking a lap around the intra-base route is indicated by a dashed circle.

In the third game, a plurality of movable objects start from a certain base area, and a plurality of other movable objects start from another base area. The plurality of movable objects having started from the base areas perform a racing game on a course including a plurality of continuous inter-base routes R and an intra-base route CA set in a base area A that the plurality of inter-base routes R reach last.

Specifically, a server is set on the Internet, and the server matches a plurality of players to perform the third game. For example, a player PA1 gives an instruction to start the third game in the main body apparatus 2. In accordance with the instruction, the main body apparatus 2 connects to the server on the Internet and transmits a request regarding the start of the third game. The server receives these requests from a plurality of main body apparatuses and matches a plurality of players. If the server matches the plurality of players, determines the start position of a movable object relating to each of the plurality of players. The determined start positions are transmitted to the main body apparatuses 2. For example, if the server receives requests from the plurality of players, the server may match the plurality of players based on the game skills and the experiences of the players and the like.

For example, the server sets the start positions of movable objects 51A1 to 51A4 relating to four players PA1 to PA4, respectively, in the base area A1. The server also sets the start positions of movable objects 51B1 to 51B4 relating to other four players PB1 to PB4, respectively, in the base area A4. The number of movable objects (players) placed in a single base area is not limited to "4", and may be "2" to "3", or may be "4" or more. A player may specify a base area, and the specified base area may be transmitted to the server. The server may match players who specify the same base area, and may place a plurality of movable objects relating to the plurality of matched players in the specified base area.

Hereinafter, the players PA1 to PA4 of which the start positions are in the base area A1 will be referred to as the "players PA". The movable objects 51A1 to 51A4 relating to the players PA1 to PA4, respectively, will be referred to as the "movable objects 51A". Similarly, the players PB1 to PB4 of which the start positions are in the base area A4 will be referred to as the "players PB". The movable objects 51B1 to 51B4 relating to the players PB1 to PB4, respectively, will be referred to as the "movable objects 51B".

The players PA1 to PA4 control the movable objects 51A1 to 51A4 relating to the players PA1 to PA4 themselves, respectively. Each movable object 51A starts from the base area A1, passes through the routes R1 and R2, and heads for the base area A3. On the other hand, each movable object 51B starts from the base area A4, passes through the routes R4 and R5, and heads for the base area A3. The base area A3 is an area where the routes R2 and R5 merge together.

More specifically, the movable objects 51A1 to 51A4 start from the gate provided in the base area A1, enter the route R1 without taking a lap around the intra-base route CA1, further pass through the gate of the base area A2, and enter the route R2. Then, the movable objects 51A1 to 51A4 reach a gate of the base area A3. In accordance with the ranking of each movable object 51A when reaching the gate of the base area A3, it is determined whether to cause the movable object 51A to win through and continue the race or drop out of the race. For example, movable objects placing top two among the movable objects 51A1 to 51A4 win through and continue the race, and the other movable objects drop out of the race. Here, dropping out in the third game means losing an opportunity to win through. As an example, the movable objects having dropped out may start a race among the movable objects having dropped out, and the rankings of all the movable objects may be ultimately determined in accordance with winning through and dropping out. Hereinafter, a description is given of a game where the movable objects having won through continue the race. However, the movable objects having dropped out also continue the race on the same course. In another exemplary embodiment, the movable objects having dropped out may end the race.

Similarly, the movable objects 51B1 to 51B4 start from the gate provided in the base area A4, enter the route R4 without taking a lap around the intra-base route CA4, further pass through the gate of the base area A5, and enter the route R5. Then, the movable objects 51B1 to 51B4 reach the gate of the base area A3. In accordance with the ranking of each movable object 51B when reaching the gate of the base area A3, it is determined whether to cause the movable object 51B to win through and continue the race or drop out of the race. For example, movable objects placing top two among the movable objects 51B1 to 51B4 win through and continue the race, and the other movable objects drop out of the race.

In the base area A3, a racing game where two movable objects having won through from the plurality of movable objects 51A and two movable objects having won through from the plurality of movable objects 51B merge together, and these four movable objects (four players) having won through take a predetermined number of laps around the intra-base route CA3 of the base area A3 is performed. The timing when the movable objects 51A1 to 51A4 reach the base area A3 and the timing when the movable objects 51B1 to 51B4 reach the base area A3 are generally different from each other. For example, the movable objects 51A1 to 51A4 may reach the base area A3 first, and the movable objects 51B1 to 51B4 may reach the base area A3 later. In this case, the movable objects 51A (the players PA) having reached the base area A3 wait until the movable objects 51B (the player PB) reach the base area A3.

Here, the base area A3 is referred to as a "merging base". The merging base is a base area that movable objects having started from a certain base area reach via a plurality of inter-base routes R (or a single inter-base route), and is also a base area that other movable objects having started from another base area reach via a plurality of other inter-base routes R (or a single inter-base route). That is, the merging base is a base area where movable objects having started from a certain base area and other movable objects having started from another base area merge together. In the merging base, a racing game is performed between a plurality of players having reached the merging base via different routes. In the merging base, a racing game where the movable objects take a predetermined number of laps around an intra-base route CA set in the merging base is performed.

As described above, in the third game, a race where a plurality of players merge together in a single base area via different routes and take a predetermined number of laps around an intra-base route set in the base area is performed. That is, in the third game, a course where a starting point is set for each of the plurality of base areas A, and in a base area (A3) that movable objects reach last via a plurality of continuous inter-base routes R (e.g., the routes R1 and R2), the movable objects merge with movable objects from other routes (the routes R4 and R5) of which the starting point is in another base area (A4), and the movable objects take a predetermined number of laps around a intra-base route (CA3) provided in the base area (A3) that the movable objects reach last on the plurality of continuous inter-base routes, and reach a goal is set. Such a course is set, whereby a plurality of players (the players PA and PB) having started from different base areas can merge together in a merging base and race each other. Thus, a plurality of players can perform a racing game using a wide range in the field.

Although in FIG. 20, an example has been described where a plurality of movable objects start from two start positions, a plurality of movable objects may start from more start positions.

Figures 21, 22:
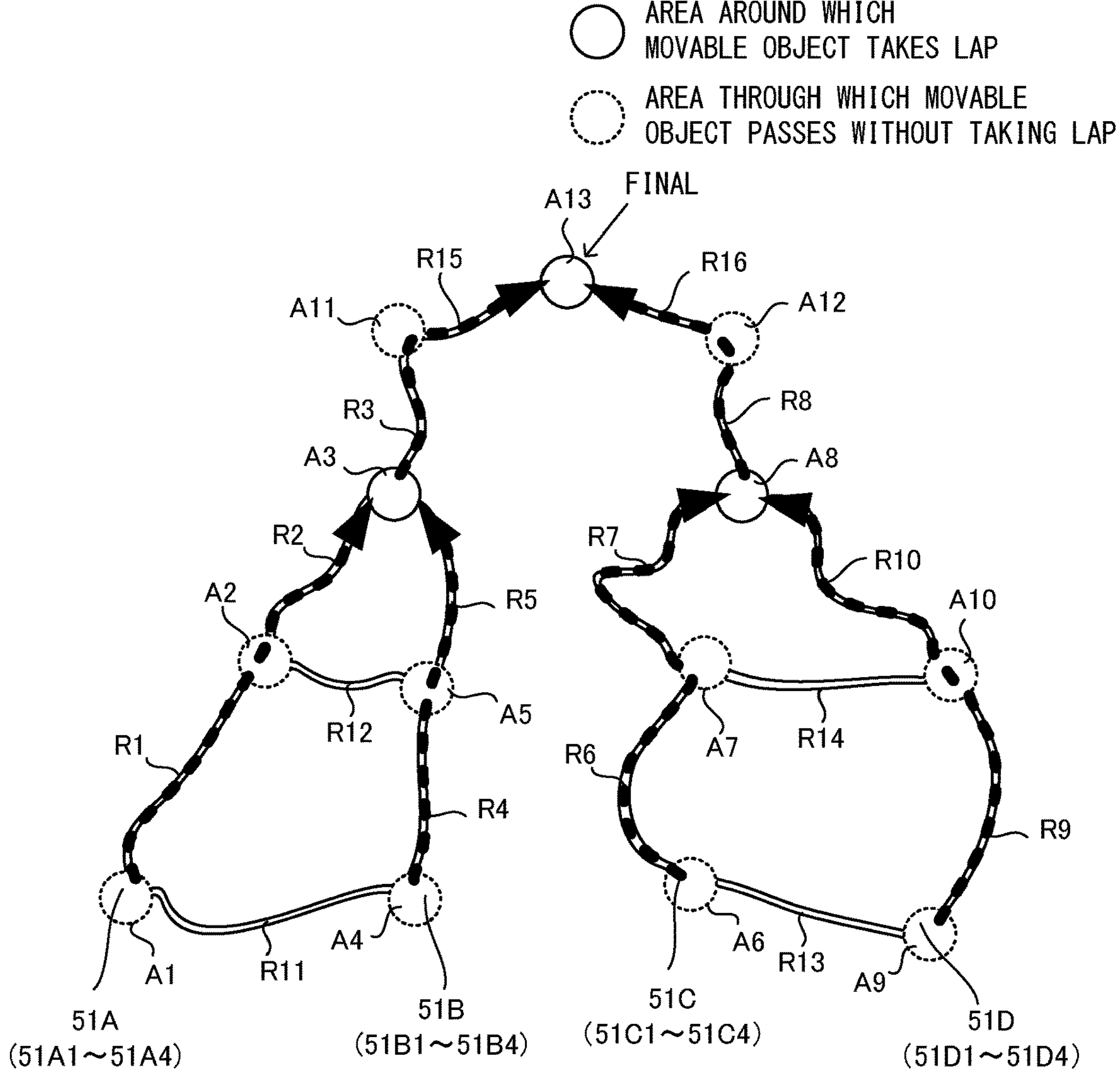
FIG. 21 is an example non-limiting diagram showing an overview of the third game in a case where a plurality of movable objects start from four start positions.
FIG. 22 is an example non-limiting diagram showing examples of winning-through conditions in the third game until a movable object 51A1 having started from the base area A1 moves into the final.

FIG. 21 is a diagram showing an overview of the third game in a case where a plurality of movable objects start from four start positions. FIG. 22 is a diagram showing examples of winning-through conditions in the third game until the movable object 51A1 having started from the base area A1 moves into the final. In FIGS. 21 and 22, a case is described where the player PA1 relating to the main body apparatus 2 controls the movable object 51A1 as the operating object.

In the third game shown in FIG. 21, a plurality of players start from each of the four start positions, and the game progresses by a winning-through method (a tournament method). As shown in FIG. 22, the third game from the start positions to the final can be divided into a plurality of rounds.

Specifically, first, in the first round, each movable object 51A starts from the base area A1, runs the routes R1 and R2, and heads for the base area A3 beyond the route R2. If the movable object 51A reaches the gate of the intra-base route CA3 of the base area A3, the first determination of whether or not the movable object 51A satisfies a winning-through condition is made. For example, the winning-through condition is that the ranking of the movable object 51A when reaching the base area A3 places top two.

If the ranking of the movable object 51A1 when reaching the base area A3 does not place top two, the movable object 51A1 drops out. In this case, the movable object 51A1 races on a next course with other movable objects having dropped out. If the movable object 51A1 drops out, display indicating the end of the third game may be performed in the main body apparatus 2 of the player PA1, and the race of the movable object 51A1 may end. In this case, the state of the third game performed by other players may be displayed on the display 12 of the main body apparatus 2.

If, on the other hand, for example, the movable objects 51A1 and 51A2 satisfy the winning-through condition, the movable objects 51A1 and 51A2 win through and advance to a next course (a course where the movable objects 51A1 and 51A2 take a predetermined number of laps around the route CA3; the second round).

In the second round, a racing game is performed on the intra-base route CA3 by two movable objects having won through from the plurality of movable objects 51A and two movable objects having won through from the plurality of movable objects 51B. Specifically, a racing game where the movable objects take a predetermined number of laps around the intra-base route CA3 and then head for the goal (the gate) provided on the route CA3 is performed. When each movable object reaches the goal in the route CA3, the second determination of whether or not a winning-through condition is satisfied is made. For example, the winning-through condition is that the ranking of the movable object when reaching the goal in the route CA3 places top two. For example, if the movable object 51A1 satisfies the winning-through condition and the movable object 51B1 satisfies the winning-through condition, the movable objects 51A1 and 51B1 win through and further advance to a next course (a course where the movable objects 51A1 and 51B1 pass through the routes R3 and R15; the third round).

The movable objects 51A1 and 51B1 having advanced to the third round start from the base area A3, pass through the routes R3 and R15, and head for the base area A13. When each movable object reaches the base area A13, the third determination of whether or not a winning-through condition is satisfied is made. For example, the winning-through condition is that the ranking of the movable object when reaching the base area A13 is the first place. For example, if the movable object 51A1 satisfies the winning-through condition, the movable object 51A1 advances to a next course (a course where the movable object 51A1 takes a predetermined number of laps around a route CA13; the final).

On the other hand, as shown in FIG. 21, other movable objects 51C (51C1 to 51C4) start from the base area A6, other movable objects 51D (51D1 to 51D4) start from the base area A9, and the movable objects 51C and 51D merge together in the base area A8.

Specifically, the movable objects 51C1 to 51C4 relating to players PC1 to PC4, respectively, start from a gate provided in the base area A6, enter the route R6 without taking a lap around an intra-base route CA6, further pass through the base area A7, and enter the route R7. Then, the movable objects 51C1 to 51C4 reach the base area A8 (the merging base A8). Based on the ranking of each movable object 51C when reaching the base area A8, the first determination of whether or not the movable object 51C satisfies the winning-through condition is made. For example, movable objects placing top two among the movable objects 51C1 to 51C4 win through and advance to a next course (a course where the movable objects take a predetermined number of laps around a route CA8; the second round).

Similarly, the movable objects 51D1 to 51D4 relating to players PD1 to PD4, respectively, start from a gate provided in the base area A9, enter the route R9 without taking a lap around an intra-base route CA9, further pass through the base area A10, and enter the route R10. Then, the movable objects 51D1 to 51D4 reach the base area A8 (the merging base A8). Based on the ranking of each movable object 51D when reaching the base area A8, the first determination of whether or not the movable object 51D satisfies the winning-through condition is made. For example, movable objects placing top two among the movable objects 51D1 to 51D4 win through and advance to a next course (a course where the movable objects take a predetermined number of laps around the route CA8; the second round).

In the base area A8 (the merging base A8), a racing game where two movable objects having won through from the plurality of movable objects 51C and two movable objects having won through from the plurality of movable objects 51D merge together, and these four movable objects having won through take a predetermined number of laps around the intra-base route CA8 (the second round) is performed. When each movable object reaches a goal on the intra-base route CA8, the second determination of whether or not the movable object satisfies the winning-through condition is made. For example, the winning-through condition that the ranking of the movable object when reaching the goal in the route CA8 places top two. For example, if the movable objects 51C1 and 51D1 satisfy the winning-through condition, the movable objects 51C1 and 51D1 win through and further advance to a next course (a course where the movable objects 51C1 and 51D1 pass through the routes R8 and R16; the third round).

The movable objects 51C1 and 51D1 having advanced to the third round start from the base area A8, pass through the routes R8 and R16, and head for the base area A13. When each movable object reaches the base area A13, the third determination of whether or not the winning-through condition is satisfied is made. For example, the winning-through condition is that the ranking of the movable object when reaching the base area A13 is the first place. For example, if the movable object 51C1 satisfies the winning-through condition, the movable object 51C1 advances to a next course (a course where the movable object 51C1 takes a predetermined number of laps around the route CA13; the final).

In the base area A13, the movable object passing through the route R15 and the movable object passing through the route R16 merge together, and the final is performed. Specifically, a racing game where the movable object 51A1 and the movable object 51C1 take a predetermined number of laps around the base area A13 and reach a goal is performed. If the movable object 51A1 reaches the goal, the third game ends.

Figure 23:
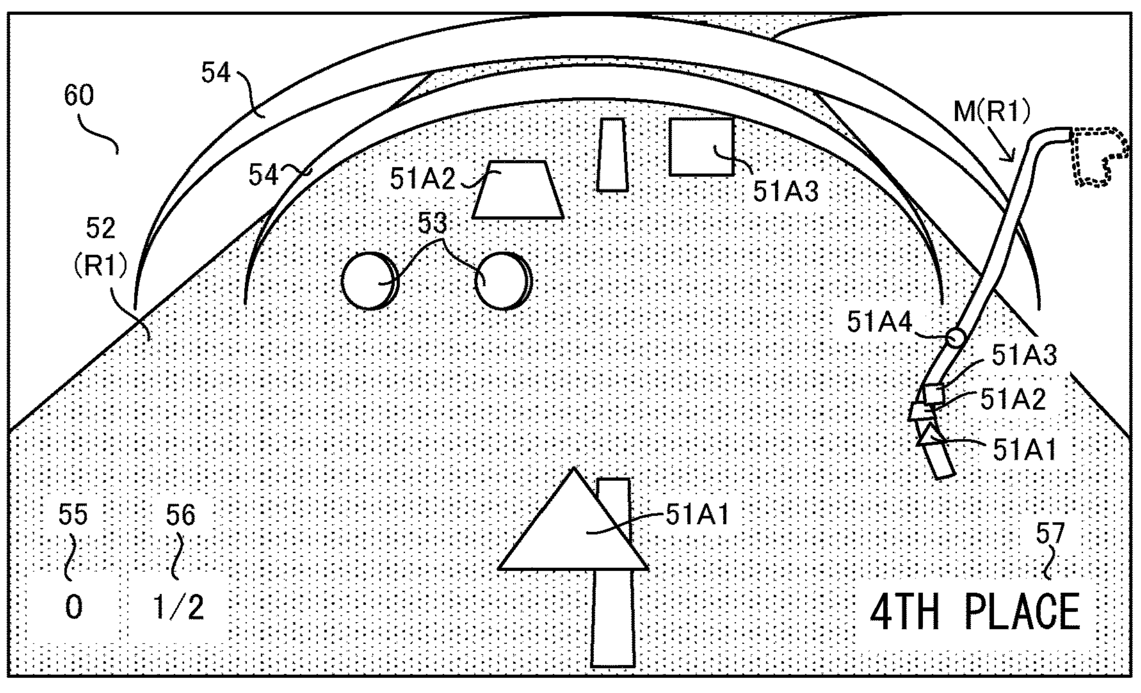
FIG. 23 is an example non-limiting diagram showing an example of a game image displayed when the third game is performed on a course exemplified in FIG. 21, and is an example non-limiting diagram showing an example of a game image displayed when the first round is performed.

FIG. 23 is a diagram showing an example of a game image displayed when the third game is performed on the course exemplified in FIG. 21, and is a diagram showing an example of a game image displayed when the first round is performed.

As shown in FIG. 23, the movable object 51A1 (the operating object) controlled by the player PA1 of the main body apparatus 2 is displayed near the center of the screen. The movable object 51A2 controlled by the other player PA2 and the movable object 51A3 controlled by the other player PA3 are also displayed. On the route R1, the movable object 51A4 controlled by the other player PA4 is present. The main body apparatus 2 acquires information regarding the movable objects 51A2 to 51A4 controlled by the other players (the positions, the orientations, the states, the velocities, the moving directions, items owned by the movable objects, items used by the movable objects, information regarding whether or not each movable object collides with another object, and the like of the movable objects 51A2 to 51A4) from the server on the Internet, and based on the acquired information, controls the movable objects 51A2 to 51A4.

Similarly to during the execution of the above first game, the coins 53, the first item giving objects 54, the number-of-coins display 55, the lap display 56, the ranking display 57, and the map image M are displayed. The lap display 56 is updated when the movable object 51A1 reaches the gate provided on the intra-base route CA2 of the base area A2. The lap display 56 may be updated before the movable object 51A1 reaches the gate of the intra-base route CA2 (e.g., immediately before the movable object 51A1 enters the base area A2).

Figure 24:
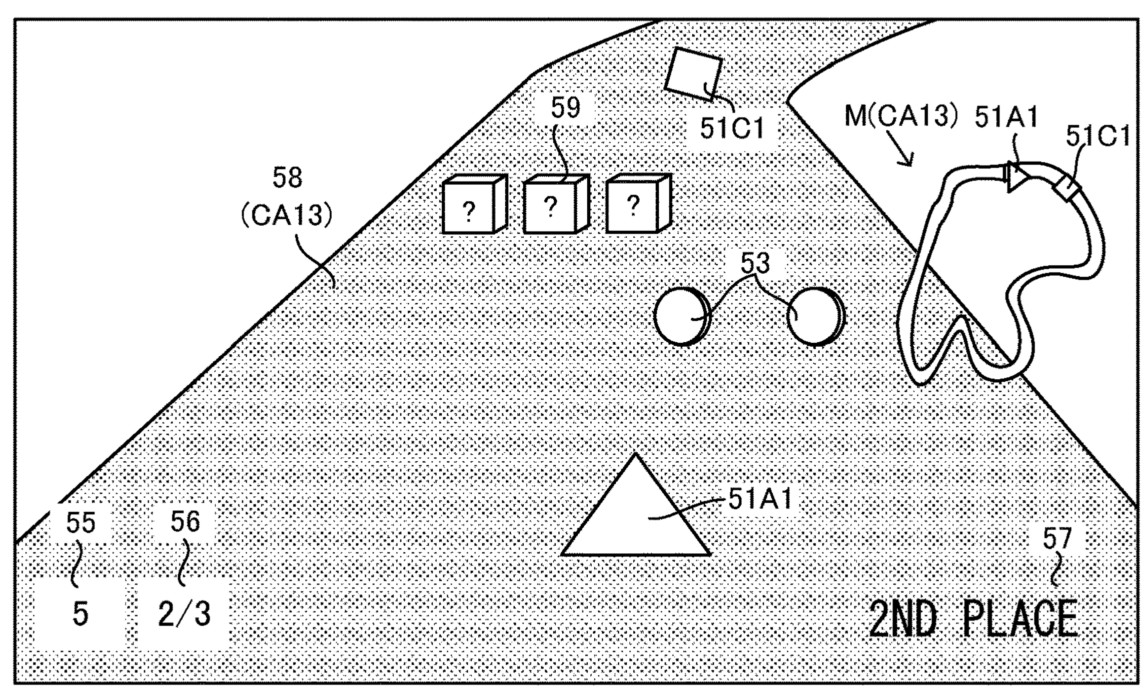
FIG. 24 is an example non-limiting diagram showing an example of a game image displayed when the third game is performed on the course exemplified in FIG. 21, and is an example non-limiting diagram showing an example of a game image displayed when the final is performed.

FIG. 24 is a diagram showing an example of a game image displayed when the third game is performed on the course exemplified in FIG. 21, and is a diagram showing an example of a game image displayed when the final is performed.

As shown in FIG. 24, for example, a racing game where the movable object 51A1 having started from the base area A1 and won through and the movable object 51C1 having started from the base area A6 and won through take a predetermined number of laps (e.g., three laps) around the intra-base route CA13 is performed. The movable object 51A1 controlled by the player PA1 is displayed near the center of the screen. The movable object 51C1 controlled by the player PC1 is also displayed. Similarly to during the execution of the above first game, the coins 53, the number-of-coins display 55, the lap display 56, the ranking display 57, the second item giving objects 59, and the map image M are displayed. As the map image M, an image indicating the entirety of the intra-base route CA13 is displayed. The lap display 56 is updated every time the movable object 51A1 passes through a gate provided on the intra-base route CA13.

The start positions (A1, A4, A6, and A9), the number of movable objects placed at each start position, the number of start positions, and the routes from the start positions to the final shown in FIGS. 21 and 22 are merely examples. The number of times of the determination of whether or not to cause a movable object to win through and continue the race, the determination timings, the winning-through conditions, and the like are merely examples.

For example, in the final, a racing game where two or more movable objects take a predetermined number of laps around the intra-base route CA13 may be performed. The winning-through condition in each round may differ. For example, the winning-through condition in the first round may be that the ranking at the determination timing places top three, and the winning-through condition in the second round may be that the ranking at the determination timing places top two.

Each winning-through condition may be determined based on not the ranking but the time from the start to the determination timing (i.e., the time from when each movable object starts from the start position to when the movable object reaches the determination position).

Although FIG. 21 shows an example where four movable objects start from each of four starting points, four or more movable objects may start from each of four or more starting points.

In the above description, for example, the movable object 51A1 runs the inter-base routes R1 and R2 and reaches the base area A3, and the first determination is made at the time when the movable object 51A1 reaches the base area A3. The first determination may be made at the time when the movable object 51A1 takes a predetermined number of laps around the intra-base route CA3 set in the base area A3. That is, the course of the third game may be a course where the movable object 51A1 starts from the base area A1, runs the inter-base routes R1 and R2, and then takes a predetermined number of laps around the intra-base route CA3.

In the above description, for example, the movable objects 51A run the inter-base routes R1 and R2, reach the base area A3, merge with the movable objects 51B, and take a predetermined number of laps in the base area A3. In the base area A3, a racing game where the movable objects 51A and 51B head for the goal provided in the base area A3 without taking a predetermined number of laps may be performed. That is, a racing game where the movable objects 51A run a plurality of continuous inter-base routes R (R1 and R2) and merge with a route (R5) of which the starting point is in another base area (A4) in a base area (A3) that the plurality of inter-base routes R reach last, a goal point is set in the base area (A3) that the plurality of inter-base routes R reach last, and the movable objects 51A head for the goal point may be performed.

In the above description, for example, the movable object 51A1 starts from the base area A1, passes through a plurality of inter-base routes (R1 and R2), and reaches the base area A3, and at the time when the movable object 51A1 reaches the base area A3, it is determined whether or not the winning-through condition is satisfied. On another course of the third game, for example, the movable object 51A1 may start from the base area A1, pass through a single inter-base route R1, and reach the base area A2, and at the time when the movable object 51A1 reaches the base area A2, it may be determined whether or not the winning-through condition is satisfied.

Figures 25, 26:
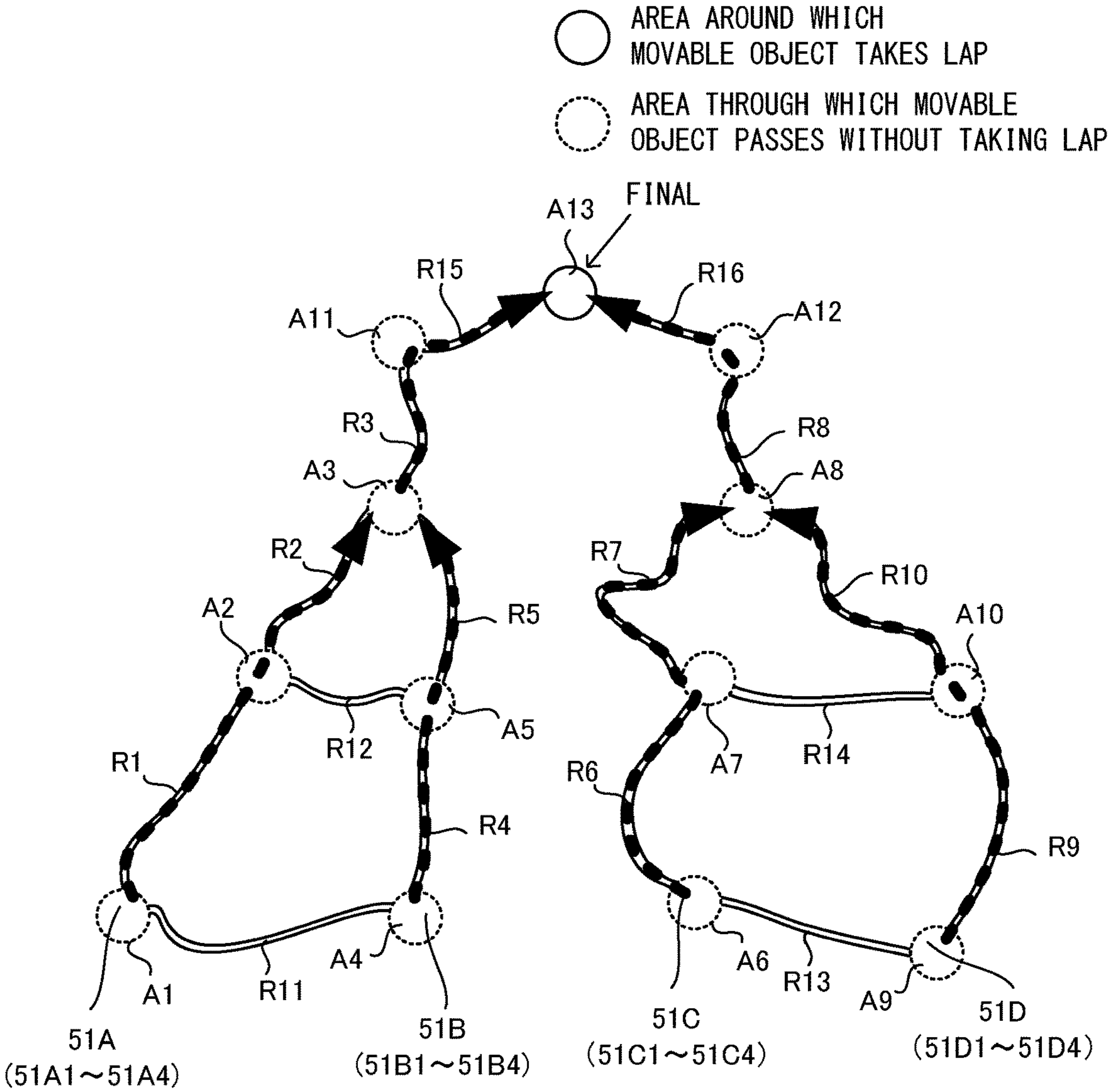
FIG. 25 is an example non-limiting diagram showing an example of the third game on another course.
FIG. 26 is an example non-limiting diagram showing examples of winning-through conditions in the third game on the other course.

FIG. 25 is a diagram showing an example of the third game on another course.

FIG. 26 is a diagram showing examples of winning-through conditions in the third game in the other course.

As shown in FIGS. 25 and 26, in the first round, the plurality of movable objects 51A start from the base area A1, pass through the inter-base routes R1 and R2, and head for the base area A3. When the movable objects 51A reach the base area A3, it is determined whether or not a winning-through condition is satisfied. A movable object satisfying the winning-through condition wins through and advances to a next race (the second round). For example, movable objects placing top two among the plurality of movable objects 51A win through and advance to the next race (the second round).

On the other hand, the plurality of movable objects 51B start from the base area A4, pass through the inter-base routes R4 and R5, and head for the base area A3. When the plurality of movable objects 51B reach the base area A3, it is determined whether or not the winning-through condition is satisfied. For example, movable objects placing top two among the plurality of movable objects 51B win through and advance to the next race (the second round).

In the second round, two movable objects having won through from the plurality of movable objects 51A and two movable objects having won through from the plurality of movable objects 51B start from the base area A3, pass through the inter-base routes R3 and R15 without taking a lap around the intra-base route CA3, and head for the base area A13. When the movable objects reach the base area A13, it is determined whether or not a winning-through condition is satisfied. A movable object satisfying the winning-through condition wins through and advances to a next race (the final). For example, movable objects placing top two among the plurality of movable objects having started from the base area A3 win through and advance to the next race (the final).

Similarly, the movable objects 51C starting from the base area A6 and the movable objects 51D starting from the base area A9 also pass through their paths and head for the base area A13 where the final is to be performed.

In the final, on the route CA13, two movable objects having won through via the route R15 and two movable objects having won through via the route R16 take a predetermined number of laps around the route CA13 and head for the goal provided on the route CA13.

As described above, in the third game, a plurality of movable objects relating to a plurality of players start from a plurality of base areas and run a plurality of inter-base routes R. Movable objects having started from a certain base area and movable objects having started from another base area merge together in a base area that the plurality of inter-base routes R reach last, whereby a racing game is performed. Consequently, it is possible to perform a racing game in a winning-through format while a plurality of movable objects having started from different base areas move on a field. Thus, a plurality of players can perform a game using the entirety of the field.

As at least some of the gates in the third game, instead of a gate originally set on an intra-base route, another gate temporarily installed near the intra-base route may be used.

If the third game ends, based on an input provided by the player, a transition may be made to the free running mode for freely moving the movable object 51A1 on the field. If the player provides a predetermined operation input in the free running mode, the type of race may be determined and an instruction to start the race may be given based on the predetermined operation input, and a next race may be started. After the third game ends, a transition may be made once to a title screen, a menu screen, or the like when the game starts. Then, in accordance with an operation of the player or regardless of the presence or absence of an operation of the player, a transition may be made to the free running mode.

(Fourth Game)

Next, a fourth game is described. In the fourth game, a game is performed in the free running mode where the movable object 51*a* relating to the player freely runs on the field. The fourth game is performed in the single-play mode. The fourth game may also be able to be executed in the multiplay mode.

The player can determine that the fourth game is to be performed, and set the position where the movable object 51*a* (the operating object) relating to the player themselves starts moving. For example, the player can specify any of a plurality of intra-base routes CA set on the field and start the fourth game from the position of a gate of the specified intra-base route. For example, the player can specify any position on the field shown in FIG. 3 and start the fourth game. After the above first to third games are performed using the movable object 51*a*, a transition may be made to the free running mode, and the fourth game where the movable object 51*a* is freely moved on the field may be performed. In this case, the fourth game may be started from an intra-base route on which the first to third games have ended.

Figures 27, 28:
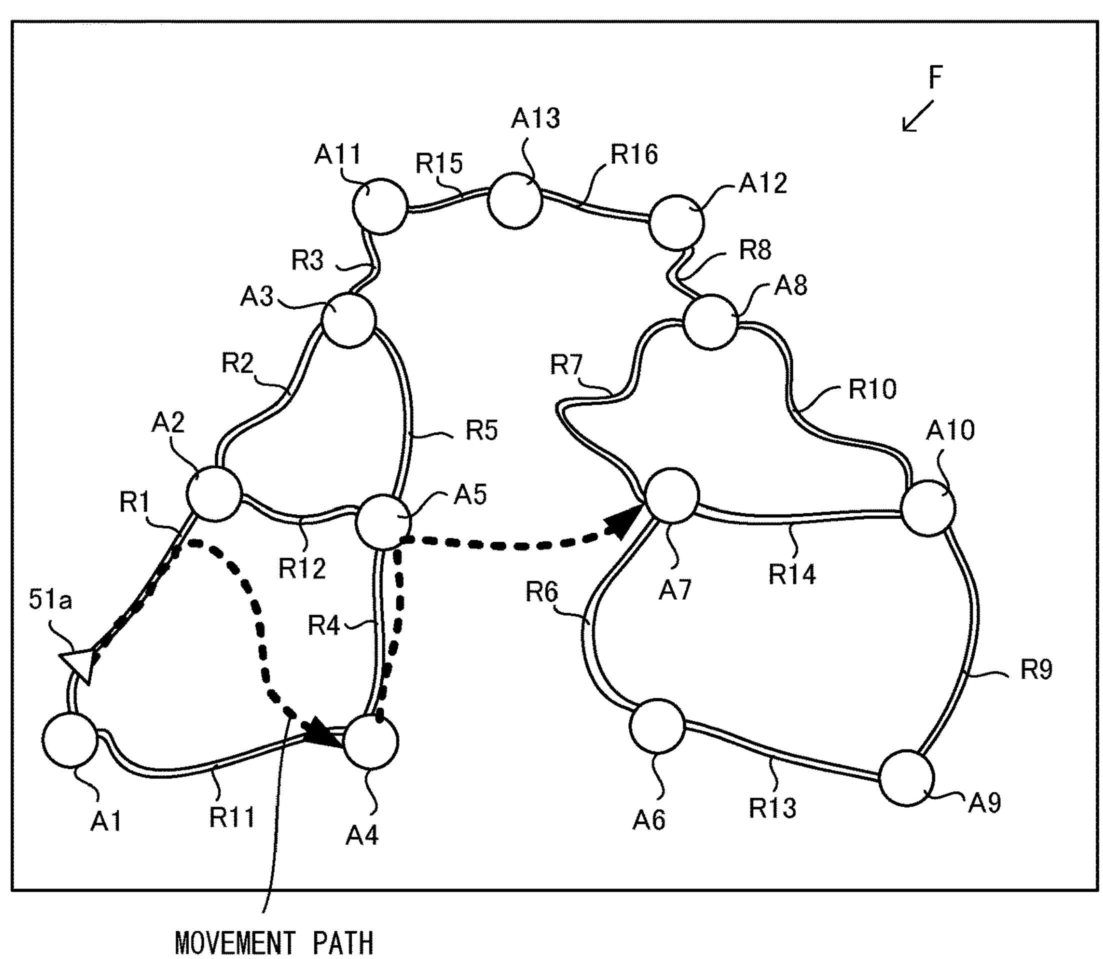
FIG. 27 is an example non-limiting diagram showing an example of the movement path of a movable object 51*a* when a fourth game is performed.
FIG. 28 is an example non-limiting diagram showing examples of various pieces of data used in game processes performed by a game system 1.

FIG. 27 is a diagram showing an example of the movement path of the movable object 51*a* when the fourth game is performed. In the fourth game, for example, the movable object 51*a* can run along the inter-base route R1. As shown in FIG. 27, while the movable object 51*a* is running along the inter-base route R1, the movable object 51*a* can deviate from the route R1, and for example, move toward the base area A4. The movable object 51*a* can run through any position on the field. For example, the movable object 51*a* can run on a road or a ground without a road set on the field. The movable object 51*a* can also run on water such as a lake or a sea set on the field. The movable object 51*a* can also reach the base area A4 and run the intra-base route CA4 set in the base area A4.

The plurality of movable objects (51*b*, 51*c*, and the like) controlled by the processor 21 run each intra-base route CA. For example, if the movable object 51*a* enters the intra-base route CA4, the movable object 51*a* can race with the plurality of movable objects 51*b* and 51*c*.

Further, the movable object 51*a* can enter the route R4 from the intra-base route CA4, move along the route R4 (or deviate from the route R4), move to the base area A5, further pass through a ground without a road or on water, and move to the base area A7.

As described above, in the fourth game, the player can move a movable object 51 through any position on the field.

(Other Games)

In the exemplary embodiment, the player can execute various games on a course including an inter-base route R and/or an intra-base route CA set on the field in addition to the above first to fourth games.

For example, a fifth game where a plurality of movable objects start from a gate provided on an intra-base route CA, take a predetermined number of laps around the route CA, and compete on the rankings until the plurality of movable objects reach the goal (the gate) provided on the route CA may be performed. The fifth game may be performed in the single-play mode, or may be performed in the multiplay mode. The player can select any of the plurality of base areas A (intra-base routes CA) and execute the fifth game in the selected base area A.

During the execution of the fifth game, an image similar to the image displayed while movable objects are taking a lap around an intra-base route CA in the above first game is displayed. For example, during the execution of the fifth game, the plurality of movable objects 51 (e.g., 51*a* to 51*c*), the coins 53, the number-of-coins display 55, the lap display 56, the ranking display 57, the map image M, and the second item giving objects 59 are displayed.

During the fourth game, the fifth game may be performed. For example, if a movable object enters a certain base area A during the execution of the fourth game, the fifth game may be performed in the base area A.

A sixth game where the time from when a movable object starts from a gate provided on an intra-base route CA to when the movable object takes a predetermined number of laps around the route CA and reaches the goal are measured may be performed. The player can select any of the plurality of base areas A (intra-base routes CA) and execute the sixth game in the selected base area A.

During the execution of the sixth game, an image similar to the image displayed while movable objects are taking a lap around an intra-base route CA in the first game is displayed, except that the ranking display 57 is not displayed. For example, during the execution of the sixth game, the movable object 51*a*, the coins 53, the number-of-coins display 55, the lap display 56, the map image M, and the second item giving objects 59 are displayed.

During the fourth game, the sixth game may be performed. For example, when a movable object enters a certain base area A and passes through a gate during the execution of the fourth game, the measurement of the time may be started.

A seventh game where a plurality of movable objects fight against each other while running may be performed. In the seventh game, each movable object has a parameter (a parameter indicating that the movable object is attacked). Each movable object attacks an opponent movable object (e.g., an attack using an item) while running, thereby decreasing the parameter of the opponent movable object. The seventh game may be performed while the plurality of movable objects are taking a lap around an intra-base route CA, or may be performed while the plurality of movable objects are running an inter-base route R. The seventh game may be performed while the plurality of movable objects are running through any position on the field. The seventh game may be performed in the single-play mode, or may be performed in the multiplay mode.

An eighth game where a plurality of movable objects run an inter-base route R and head for a base area A beyond the inter-base route R may be performed. For example, on an inter-base route R connecting a first base area and a second base area, a starting point is provided at a position close to the first base area, and a goal point may be provided at a position close to the second base area. In the eighth game, the plurality of movable objects may move from the starting point to the goal point provided on the inter-base route R and compete on the rankings at the times when the plurality of movable objects reach the goal or compete on the times until the plurality of movable objects reach the goal point.

(Details of Game Processes)

Next, the details of game processes performed by the game system 1 are described.

FIG. 28 is a diagram showing examples of various pieces of data used in the game processes performed by the game system 1. As shown in FIG. 28, a memory (e.g., the DRAM 27 or a storage medium or the flash memory 26 attached to the slot 29) of the game system 1 stores a game program, operating object data, other movable object data, field data, course data, first item giving object data, and second item giving object data.

The game program is a program for executing the game processes according to the exemplary embodiment (processes shown in FIGS. 29 to 33 described below). The game program is stored in advance in the storage medium or the flash memory 26 attached to the slot 29 and is loaded into the DRAM 27 when the racing game is executed.

The operating object data is data regarding the operating object (the above movable object 51*a* or 51A1) controlled by the player of the main body apparatus 2. For example, the operating object data includes data indicating the shape of the operating object and data regarding an item owned by the operating object. The operating object data also includes data indicating the velocity, the moving direction, and the position of the operating object. The operating object data also includes data indicating the degree of progress of the operating object (data regarding the lap display 56) and data indicating the current ranking of the operating object.

The other movable object data includes data regarding the movable objects (51*b*, 51*c*, and the like) controlled by other players or the processor 21. The other movable object data includes data indicating the shape of each movable object (51*b*, 51*c*, or the like) and data regarding an item owned by each movable object. The other movable object data also includes data indicating the position, the velocity, the moving direction, the degree of progress, and the current ranking of each movable object.

The other movable object data is data generated by the processor 21 of the main body apparatus 2 or data based on information acquired from another apparatus (another main body apparatus 2 connected to the main body apparatus 2 via a LAN or the like or the server connected to the Internet). In a case where the game is performed in the offline multiplay mode, for example, the other movable object data is acquired from another main body apparatus 2 connected to the main body apparatus 2 via a wireless LAN (or a wired LAN). In a case where the game is performed in the online multiplay mode, the other movable object data is acquired from the server via the Internet.

The field data is data indicating the entirety of the field. The field data includes data indicating a plurality of base areas and data indicating a plurality of inter-base routes.

The course data includes data that defines a course where the racing game is performed. For example, the course data includes course objects (a road, a wall, and the like) that define the course. In the exemplary embodiment, a plurality of courses are prepared in advance, and course data relating to each course is stored in the memory. Specifically, course data for the first game, course data for the second game, course data for the third game, course data for the fifth game, and the like are stored in advance. For example, as the course data for the first game, data indicating the course C11, data indicating the course C12, and data indicating the course C13 are stored in advance. For example, the data indicating the course C11 includes data indicating the small course C11-0, data indicating the small course C11-1, data indicating the small course C11-2, and data indicating the small course C11-3 as shown in FIG. 7. The small course C11-1 is a course where a starting point is set in the base area A1 and each movable object passes through the inter-base route R1 without taking a lap around the intra-base route CA1, reaches the base area A2, takes a predetermined number of laps around the intra-base route CA2, and reaches the goal point provided on the intra-base route CA2. The course data may be stored in advance in the storage medium or the flash memory 26 attached to the slot 29, or may be acquired from the server via the Internet, or may be acquired from another main body apparatus 2.

The first item giving object data is data regarding the first item giving objects 54 placed on an inter-base route R. The first item giving object data includes data indicating the position of the first item giving objects 54 and data indicating the shape and the external appearance of the first item giving objects 54.

The second item giving object data is data regarding the second item giving objects 59 placed on an intra-base route CA. The second item giving object data includes data indicating the position of the second item giving objects 59, data indicating the shape and the external appearance of the second item giving objects 59, data indicating whether or not the second item giving objects 59 are acquired by a movable object, and the like. The second item giving objects 59 may be placed not only on an intra-base route CA, but also on an inter-base route R.

The game system 1 also stores various other pieces of data in addition to the data shown in FIG. 28.

(Game Determination Process)

Figure 29:
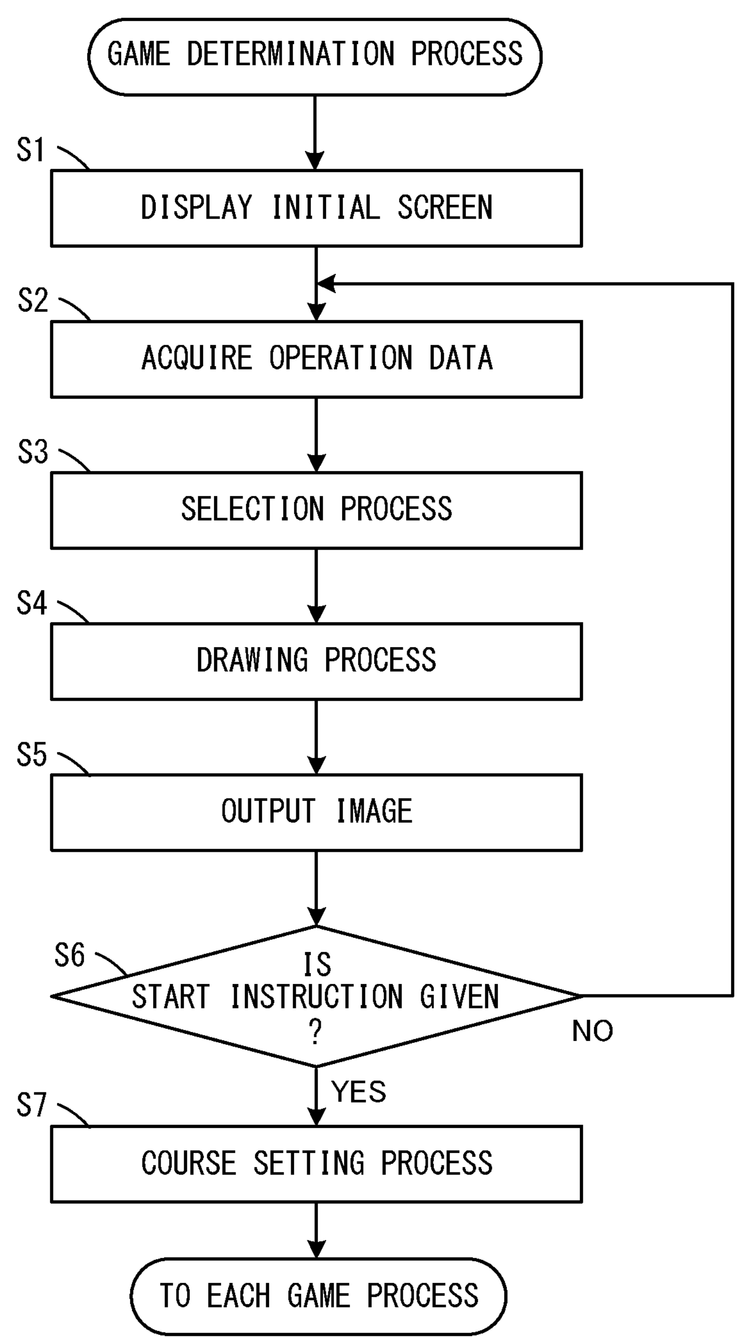
FIG. 29 is an example non-limiting flow chart showing an example of a game determination process performed when an instruction to execute a game program is given.

Next, the game processes performed by the game system 1 are described. FIG. 29 is a flow chart showing an example of a game determination process performed when an instruction to execute the game program is given. The game determination process shown in FIG. 29 is a process performed first in accordance with the fact that the player gives an instruction to start the game, and is a process for determining the type of game, a course, which of the single-play mode and the multiplay mode is to be used, and the like based on inputs provided by the player.

In the exemplary embodiment, the description is given on the assumption that the processes of steps shown in FIGS. 29 to 36 are executed by the processor 21 of the main body apparatus 2 executing the game program using a memory (e.g., the DRAM 27). In another exemplary embodiment, however, some of the processes of the steps may be executed by a processor (e.g., a dedicated circuit or the like) different from the processor 21. In a case where the game system 1 can communicate with another information processing apparatus (e.g., a server), some of the processes of the steps may be executed by the other information processing apparatus. The processes of all of the steps are merely illustrative. Thus, the processing order of the steps may be changed, or another process may be performed in addition to (or instead of) the processes of all of the steps, so long as similar results are obtained.

As shown in FIG. 29, in step S1, the processor 21 displays an initial screen on the display 12. Specifically, the processor 21 displays an initial screen for setting the type of game, a course, and the like.

Next, the processor 21 acquires the operation data (step S2). The processor 21 repeatedly acquires the operation data from the controllers 3 and 4 connected to the main body apparatus 2 at predetermined time intervals (e.g., 1/200-second intervals) and stores the operation data in the memory. In step S2, the processor 21 acquires the operation data stored in the memory. During the execution of the game determination process, the processor 21 repeatedly executes the processes of steps S2 to S6 at predetermined frame time intervals (e.g., 1/60-second intervals).

Next, the processor 21 performs a selection process (step S3). In the selection process, based on the operation data, whether to perform the game in the single-play mode or perform the game in the multiplay mode is selected. In the selection process, based on the operation data, the type of game to be executed is selected. For example, in the selection process, which of the above first to eighth games is to be performed is selected. In the selection process, if the type of game is selected, based on the operation data, any of a plurality of courses relating to the selected type of game is selected. In the selection process, the type, the shape, the size, and the like of a movable object to be used by the player may be selected. In the selection process, the plurality of selections may be made on a single screen, or may be made while a transition is made between a plurality of screens.

Next, the processor 21 performs a drawing process (step S4). Here, a process for drawing an image relating to the selection process in step S3 is performed. Then, the processor 21 outputs the image generated in the drawing process (step S5).

Next, based on the operation data, the processor 21 determines whether or not a start instruction to start the race is given by the player (step S6). If the start instruction is not given (step S6: NO), the processor 21 executes the process of step S2 again.

If, on the other hand, it is determined that the start instruction is given (step S6: YES), the processor 21 performs a course setting process (step S7). In the course setting process, the course selected in step S3 is set on the field. In step S7, the type of game and the course selected in step S3 are set. For example, if the first game is selected and the course C11 is selected in step S3, the small course C11-0 or the like is set. Specifically, the small course C11-0 is a course where each movable object starts from the gate of the intra-base route CA1 and takes a predetermined number of laps around the intra-base route CA1 The first item giving objects and the second item giving objects are also set on the course. For example, if the second game is selected and the course C20 is selected in step S3, the course C20 as shown in FIG. 15 is set. On an inter-base route, the first item giving objects 54 are placed. On an intra-base route, the second item giving objects 59 are placed. If the third game is selected in step S3, the processor 21 accesses the server, transmits a request regarding the start of the third game, and receives information regarding the third game from the server. The information regarding the third game from the server includes information regarding the course of the third game, information regarding a start position, information regarding other movable objects, and the like. Based on the information regarding the third game from the server, the processor 21 sets a course. For example, if the course shown in FIG. 25 is determined and the base area A1 is determined as a start position, the processor 21 sets a course including the inter-base routes R1 and R2 as the course of the first round of the third game. The processor 21 also places the first item giving objects 54 at a predetermined position on the inter-base routes R1 and R2.

If the process of step S7 is executed, the processor 21 starts a game process relating to the type of game selected in the selection process in step S3. A description is given below of each game process performed after the game determination process.

(First Game Process)

Figure 30:
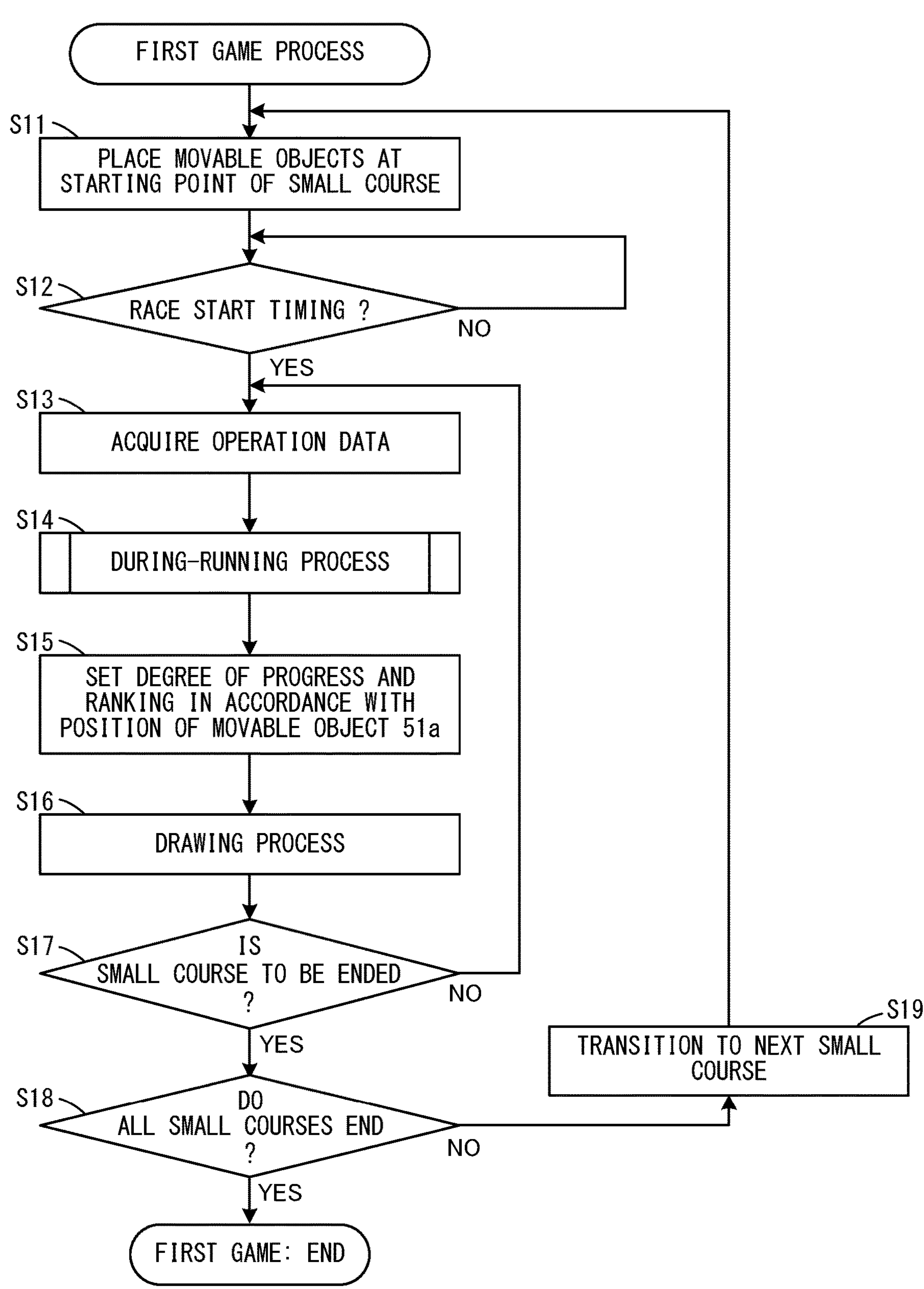
FIG. 30 is an example non-limiting flow chart showing an example of a first game process.

FIG. 30 is a flow chart showing an example of a first game process. The first game process is executed in a case where in the above game determination process, it is determined that the first game is to be performed.

First, the processor 21 places a plurality of movable objects at a starting point of a small course (step S11). For example, suppose that the course C11 is determined in the game determination process among the plurality of courses prepared for the first game (see FIG. 7). In this case, in the process of step S11, which is the first step in the first game process, the processor 21 places the plurality of movable objects at a starting point of the small course C11-0. Specifically, the processor 21 places the plurality of movable objects at the gate of the intra-base route CA1. For example, a plurality of movable objects including the movable object 51*a* (the operating object) relating to the player A of the main body apparatus 2 and the movable objects 51*b* and 51*c* controlled by the processor 21 are placed. If the first game is performed in the multiplay mode, the movable object 51*b* may be controlled by a player B, and the movable object 51*c* may be controlled by a player C.

Next, the processor 21 determines whether or not the current time is a race start timing (step S12). If a predetermined time (e.g., 3 seconds) elapses after the plurality of movable objects are placed at the starting point, the determination of the processor 21 is YES in step S12. The processor 21 repeatedly performs the process of step S12 until the predetermined time elapses. For example, the processor 21 may automatically move the plurality of movable objects along the course until the predetermined time elapses after the plurality of movable objects are placed at the gate in step S11. The processor 21 may also stop the plurality of movable objects until the predetermined time elapses after the plurality of movable objects are placed at the gate in step S11.

If the determination is YES in step S12, the processor 21 acquires the operation data (step S13). In and after step S13, the race on the small course in the first game is started, and the player can operate the movable object 51*a*. Specifically, the processor 21 acquires the operation data from the controllers 3 and 4 that is stored in the memory. From this point onward, the processor 21 repeatedly executes the processes of steps S13 to S17 at predetermined frame time intervals (e.g., 1/60-second intervals).

Figure 31:
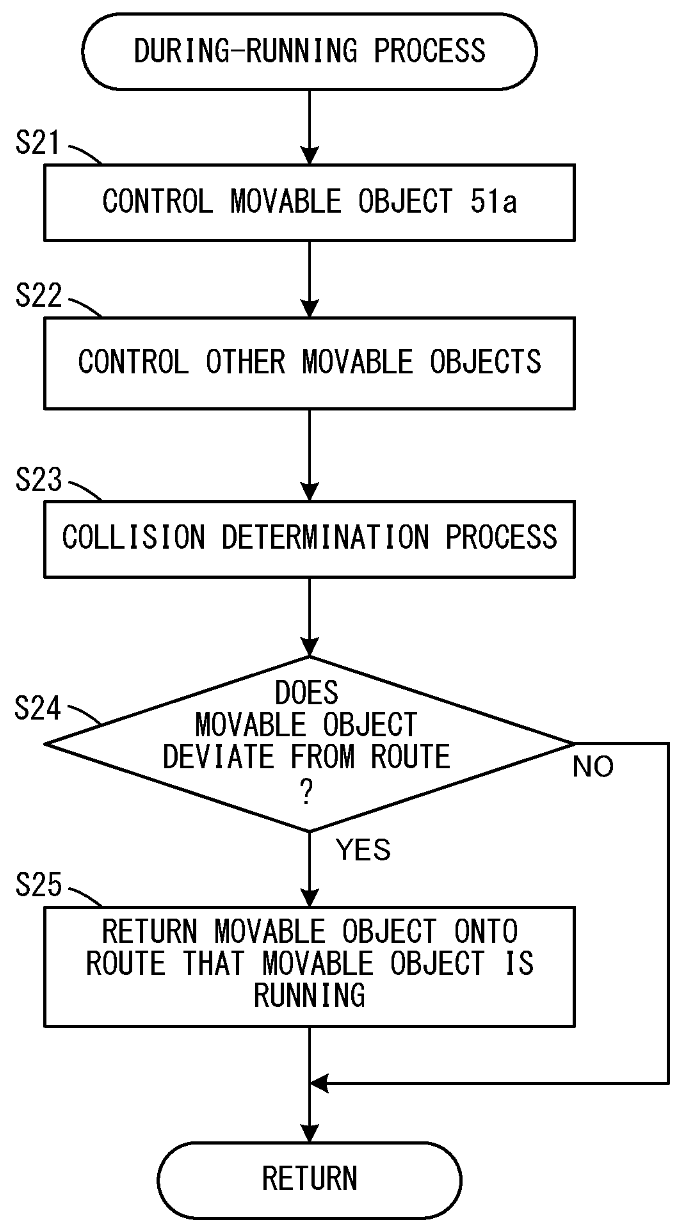
FIG. 31 is an example non-limiting flow chart showing the details of a during-running process in step S14.

Next, the processor 21 performs a during-running process (step S14). The details of the during-running process in step S14 are described below. FIG. 31 is a flow chart showing the details of the during-running process in step S14.

As shown in FIG. 31, based on the operation data, the processor 21 controls the movable object 51*a* (step S21). For example, if a predetermined button (e.g., the A-button) of the controller 4 is pressed, the processor 21 moves the movable object 51*a* forward by a predetermined distance and updates the position of the movable object 51*a*. In accordance with the input direction of the analog stick of the controller 3, the processor 21 controls the direction of the movable object 51*a*. For example, if the movable object 51*a* owns a first item and a predetermined button of the controller 3 is pressed, the processor 21 causes the movable object 51*a* to use the first item. For example, the first item is shot from the movable object 51*a* into the virtual space and starts moving on the course. If the movable object 51*a* uses a second item, the processor 21 temporarily increases the velocity of the movable object 51*a*. Based on the operation data, the processor 21 also causes the movable object 51*a* to jump in the virtual space or perform a predetermined action in the virtual space.

Next, the processor 21 controls the other movable objects (51*b*, 51*c*, and the like) (step S22). If the game is performed in the single-play mode, the processor 21 controls the other movable objects in accordance with the situation of the game in accordance with a predetermined algorithm. For example, the processor 21 moves the movable object 51*b* along a fixed route of the course or causes the movable object 51*b* to perform a predetermined action. The processor 21 also causes the movable object 51*b* to use an item owned by the movable object 51*b* or causes the movable object 51*b* to jump. If the game is performed in the multiplay mode, based on data acquired from other apparatuses, the processor 21 controls the movable objects (51*b*, 51*c*, and the like) relating to the other players.

Next, the processor 21 performs a collision determination process (step S23). Here, a collision determination (a contact determination) between various objects placed in the virtual space and the movable objects (51*a* to 51*c* and the like) is made, and a process relating to the result of the determination is performed. For example, in a case where the movable object 51*a* is running an inter-base route R, it is determined whether or not the movable object 51*a* comes into contact with the first item giving objects 54. For example, based on the position of the movable object 51*a* and the position of the first item giving objects 54, it is determined whether or not the movable object 51*a* comes into contact with the first item giving objects 54. For example, if the movable object 51*a* passes through the inside of the semicircle indicated by the first item giving objects 54, it is determined that the movable object 51*a* and the first item giving objects 54 come into contact with each other. If the movable object 51*a* and the first item giving objects 54 come into contact with each other, an item is given to the movable object 51*a*. If the movable object 51*a* is running an intra-base route CA, it is determined whether or not the movable object 51*a* comes into contact with the second item giving objects 59. For example, based on the position of the movable object 51*a* and the position of the second item giving objects 59, it is determined whether or not the movable object 51*a* comes into contact with the second item giving objects 59. If the movable object 51*a* comes into contact with the second item giving objects 59, an item is given to the movable object 51*a*. A similar process is also performed on the other movable objects.

In step S23, it is also determined whether or not each movable object collides with an item placed in the virtual space. As described above, if an item is used by a movable object, the item is shot into the virtual space and moves in the virtual space. In the virtual space, there are items placed in advance. In step S23, it is determined whether or not each movable object collides with these items. If the movable object collides with an item, a process relating to the item with which the movable object collides is performed. For example, if the movable object 51*a* collides with a first item shot by the movable object 51*b*, a process relating to the first item is performed. For example, if the first item is an item that decreases the velocity of a movable object, the velocity of the movable object 51*a* is decreased. A similar process is also performed on the other movable objects.

In step S23, it is also determined whether or not each movable object collides with a course object placed in the virtual space. The course object is an object such as a wall or an obstacle that defines the course where the movable object moves. If the movable object collides with the course object, the movable object stops, decreases its velocity, or is bounced.

Next, the processor 21 determines whether or not each movable object deviates from a route that the movable object is running (step S24). For example, if the movable object 51*a* is running the inter-base route R1, based on the position of the movable object 51*a* and the width of the road 52 of the route R1, the processor 21 determines whether or not the movable object 51*a* deviates from the route R1. For example, if the movable object 51*a* moves from the boundary set between the road 52 and the ground 60 beyond a second distance, the processor 21 may determine that the movable object 51*a* deviates from the route R1. For example, if the movable object 51*a* is running the intra-base route CA2, based on the position of the movable object 51*a* and the width of the road 58 of the route CA2, the processor 21 determines whether or not the movable object 51*a* deviates from the route CA2. For example, if the movable object 51*a* moves from the boundary between the road 58 and the ground 60 beyond a first distance, the processor 21 may determine that the movable object 51*a* deviates from the route CA2. The processor 21 also makes a similar determination on the other movable objects 51*b*, 51*c*, and the like.

If it is determined that the movable object deviates from the route that the movable object is running (step S24: YES), the processor 21 returns the movable object having deviated from the route onto the route that the movable object is running. Specifically, the processor 21 places the movable object having deviated from the route to an initial position in a section where the movable object was running immediately before deviating (step S25).

If the process of step S25 is executed, or if the determination is NO in step S24, the processor 21 ends the process shown in FIG. 31, and the processing returns to FIG. 30.

Referring back to FIG. 30, after the process of step S14, in accordance with the position of the movable object 51*a*, the processor 21 sets the degree of progress and the ranking (step S15). Specifically, in accordance with the current position of the movable object 51*a* on the small course, the processor 21 sets the degree of progress. Specifically, the processor 21 sets a value relating to the fact that the movable object 51*a* passes through a gate as the degree of progress. In accordance with the position of the movable object 51*a* and the positions of the other movable objects, the processor 21 also sets the current ranking of the movable object 51*a*. Consequently, the lap display 56 and the ranking display 57 are updated.

Next, the processor 21 performs a drawing process (step S16). Here, a game image relating to the results of the processes of the above steps S13 to S15 is generated. The process of step S16 is executed at predetermined frame time intervals, whereby the state where the movable object 51*a* moves on the course is displayed, and a game image relating to the movement is displayed.

Next, based on the position of the movable object 51*a*, the processor 21 determines whether or not to end the small course (step S17). If the movable object 51*a* reaches a goal on the small course (a gate of an intra-base route CA), the determination of the processor 21 is YES in step S17. If the movable object 51*a* does not reach the goal on the small course, the determination of the processor 21 is NO in step S17. For example, in a case where the movable object 51*a* is running the small course C11-0, and if the movable object 51*a* passes through the gate set on the route CA1 a predetermined number of times, the processor 21 determines that the small course C11-0 is to be ended. Moreover, for example, in a case where the movable object 51*a* is running the small course C11-1, and if the movable object 51*a* reaches the gate set on the route CA2, the processor 21 determines that the small course C11-1 is to be ended.

If the determination is NO in step S17, the processor 21 executes the process of step S13 again.

If the determination is YES in step S17, the processor 21 determines whether or not all the small courses end (step S18). Here, it is determined whether or not the entirety of the set course of the first game (e.g., the course C11) ends. For example, in a case where the first game is performed on the course C11, and if the last small course C11-3 ends, the determination of the processor 21 is YES in step S18.

If the determination is NO in step S18, the processor 21 transitions to a next small course (step S19). For example, in a case where the first game is performed on the course C11, and if it is determined in step S17 that the small course C11-0 ends, the processor 21 transitions to the small course C11-1 next. Consequently, the next small course C11-1 is set on the field. The small course C11-1 is a course where each movable object starts from the intra-base route CA1, passes through the inter-base route R1 without taking a lap around the intra-base route CA1, and takes a predetermined number of laps around the intra-base route CA2. For example, an obstacle object for leading the movable object to the route R1 is set on the intra-base route CA1. The first item giving objects and the second item giving objects are also set on the course. Before a transition is made to the next small course C11-1, the result of the small racing game GC11-0 on the small course C11-0 may be displayed. For example, the ranking of the movable object 51*a*, the number of coins owned by the movable object 51*a*, and the like at the time when the movable object 51*a* reaches the goal of the small course C11-0 may be displayed on the display 12.

If the process of step S19 is performed, the processor 21 performs the process of step S11 again and places the plurality of movable objects at a gate on the next small course (e.g., the small course C11-1). Here, the positions of the movable objects at the gate on the next small course differ in accordance with the result of the small racing game on the immediately preceding small course. For example, the positions of the movable objects at the gate of the small course C11-1 differ in accordance with the result of the small course C11-0. For example, a movable object having finished first in the small racing game GC11-0 on the small course C11-0 is placed at a first position at the gate on the next small course C11-1. A movable object having finished second in the small racing game GC11-0 on the small course C11-0 is placed at a second position at the gate on the next small course C11-1. An item and a coin gained by each movable object in the small racing game GC11-0 on the small course C11-0 are carried over to the small racing game GC11-1 on the next small course C11-1.

If the determination is YES in step S18, the processor 21 ends the first game. When the first game is ended, the result of the first game is displayed on the display 12. For example, the result of the first game relating to the ranking of the movable object 51*a* at the time when the movable object 51*a* reaches the last goal of the course C11 (the time when the movable object 51*a* reaches a goal of the small course C11-3), the number of coins gained by the movable object 51*a*, and the like may be displayed on the display 12.

After the first game ends, a fourth game process described below may be performed.

(Second Game Process)

Figure 32:
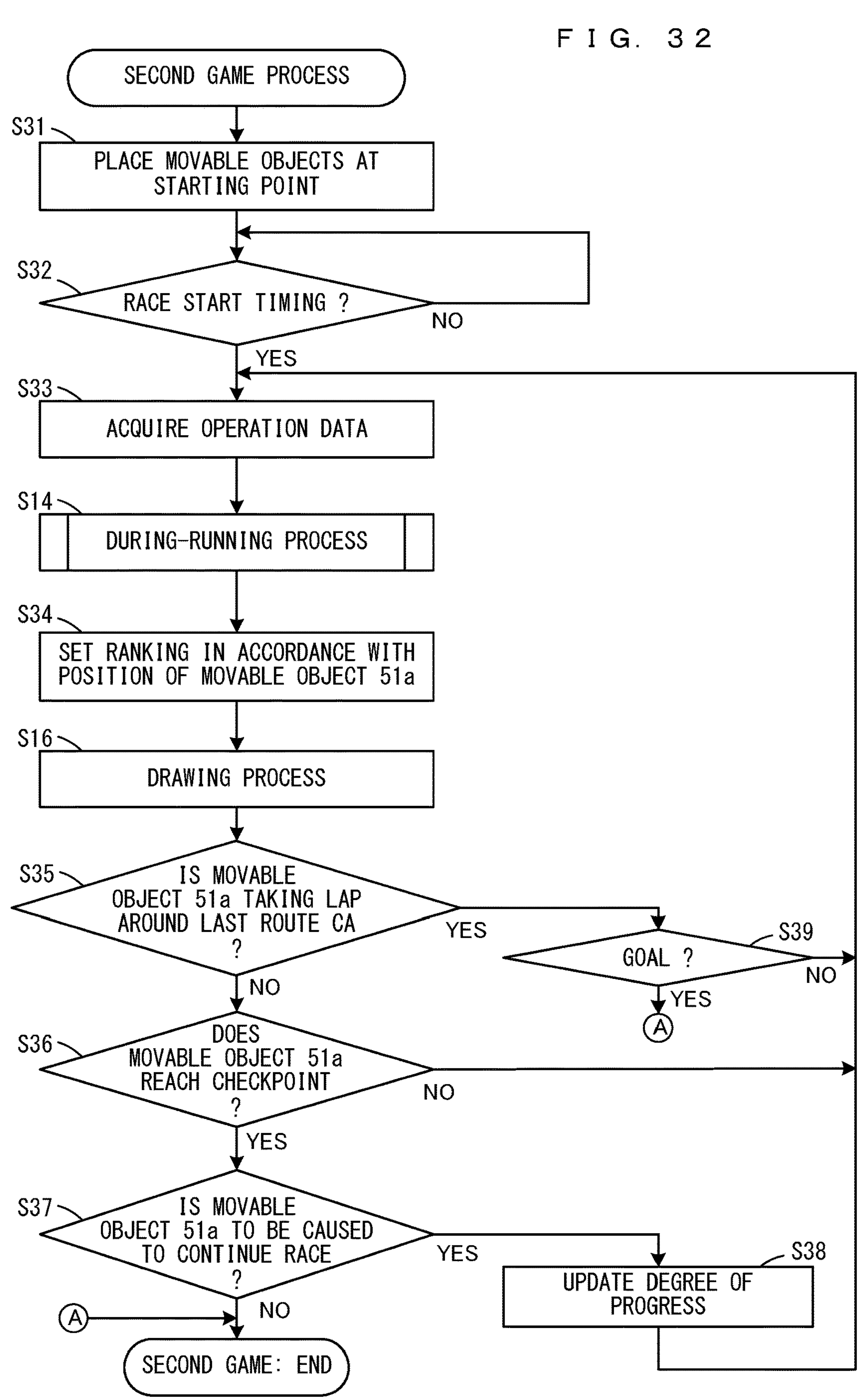
FIG. 32 is an example non-limiting flow chart showing an example of a second game process.

Next, a second game process is described. FIG. 32 is a flow chart showing an example of the second game process. The second game process is executed in a case where in the above game determination process, it is determined that the second game is to be performed. In FIG. 32, processes similar to those in FIG. 30 are designated by the same signs as those in FIG. 30, and are not described in detail.

First, the processor 21 places a plurality of movable objects at a starting point (step S31). Here, suppose that the course C20 is determined in the game determination process among the plurality of courses prepared for the second game (see FIG. 15). Specifically, in step S31, the processor 21 places the plurality of movable objects at the gate of the intra-base route CA4 provided in the base area A4. Here, a plurality of movable objects including the movable object 51*a* (the operating object) relating to the player A of the main body apparatus 2 and the movable objects 51*b* and 51*c* controlled by the processor 21 are placed. If the second game is performed in the multiplay mode, the movable object 51*b* may be controlled by the player B, and the movable object 51*c* may be controlled by the player C.

Next, the processor 21 determines whether or not the current time is a race start timing (step S32). The process of step S32 is similar to the process of step S12, and therefore is not described in detail.

If the determination is YES in step S32, the processor 21 acquires the operation data (step S33). The process of step S33 is similar to the process of the above step 13. If the determination is YES in step S32, the processor 21 repeatedly executes the processes of step S33 and subsequent steps at predetermined frame time intervals (e.g., 1/60-second intervals).

Next, the processor 21 executes a during-running process (step S14). The during-running process is as described above.

After the during-running process, in accordance with the position of the movable object 51*a*, the processor 21 sets the ranking (step S34). Specifically, in accordance with the position of the movable object 51*a* and the positions of the other movable objects, the processor 21 updates the current ranking of the movable object 51*a*. Consequently, the ranking display 57 is updated.

After step S34, the processor 21 performs a drawing process (step S16).

Next, the processor 21 determines whether or not the movable object 51*a* is taking a lap around the route CA11 provided in the last base area A11 on the course C20 (step S35).

If it is determined that the movable object 51*a* is not taking a lap around the last route CA11 (step S35: NO), the processor 21 determines whether or not the movable object 51*a* reaches a checkpoint CP set on the course C20 (step S36). On the course C20 including a plurality of continuous inter-base routes R, a plurality of checkpoints CP (CP1 to CP3) are set. Specifically, the checkpoint CP1 is set at the gate of the intra-base route CA1 in the base area A1, the checkpoint CP2 is set at the gate of the intra-base route CA2 in the base area A2, and the checkpoint CP3 is set at the gate of the intra-base route CA3 in the base area A3. For example, if the movable object 51*a* is running the route R11, it is determined whether or not the movable object 51*a* reaches the checkpoint CP1. If the movable object 51*a* is running the route R1, it is determined whether or not the movable object 51*a* reaches the checkpoint CP2. If the movable object 51*a* is running the route R2, it is determined whether or not the movable object 51*a* reaches the checkpoint CP3. A checkpoint CP4 may or may not be provided in the base area A11.

If the determination is NO in step S36, the processor 21 executes the process of step S33 again.

If the determination is YES in step S36, the processor 21 determines whether or not to cause the movable object 51*a* to continue the race (step S37). Here, in accordance with the ranking of the movable object 51*a* when reaching the checkpoint, it is determined whether or not the movable object 51*a* satisfies the race continuation condition. For example, in a case where the movable object 51*a* is running the route R11, and if the ranking of the movable object 51*a* when reaching the checkpoint CP1 places top twelve, the processor 21 determines that the movable object 51*a* is to be caused to continue the race. In a case where the movable object 51*a* is running the route R1, and if the ranking of the movable object 51*a* when reaching the checkpoint CP2 places top ten, the processor 21 determines that the movable object 51*a* is to be caused to continue the race. In a case where the movable object 51*a* is running the route R2, and if the ranking of the movable object 51*a* when reaching the checkpoint CP3 places top eight, the processor 21 determines that the movable object 51*a* is to be caused to continue the race.

If it is determined that the movable object 51*a* is to be caused to continue the race (step S37: YES), the processor 21 updates the degree of progress (step S38). Specifically, the processor 21 adds 1 to the degree of progress of the movable object 51*a* that is included in the operating object data. Consequently, the lap display 56 is updated. If the process of step S38 is performed, the processor 21 executes the process of step S33 again.

If it is determined that the movable object 51*a* is not to be caused to continue the race (step S37: NO), the processor 21 causes the movable object 51*a* to drop out of the race, and ends the second game. Before ending the second game, the processor 21 displays an image indicating that the movable object 51*a* drops out of the race. After the movable object 51*a* drops out of the race, the second game by other movable objects may be continued, and the state of the second game may be displayed on the display 12.

If, on the other hand, it is determined that the movable object 51*a* is taking a lap around the last route CA11 (step S35: YES), the processor 21 determines whether or not the movable object 51*a* reaches the goal (the gate) provided on the route CA11 (step S39).

If the movable object 51*a* reaches the goal provided on the route CA11 (step S39: YES), the processor 21 displays the result of the second game and ends the second game. If, on the other hand, the movable object 51*a* does not reach the goal (step S39: NO), the processor 21 executes the process of step S33 again. In a case where the determination is NO in step S39, and if the movable object 51*a* passes through the gate of the route CA11, 1 is added to the degree of progress, and the lap display 56 is updated.

After the second game ends, a fourth game process described below may be performed.

(Third Game Process)

Next, a third game process is described. Here, the third game is performed on the course described in FIGS. 25 and 26.

FIG. 33 is a flow chart showing an example of the third game process. The third game process is executed in a case where in the above game determination process, it is determined that the third game is to be performed. In FIG. 33, processes similar to those in FIG. 30 are designated by the same signs as those in FIG. 30, and are not described in detail.

As described above, the third game is performed by a plurality of players by the main body apparatus 2 and the server placed on the Internet communicating with each other. The description is given below on the assumption that a player PA of the main body apparatus 2 controls the movable object 51A1 (the operating object), and the other players control other movable objects.

First, the processor 21 places a plurality of movable objects including the movable object 51A1 at a start position (step S51). Specifically, the processor 21 places the plurality of movable objects at the position of a gate of an intra-base route CA determined by the server. For example, if the first round is performed on the course exemplified in FIGS. 25 and 26, the processor 21 places the movable object 51A1 at the position of the gate on the intra-base route CA1 of the base area A1. Based on information acquired from the server, the processor 21 places the movable objects 51A2 to 51A4 at this position. If the second round is performed, the processor 21 places the movable object 51A1 at the position of the gate on the intra-base route CA3 of the base area A3, and based on information acquired from the server, also places other movable objects controlled by other players (movable objects having won through from the movable objects 51B1 to 51B4). Consequently, the racing game in the second round to be performed by movable objects having won through is prepared. As described above, if the movable object 51A1 wins through the racing game in each round, a plurality of movable objects having won through and including the movable object 51A1 are placed at a start position (the position of a gate) of a next course. Also if the movable object 51A1 does not win through (drops out of) the racing game in each round, a next course is set, and the movable object is placed at a start position of the next course. For example, if the movable object 51A1 drops out in the first round, the processor 21 places the movable object 51A1 at the position of the gate of the intra-base route CA3 of the base area A3, and based on information acquired from the server, also places other movable objects controlled by other players (movable objects having dropped out among the movable objects 51B1 to 51B4). Consequently, the racing game to be performed by the movable objects having dropped out is prepared.

Next, the processor 21 determines whether or not the current time is a race start timing (step S52). If a predetermined time (e.g., 3 seconds) elapses after the plurality of movable objects are placed at the starting point, the determination of the processor 21 is YES in step S52. The processor 21 repeatedly performs the process of step S52 until the predetermined time elapses. For example, the processor 21 may automatically move the plurality of movable objects along the course until the predetermined time elapses after the plurality of movable objects are placed. The processor 21 may stop the plurality of movable objects at the starting point until the predetermined time elapses after the plurality of movable objects are placed.

If the determination is YES in step S52, the processor 21 acquires the operation data (step S53). Specifically, the processor 21 acquires the operation data from the controllers 3 and 4 that is stored in the memory. From this point onward, the processor 21 repeatedly executes the processes of steps S53 to S57 at predetermined frame time intervals (e.g., 1/60-second intervals).

Next, the processor 21 acquires information regarding the other movable objects from the server (step S54). The server stores information regarding other movable objects (e.g., the movable objects 51A2 to 51A4) that is transmitted from the main body apparatuses 2 relating to other players (e.g., the players PA2 to PA4). The processor 21 acquires the information regarding the other movable objects from the server via the network communication section 24 and stores the information as the other movable object data in the memory. The information regarding the other movable objects is information for controlling the other movable objects. For example, the information regarding the other movable objects includes the positions on the course, the orientations, the velocities, the moving directions, and the states of the other movable objects, an item owned by each other movable object, an item used by each other movable object, information regarding whether or not each other movable object collides with another object, and the like.

Next, the processor 21 performs a during-running process (step S14). The during-running process is as described with reference to FIG. 31. In the during-running process in the third game, the processor 21 controls the other movable objects based on the information regarding the other movable objects acquired in step S54.

Next, in accordance with the position of the movable object 51A1, the processor 21 sets the degree of progress and the ranking. Specifically, in accordance with the number of times the movable object 51A1 passes through a gate on an intra-base route, the degree of progress is set. For example, if the movable object 51A1 is running the route R1 on the course of the first round, "1" is set as the degree of progress. If the movable object 51A1 is running the route R2 on the course of the first round, "2" is set as the degree of progress. In accordance with the position of the movable object 51A1 and the positions of the other movable objects 51A2 to 51A4, the processor 21 sets the current ranking of the movable object 51A1. Consequently, the lap display 56 and the ranking display 57 are updated.

Next, the processor 21 performs a drawing process (step S16). Here, a game image relating to the results of the processes of the above steps S53 to S55 is generated.

Next, the processor 21 determines whether or not the movable object 51A1 is taking a lap around the intra-base route CA13 (step S56). Here, it is determined whether or not the movable object 51A1 is performing the racing game in the final in the last base area A13.

If the movable object 51A1 is not taking a lap around the intra-base route CA13 (step S56: NO), the processor 21 determines whether or not the movable object 51A1 reaches a merging base (step S57). For example, if the movable object 51A1 is running the course of the first round, the processor 21 determines whether or not the movable object 51A1 reaches the base area A3 (the gate of the intra-base route CA3). If the movable object 51A1 is running the course of the second round, the processor 21 determines whether or not the movable object 51A1 reaches the base area A13 (the gate of the intra-base route CA13).

If the movable object 51A1 does not reach a merging base (step S57: NO), the processor 21 executes the process of step S53 again.

If the movable object 51A1 reaches a merging base (step S57: YES), the processor 21 determines whether or not the movable object 51A1 wins through (step S58). Specifically, the processor 21 determines whether or not the movable object 51A1 satisfies a winning-through condition relating to the course that the movable object 51A1 is running. For example, if the movable object 51A1 is running the course of the first round, the processor 21 determines whether or not the ranking of the movable object 51A1 when reaching the base area A3 places top two.

If it is determined that the movable object 51A1 wins through (step S58: YES), the processor 21 causes the movable object 51A1 to win through, and sets a next course (step S59). For example, if the movable object 51A1 is running the course of the first round and reaches the base area A3, the processor 21 sets the course of the second round (the course including the inter-base routes R3 and R15) and causes the movable object 51A1 to advance to the set course. If the movable object 51A1 is running the course of the second round and reaches the base area A13, the processor 21 sets the course of the final (the course where the movable object 51A1 takes a lap around intra-base route CA13) and causes the movable object 51A1 to advance to the set course. In the setting of the next course, the first item giving objects 54 are placed on an inter-base route, and the second item giving objects 59 are placed on an intra-base route. In step S59, the processor 21 waits until a movable object passing through another route reaches the merging base. For example, when the movable object 51A1 reaches the base area A3, and if the movable object 51B having started from the base area A4 does not reach the base area A3, the processor 21 waits until the movable object 51B reaches the base area A3. During this waiting period, the processor 21 displays on the display 12 a predetermined image indicating that the movable object 51A1 is waiting. If the movable object 51B reaches the base area A3, or if the movable object 51B has already reached the base area A3, after the process of step S59, the processor 21 executes the process of step S51 again.

If it is determined that the movable object 51A1 does not win through (step S58: NO), the processor 21 causes the movable object 51A1 to drop out, and sets a next course (step S60). The setting of the next course is as described in step S59. On the next course, movable objects having dropped out (lost) perform a racing game. After the process of step S60, the processor 21 executes the process of step S51 again. If the movable object 51A1 does not win through, the processor 21 may end the third game. In this case, before ending the third game, the processor 21 may display an image indicating that the movable object 51A1 drops out of the race.

If, on the other hand, the movable object 51A1 is taking a lap around the intra-base route CA13 (step S56: YES), the processor 21 determines whether or not the movable object 51A1 reaches the goal of the intra-base route CA13 (step S61).

If the movable object 51A1 does not reach the goal (step S61: NO), the processor 21 executes the process of step S53 again. In a case where the determination is NO in step S61, and if the movable object 51A1 passes through the gate of the route CA13, 1 is added to the degree of progress, and the lap display 56 is updated.

If the movable object 51A1 reaches the goal (step S61: YES), the processor 21 displays the result of the third game and ends the third game.

After the third game ends, a fourth game process described below may be performed.

(Fourth Game Process)

Figure 34:
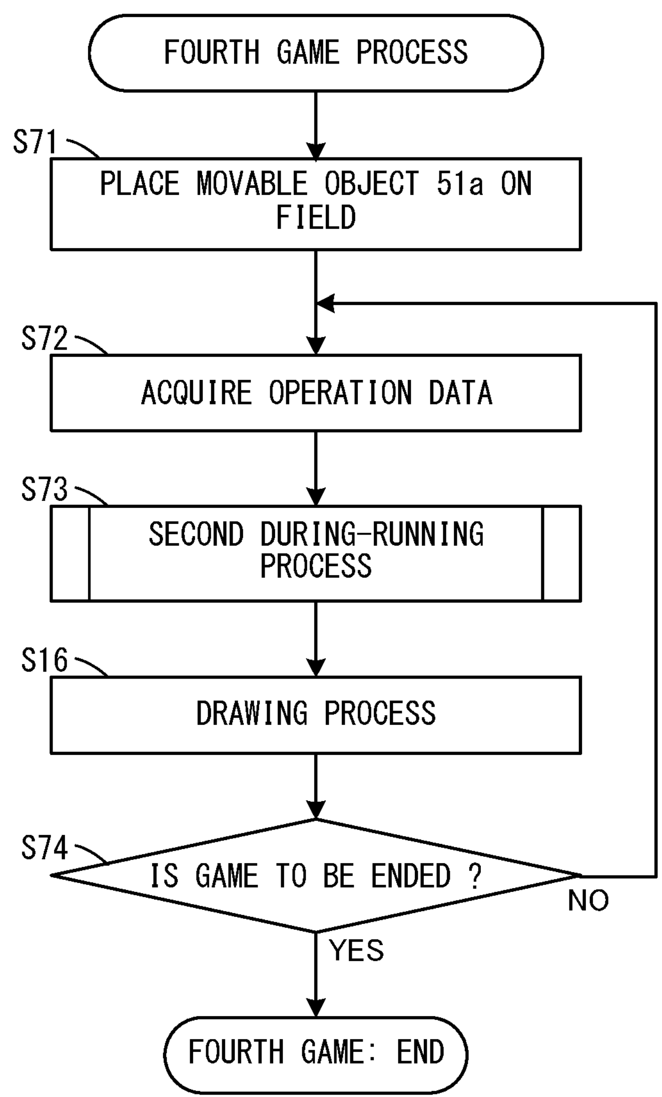
FIG. 34 is an example non-limiting flow chart showing an example of a fourth game process.

Next, a fourth game process is described. FIG. 34 is a flow chart showing an example of the fourth game process. The fourth game process is executed in a case where in the above game determination process, it is determined that the fourth game is to be performed. The fourth game process may be executed after the above first to third game processes end.

In FIG. 34, the description is given on the assumption that the fourth game is performed using the movable object 51*a* controlled by the player A of the main body apparatus 2.

First, the processor 21 places the movable object 51*a* on the field (step S71). Specifically, if the fourth game is determined in the game determination process, the position where the fourth game is started is specified based on an operation of the player A. In step S71, the processor 21 places the movable object 51*a* at a position specified by the player. If the fourth game is performed after the first to third games, the fourth game may be started at the position where the first to third games have ended.

Next, the processor 21 acquires the operation data (step S72). From this point onward, the processor 21 repeatedly executes the process of steps S72 to S74 at predetermined frame time intervals (e.g., 1/60-second intervals).

Figure 35:
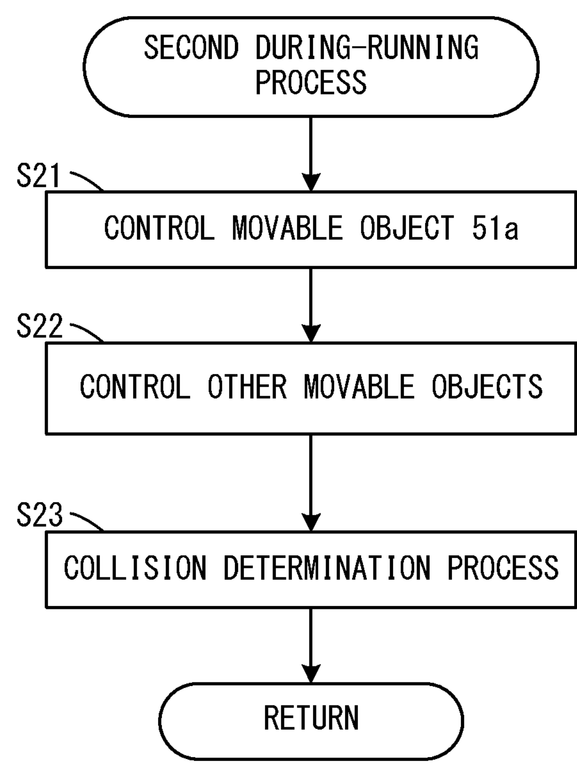
FIG. 35 is an example non-limiting flow chart showing the details of a second during-running process in step S73.

Next, the processor 21 performs a second during-running process (step S73). The details of the second during-running process in step S73 are described below. FIG. 35 is a flow chart showing the details of the second during-running process in step S73.

In the second during-running process in FIG. 35, similarly to the during-running process in FIG. 31, the process of controlling the movable object 51*a* (step S21), the process of controlling the other movable objects (step S22), and a collision determination process (step S23) are performed. Specifically, in step S21, based on the operation data, the processor 21 causes the movable object 51*a* to run through any position on the field. In the fourth game, the movable object 51*a* can deviate from a route set on the field in the virtual space and move through any place. That is, in the fourth game, a course object that restricts the movement of the movable object 51*a* is not placed on the field.

In the second during-running process in FIG. 35, the process of determining whether or not the movable object 51 deviates from a route (step S24) and the process of returning the movable object 51 onto the route in a case where the movable object 51 deviates (step S25) are not performed.

Referring back to FIG. 34, after the process of step S73, the processor 21 performs a drawing process (step S16).

Next, the processor 21 determines whether or not to end the game (step S74). Here, for example, it is determined whether or not the player gives an instruction to end the game. If the player determines another game and determines a course, the determination of the processor 21 is YES in step S74.

If it is determined that the game is to be ended (step S74: YES), the processor 21 ends the process shown in FIG. 34. If, on the other hand, it is not determined that the game is to be ended (step S74: NO), the processor 21 performs the process of step S72 again.

(Fifth Game Process)

Figure 36:
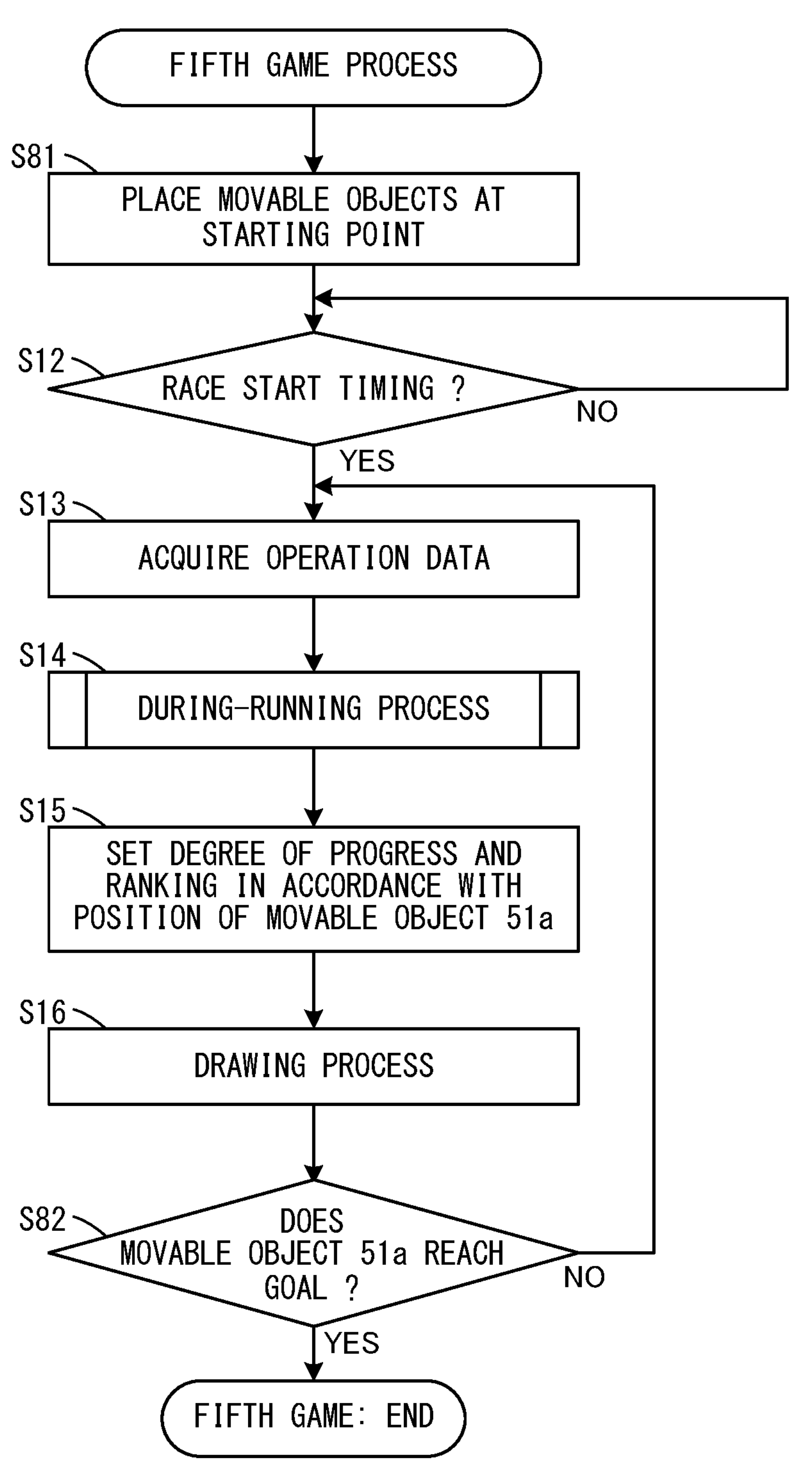
FIG. 36 is an example non-limiting flow chart showing an example of a fifth game process.

Next, a fifth game process is described. FIG. 36 is a flow chart showing an example of the fifth game process. The fifth game process is executed in a case where in the above game determination process, it is determined that the fifth game is to be performed.

The fifth game is a game where a plurality of movable objects take a predetermined number of laps (e.g., three laps) around an intra-base route. In the above course setting process, an intra-base route selected among a plurality of intra-base routes is set, and the second item giving objects 59 are placed at a predetermined position on the intra-base route. The fifth game process is almost the same as the first game process except that a course that the movable objects run is an intra-base route. In FIG. 36, processes similar to those in FIG. 30 are designated by the same signs as those in FIG. 30, and are not described in detail.

The fifth game may be performed in the single-play mode, or may be performed in the multiplay mode. In FIG. 36, the description is given on the assumption that the fifth game is performed in the single-play mode. The description is given on the assumption that the fifth game is performed using the movable object 51*a* controlled by the player A of the main body apparatus 2 and the movable objects 51*b* and 51*c* controlled by the processor 21.

First, the processor 21 places the movable object 51*a* and the plurality of movable objects 51*b* and 51*c* at a starting point (step S81). Specifically, the processor 21 places the movable objects 51*a* to 51*c* at the position of a gate of an intra-base route CA set in the game determination process.

Next, the processor 21 performs the processes of steps S13 to S16. The processes of steps S13 to S16 are as described above. For example, in step S15, in accordance with the position of the movable object 51*a*, the degree of progress is set. Specifically, every time the movable object 51*a* passes through the gate of the intra-base route CA, 1 is added to the degree of progress. Consequently, the lap display 56 is updated.

Next, the processor 21 determines whether or not the movable object 51*a* takes a predetermined number of laps around the intra-base route CA and reaches the goal (step S82). In a case where the movable object 51*a* is running a lap corresponding to a predetermined number (e.g., a third lap), and if the movable object 51*a* reaches the gate provided on the intra-base route CA, the determination of the processor 21 is YES in step S82.

If the movable object 51*a* reaches the goal (step S82: YES), the processor 21 displays the result of the fifth game and ends the fifth game. If the movable object 51*a* does not reach the goal (step S82: NO), the processor 21 executes the process of step S13 again.

(Other Game Processes)

If the sixth game is determined in the game determination process, a sixth game process is performed. The sixth game process is basically the same as the fifth game process except that time is measured, and therefore is not described in detail.

If the seventh game is determined in the game determination process, a seventh game process is performed. If an eighth game is determined in the game determination process, an eighth game process is performed. The details of the seventh game process and the eighth game process are not described.

The processes shown in the above flow charts are merely illustrative, and the order and the contents of the processes, and the like may be appropriately changed.

As described above, in the exemplary embodiment, a plurality of base areas are placed on the field in the virtual space, and an intra-base route CA is provided in each base area. An inter-base route R connecting base areas is also set. In the field including such a plurality of base areas and an inter-base route R, various games are performed.

For example, in the first game, a racing game is performed on a course including an inter-base route R and a route where each movable object takes a predetermined number of laps around an intra-base route CA. Consequently, it is possible to also include a portion between base areas in a part of the race, and it is possible to perform a racing game on an unconventional variety of courses.

In the second game, a racing game is performed on a course including a plurality of continuous inter-base routes R and a route where each movable object takes a predetermined number of laps around an intra-base route CA set in a base area that the movable object reaches via the plurality of inter-base routes R. In the second game, a checkpoint CP is set in each base area, and only a movable object satisfying a race continuation condition when reaching the checkpoint CP can advance to a next inter-base route R. Consequently, on a course including a plurality of inter-base routes, it is possible to perform a racing game including an element of survival.

In the third game, movable objects relating to a plurality of players start from a plurality of base areas and race toward a merging base. In the merging base, the plurality of movable objects having started from the plurality of base areas merge together, and the plurality of movable objects race by taking a predetermined number of laps around an intra-base route CA set in the merging base. Movable objects satisfying a winning-through condition among the plurality of movable objects having reached the merging base perform a next race. Movable objects that do not satisfy the winning-through condition among the plurality of movable objects having reached the merging base perform a next different race. Consequently, on a course including a plurality of inter-base routes and intra-base routes, a plurality of players can perform a game by a tournament method.

In the fourth game, a player freely moves a movable object on the field including an inter-base route R and an intra-base route CA. Consequently, the player can freely cause the movable object to run an intra-base route and an inter-base route set on the field.

(Variations)

While the exemplary embodiment has been described above, the exemplary embodiment is merely an example and may be modified as follows, for example.

For example, in the above exemplary embodiment, a plurality of types of games can be executed, and the player selects and executes any of the plurality of types. In another exemplary embodiment, the type of game may be a single type. For example, a game program according to another exemplary embodiment may be able to execute only the above first game, and a plurality of courses for the first game may be prepared in advance. In this case, in the above game determination process, any of the plurality of courses is determined based on an operation input provided by the player. Similarly, a game program according to another exemplary embodiment may be able to execute only the above second game, and a plurality of courses for the second game may be prepared in advance. Then, in the game determination process, any of the plurality of courses may be determined based on an operation input provided by the player. A game program according to another exemplary embodiment may be able to execute only the above third game, and a plurality of courses for the third game may be prepared in advance. Then, in the game determination process, any of the plurality of courses may be determined based on an operation input provided by the player.

In the above exemplary embodiment, the player determines the type of game and determines a course of the determined game. In another exemplary embodiment, the type of game and/or a course may be determined not by the player but automatically (by the processor 21). For example, after the player determines the type of game, any of a plurality of courses prepared for the determined type of game may be automatically determined. The type of game may be automatically determined.

The courses in the above first to third games are merely examples, and a course set in each game may be used in another game. For example, the course C11 set in the above first game may be used in the second game. In this case, a plurality of checkpoints are set on the course C11, and at each checkpoint, it may be determined whether or not a race continuation condition is satisfied.

In the above exemplary embodiment, a course created by a game developer is stored in advance in the game system 1. In another exemplary embodiment, a course including a plurality of inter-base routes and intra-base routes placed on the field may be set by the player.

In the above exemplary embodiment, in the first to third games, it is determined whether or not a movable object deviates from an inter-base route. If the movable object deviates, the movable object is returned onto the route. In another exemplary embodiment, in the first to third games, even if a movable object deviates from an inter-base route, the movable object may not be returned onto the route.

The above processing may be executed not only by the game system 1, but also by any other information processing apparatus or information processing system. The information processing system may include a plurality of apparatuses, and the plurality of apparatuses may be connected to each other via a network (e.g., a LAN, the Internet, or the like).

The configurations of the above exemplary embodiment and its variations can be optionally combined together unless they contradict each other. Further, the above description is merely an example of the exemplary embodiment, and may be improved and modified in various manners other than the above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. One or more non-transitory computer-readable media having stored therein instructions that, when executed, cause one or more processors of an information processing apparatus to execute game processing comprising:

based on an operation input, causing an operating object to run on a field in a virtual space, wherein a plurality of base areas are set on the field;

in a case where a type of a race to be performed by the operating object and at least one other movable object is determined and an instruction to start the race is given based on an operation input, if the determined race is a specific type of race, setting a course at least including an intra-base route that is a path set in any of the base areas and an inter-base route set as a path connecting the base areas;

starting the race; and causing the operating object and the movable object to run along the set course on the field, thereby performing the race.

2. The one or more non-transitory computer-readable media according to claim 1, wherein the game processing further comprises, if the determined race is a first type of race as the specific type of race, setting a course at least including the inter-base route between a first base area and a second base area, and a route where the operating object and the movable object take a predetermined number of laps around the intra-base route in the second base area and reach a goal after the inter-base route.

3. The one or more non-transitory computer-readable media according to claim 2, wherein the game processing further comprises, after the first type of race ends, setting a course at least including the inter-base route between the second base area and a third base area, and a route where the operating object and the movable object take a predetermined number of laps around the intra-base route in the third base area and reach a goal after the inter-base route, and further starting a race.

4. The one or more non-transitory computer-readable media according to claim 1, wherein the game processing further comprises, if the determined race is a second type of race as the specific type of race, setting a course where the operating object and the movable object take a predetermined number of laps around the intra-base route of one of the base areas that a plurality of continuous inter-base routes reach last, and reach a goal.

5. The one or more non-transitory computer-readable media according to claim 1, wherein the game processing further comprises, if the determined race is a second type of race, setting a course at least including a plurality of continuous inter-base routes.

6. The one or more non-transitory computer-readable media according to claim 1, wherein the game processing further comprises:

if the determined race is a third type of race as the specific type of race, setting a course where starting points are set in the plurality of base areas, and in one of the base areas that a route reaches on a path via the plurality of continuous inter-base routes, the route merges with a route where a starting point is in another one of the base areas, and the operating object and the movable object take a predetermined number of laps around the intra-base route of one of the base areas that the plurality of continuous inter-base routes reach last, and reach a goal; and starting the operating object from any of the plurality of starting points.

7. The one or more non-transitory computer-readable media according to claim 1, wherein the game processing further comprises:

if the determined race is a third type of race, setting a course where starting points are set in the plurality of base areas, and in one of the base areas that a route reaches on a path via the plurality of continuous inter-base routes, the route merges with a route where a starting point is in another one of the base area, and a goal point is set in the base areas where the routes merge together; and starting the operating object from any of the plurality of starting points.

8. The one or more non-transitory computer-readable media according to claim 1, wherein the game processing further comprises, if the determined race is a fourth type of race, setting a course where the operating object and the movable object take a predetermined number of laps around the intra-base route.

9. The one or more non-transitory computer-readable media according to claim 1, wherein the game processing further comprises, if the determined race is a fifth type of race, setting a course where the operating object and the movable object take a predetermined number of laps around the intra-base route in the first base area, and after the fifth type of race ends, starting the first type of race.

10. The one or more non-transitory computer-readable media according to claim 4, wherein the game processing further comprises:

further setting a checkpoint in any of the base areas located between the plurality of inter-base routes of the course; and in the race, based on a ranking of the operating object in the race at a time when the operating object reaches the checkpoint, causing the operating object to continue the race or causing the operating object to drop out of the race.

11. The one or more non-transitory computer-readable media according to claim 6, wherein the game processing further comprises, in the race, based on a ranking of the operating object in the inter-base routes at the time when the operating object runs the inter-base route and reaches any of the base areas with which the route merges, causing the operating object to continue the race by winning through, or causing the operating object to drop out.

12. The one or more non-transitory computer-readable media according to claim 11, wherein the game processing further comprises, if the operating object is caused to drop out, starting a race with a movable object having dropped out.

13. The one or more non-transitory computer-readable media according to claim 1, wherein the game processing further comprises:

in the race, on the intra-base route, if the operating object goes out of a first range set along the course, returning the operating object into the course; and on the inter-base route, if the operating object goes out of a second range set along the course and set to be wider than the first range, returning the operating object into the course.

14. The one or more non-transitory computer-readable media according to claim 1, wherein the setting of the course further includes placement of an item giving object on the course, and first item giving objects larger than second item giving objects placed on the intra-base route is placed on the inter-base route, and the game processing further comprises, in the race, in accordance with contact between the operating object and the first item giving objects or the second item giving objects, causing the operating object to acquire an item.

15. The one or more non-transitory computer-readable media according to claim 14, wherein the game processing further comprises, in the race, if the operating object or the movable object comes into contact with the second item giving objects, erasing the second item giving objects for at least a predetermined period; and if the operating object or the movable object comes into contact with the first item giving objects, not erasing the first item giving objects.

16. The one or more non-transitory computer-readable media according to claim 15, wherein the field includes a road portion and a portion other than the road portion, the course is set to at least include the road portion, and at least any of the first item giving objects has a shape having a width wider than a width of the road portion on the path of the inter-base route where the first item giving objects are placed.

17. The one or more non-transitory computer-readable media according to claim 1, wherein the game processing further comprises, in the race, if the operating object is in the intra-base route, displaying first map information indicating at least a part of the intra-base route including a position of the operating object; and if the operating object is in the inter-base route, displaying second map information indicating at least a part of the inter-base route including the position of the operating object and a wider range in the field than the first map information.

18. The one or more non-transitory computer-readable media according to claim 1, wherein a plurality of gates are placed on the field, the intra-base route is a route where the operating object and the movable object pass through any of the gates placed in the base areas and reaches the gate again, and the inter-base route is a route where the operating object and the movable object pass through a gate of a first base area and reach a gate of a second base area.

19. The one or more non-transitory computer-readable media according to claim 18, wherein the game processing further comprises, in the race, displaying lap information relating to the number of times the operating object passes through any of the gates.

20. The one or more non-transitory computer-readable media according to claim 1, wherein the game processing further comprises, after the race ends, transitioning to a free running mode for causing the operating object to run on the field, regardless of the course; and in the free running mode, if the type of the race is determined and an instruction to start the race is given based on an operation input, starting the race.

21. An information processing system comprising one or more processors that execute game processing comprising:

based on an operation input, causing an operating object to run on a field in a virtual space, wherein a plurality of base areas are set on the field;

in a case where a type of a race to be performed by the operating object and at least one other movable object is determined and an instruction to start the race is given based on an operation input, if the determined race is a specific type of race, setting a course at least including an intra-base route that is a path set in any of the base areas and an inter-base route set as a path connecting the base areas;

starting the race; and causing the operating object and the movable object to run along the set course on the field, thereby performing the race.

22. The information processing system according to claim 21, wherein the game processing further comprises, if the determined race is a first type of race as the specific type of race, setting a course at least including the inter-base route between a first base area and a second base area, and a route where the operating object and the movable object take a predetermined number of laps around the intra-base route in the second base area and reach a goal after the inter-base route.

23. The information processing system according to claim 22, wherein the game processing further comprises, after the first type of race ends, setting a course at least including the inter-base route between the second base area and a third base area, and a route where the operating object and the movable object take a predetermined number of laps around the intra-base route in the third base area and reach a goal after the inter-base route, and further starting a race.

24. The information processing system according to claim 21, wherein the game processing further comprises, if the determined race is a second type of race as the specific type of race, setting a course where the operating object and the movable object take a predetermined number of laps around the intra-base route of one of the base areas that a plurality of continuous inter-base routes reach last, and reach a goal.

25. The information processing system according to claim 21, wherein the game processing further comprises, if the determined race is a second type of race, setting a course at least including a plurality of continuous inter-base routes.

26. The information processing system according to claim 21, wherein the game processing further comprises:

if the determined race is a third type of race as the specific type of race, setting a course where starting points are set in the plurality of base areas, and in one of the base areas that a route reaches on a path via the plurality of continuous inter-base routes, the route merges with a route where a starting point is in another one of the base areas, and the operating object and the movable object take a predetermined number of laps around the intra-base route of one of the base areas that the plurality of continuous inter-base routes reach last, and reach a goal; and starting the operating object from any of the plurality of starting points.

27. The information processing system according to claim 21, wherein the game processing further comprises:

if the determined race is a third type of race, setting a course where starting points are set in the plurality of base areas, and in one of the base areas that a route reaches on a path via the plurality of continuous inter-base routes, the route merges with a route where a starting point is in another one of the base area, and a goal point is set in the base areas where the routes merge together; and starting the operating object from any of the plurality of starting points.

28. The information processing system according to claim 21, wherein the game processing further comprises, if the determined race is a fourth type of race, setting a course where the operating object and the movable object take a predetermined number of laps around the intra-base route.

29. The information processing system according to claim 22, wherein the game processing further comprises, if the determined race is a fifth type of race, setting a course where the operating object and the movable object take a predetermined number of laps around the intra-base route in the first base area, and after the fifth type of race ends, starting the first type of race.

30. The information processing system according to claim 24, wherein the game processing further comprises:

further setting a checkpoint in any of the base areas located between the plurality of inter-base routes of the course; and in the race, based on a ranking of the operating object in the race at a time when the operating object reaches the checkpoint, causing the operating object to continue the race or causing the operating object to drop out of the race.

31. The information processing system according to claim 26, wherein the game processing further comprises, in the race, based on a ranking of the operating object in the inter-base routes at the time when the operating object runs the inter-base route and reaches any of the base areas with which the route merges, causing the operating object to continue the race by winning through, or causing the operating object to drop out.

32. The information processing system according to claim 31, wherein the game processing further comprises, if the operating object is caused to drop out, starting a race with a movable object having dropped out.

33. The information processing system according to claim 21, wherein the game processing further comprises:

in the race, on the intra-base route, if the operating object goes out of a first range set along the course, returning the operating object into the course; and on the inter-base route, if the operating object goes out of a second range set along the course and set to be wider than the first range, returning the operating object into the course.

34. The information processing system according to claim 21, wherein the setting of the course further includes placement of an item giving object on the course, and first item giving objects larger than second item giving objects placed on the intra-base route is placed on the inter-base route, and the game processing further comprises, in the race, in accordance with contact between the operating object and the first item giving objects or the second item giving objects, causing the operating object to acquire an item.

35. The information processing system according to claim 34, wherein the game processing further comprises, in the race, if the operating object or the movable object comes into contact with the second item giving objects, erasing the second item giving objects for at least a predetermined period; and if the operating object or the movable object comes into contact with the first item giving objects, not erasing the first item giving objects.

36. The information processing system according to claim 35, wherein the field includes a road portion and a portion other than the road portion, the course is set to at least include the road portion, and at least any of the first item giving objects has a shape having a width wider than a width of the road portion on the path of the inter-base route where the first item giving objects are placed.

37. The information processing system according to claim 21, wherein the game processing further comprises, in the race, if the operating object is in the intra-base route, displaying first map information indicating at least a part of the intra-base route including a position of the operating object; and if the operating object is in the inter-base route, displaying second map information indicating at least a part of the inter-base route including the position of the operating object and a wider range in the field than the first map information.

38. The information processing system according to claim 21, wherein a plurality of gates are placed on the field, the intra-base route is a route where the operating object and the movable object pass through any of the gates placed in the base areas and reaches the gate again, and the inter-base route is a route where the operating object and the movable object pass through a gate of a first base area and reach a gate of a second base area.

39. The information processing system according to claim 38, wherein the game processing further comprises, in the race, displaying lap information relating to the number of times the operating object passes through any of the gates.

40. The information processing system according to claim 21, wherein the game processing further comprises, after the race ends, transitioning to a free running mode for causing the operating object to run on the field, regardless of the course; and in the free running mode, if the type of the race is determined and an instruction to start the race is given based on an operation input, starting the race.

41. An information processing method performed by an information processing system, the information processing method comprising:

based on an operation input, causing an operating object to run on a field in a virtual space, wherein a plurality of base areas are set on the field;

in a case where a type of a race to be performed by the operating object and at least one other movable object is determined and an instruction to start the race is given based on an operation input, if the determined race is a specific type of race, setting a course at least including an intra-base route that is a path set in any of the base areas and an inter-base route set as a path connecting the base areas;

starting the race; and causing the operating object and the movable object to run along the set course on the field, thereby performing the race.

42. The information processing method according to claim 41, further comprising, if the determined race is a first type of race as the specific type of race, setting a course at least including the inter-base route between a first base area and a second base area, and a route where the operating object and the movable object take a predetermined number of laps around the intra-base route in the second base area and reach a goal after the inter-base route.

43. The information processing method according to claim 42, further comprising, after the first type of race ends, setting a course at least including the inter-base route between the second base area and a third base area, and a route where the operating object and the movable object take a predetermined number of laps around the intra-base route in the third base area and reach a goal after the inter-base route, and further starting a race.

44. The information processing method according to claim 41, further comprising, if the determined race is a second type of race as the specific type of race, setting a course where the operating object and the movable object take a predetermined number of laps around the intra-base route of one of the base areas that a plurality of continuous inter-base routes reach last, and reach a goal.

45. The information processing method according to claim 41, further comprising, if the determined race is a second type of race, setting a course at least including a plurality of continuous inter-base routes.

46. The information processing method according to claim 41, further comprising:

if the determined race is a third type of race as the specific type of race, setting a course where starting points are set in the plurality of base areas, and in one of the base areas that a route reaches on a path via the plurality of continuous inter-base routes, the route merges with a route where a starting point is in another one of the base areas, and the operating object and the movable object take a predetermined number of laps around the intra-base route of one of the base areas that the plurality of continuous inter-base routes reach last, and reach a goal; and starting the operating object from any of the plurality of starting points.

47. The information processing method according to claim 41, further comprising:

if the determined race is a third type of race, setting a course where starting points are set in the plurality of base areas, and in one of the base areas that a route reaches on a path via the plurality of continuous inter-base routes, the route merges with a route where a starting point is in another one of the base area, and a goal point is set in the base areas where the routes merge together; and starting the operating object from any of the plurality of starting points.

48. The information processing method according to claim 41, further comprising, if the determined race is a fourth type of race, setting a course where the operating object and the movable object take a predetermined number of laps around the intra-base route.

49. The information processing method according to claim 42, further comprising, if the determined race is a fifth type of race, setting a course where the operating object and the movable object take a predetermined number of laps around the intra-base route in the first base area, and after the fifth type of race ends, starting the first type of race.

50. The information processing method according to claim 44, further comprising:

further setting a checkpoint in any of the base areas located between the plurality of inter-base routes of the course; and in the race, based on a ranking of the operating object in the race at a time when the operating object reaches the checkpoint, causing the operating object to continue the race or causing the operating object to drop out of the race.

51. The information processing method according to claim 46, further comprising, in the race, based on a ranking of the operating object in the inter-base routes at the time when the operating object runs the inter-base route and reaches any of the base areas with which the route merges, causing the operating object to continue the race by winning through, or causing the operating object to drop out.

52. The information processing method according to claim 51, further comprising, if the operating object is caused to drop out, starting a race with a movable object having dropped out.

53. The information processing method according to claim 41, further comprising:

in the race, on the intra-base route, if the operating object goes out of a first range set along the course, returning the operating object into the course; and on the inter-base route, if the operating object goes out of a second range set along the course and set to be wider than the first range, returning the operating object into the course.

54. The information processing method according to claim 41, wherein the setting of the course further includes placement of an item giving object on the course, and first item giving objects larger than second item giving objects placed on the intra-base route is placed on the inter-base route, and the information processing method further comprises, in the race, in accordance with contact between the operating object and the first item giving objects or the second item giving objects, causing the operating object to acquire an item.

55. The information processing method according to claim 54, further comprising, in the race, if the operating object or the movable object comes into contact with the second item giving objects, erasing the second item giving objects for at least a predetermined period; and if the operating object or the movable object comes into contact with the first item giving objects, not erasing the first item giving objects.

56. The information processing method according to claim 55, wherein the field includes a road portion and a portion other than the road portion, the course is set to at least include the road portion, and at least any of the first item giving objects has a shape having a width wider than a width of the road portion on the path of the inter-base route where the first item giving objects are placed.

57. The information processing method according to claim 41, further comprising, in the race, if the operating object is in the intra-base route, displaying first map information indicating at least a part of the intra-base route including a position of the operating object; and if the operating object is in the inter-base route, displaying second map information indicating at least a part of the inter-base route including the position of the operating object and a wider range in the field than the first map information.

58. The information processing method according to claim 41, wherein a plurality of gates are placed on the field, the intra-base route is a route where the operating object and the movable object pass through any of the gates placed in the base areas and reaches the gate again, and the inter-base route is a route where the operating object and the movable object pass through a gate of a first base area and reach a gate of a second base area.

59. The information processing method according to claim 58, further comprising, in the race, displaying lap information relating to the number of times the operating object passes through any of the gates.

60. The information processing method according to claim 41, further comprising, after the race ends, transitioning to a free running mode for causing the operating object to run on the field, regardless of the course; and in the free running mode, if the type of the race is determined and an instruction to start the race is given based on an operation input, starting the race.

61. An information processing apparatus comprising one or more processors that execute game processing comprising:

based on an operation input, causing an operating object to run on a field in a virtual space, wherein a plurality of base areas are set on the field;

in a case where a type of a race to be performed by the operating object and at least one other movable object is determined and an instruction to start the race is given based on an operation input, if the determined race is a specific type of race, setting a course at least including an intra-base route that is a path set in any of the base areas and an inter-base route set as a path connecting the base areas;

starting the race; and causing the operating object and the movable object to run along the set course on the field, thereby performing the race.

* * * * *